US012007129B2

(12) United States Patent
Mosamkar et al.

(10) Patent No.: US 12,007,129 B2
(45) Date of Patent: Jun. 11, 2024

(54) HVAC SCRUBBER UNIT WITH BUILDING MANAGEMENT SYSTEM INTEGRATION SYSTEMS AND METHODS

(71) Applicant: AIR DISTRIBUTION TECHNOLOGIES IP, LLC, Milwaukee, WI (US)

(72) Inventors: Nitin J. Mosamkar, Mumbai (IN); Amol P. Joshi, Coppell, TX (US); Michael G. Longman, Coppell, TX (US); Steven M. Trame, Springboro, OH (US)

(73) Assignee: AIR DISTRIBUTION TECHNOLOGIES IP, LLC, Milwaukee, WI (US)

( * ) Notice: Subject to any disclaimer, the term of this patent is extended or adjusted under 35 U.S.C. 154(b) by 292 days.

(21) Appl. No.: 17/409,534

(22) Filed: Aug. 23, 2021

(65) Prior Publication Data

US 2021/0381706 A1 Dec. 9, 2021

Related U.S. Application Data

(63) Continuation of application No. 15/799,723, filed on Oct. 31, 2017, now Pat. No. 11,098,911.
(Continued)

(51) Int. Cl.
*B01D 53/02* (2006.01)
*B01D 53/04* (2006.01)
(Continued)

(52) U.S. Cl.
CPC ...... *F24F 11/0001* (2013.01); *B01D 53/0415* (2013.01); *B01D 53/0438* (2013.01);
(Continued)

(58) Field of Classification Search
CPC ..... F24F 11/0001; B01D 53/62; B01D 53/72; B01D 53/96; B01D 2257/504; B01D 2257/708
See application file for complete search history.

(56) References Cited

U.S. PATENT DOCUMENTS 6,110,216 A * 8/2000 Weber ................. G06T 17/00
703/1
6,711,470 B1 * 3/2004 Hartenstein .......... F24F 11/74
700/266
(Continued)

FOREIGN PATENT DOCUMENTS

CA 2957726 A1 3/2016
CA 3043996 A1 2/2018
(Continued)

OTHER PUBLICATIONS

Coolinglogic, "CoolingLogic: Up early, saving billions." URL: http://coolinglogic.com/documents/MarketingFlyer_FINAL_HiRes8. 5x11.pdf, retrieved from internet Oct. 27, 2022 (1 page).
(Continued)

*Primary Examiner* — Christopher P Jones
(74) *Attorney, Agent, or Firm* — Fletcher Yoder, PC

(57) ABSTRACT

Systems and methods for integrating a building management system communicatively coupled to a security subsystem via a communication network, in which the building management system determines occupancy data, with a heating, ventilation, and air conditioning subsystem that includes a scrubber unit communicatively coupled to the building management system via the communication network. The scrubber unit includes a contaminant filter that sorbs air contaminants from a surrounding environment when an elevated pressure differential is introduced across the contaminant filter; an inlet sensor that determines sensor data indicative of contaminant level present in return air received
(Continued)

by the scrubber unit from an internal portion of the building; and scrubber control circuitry that selectively instructs the scrubber unit to operate in one of multiple regeneration modes based at least in part on the occupancy data and the sensor data to facilitate improving filtering efficiency provided by the contaminant filter during subsequent operation.

20 Claims, 21 Drawing Sheets

Related U.S. Application Data

(60) Provisional application No. 62/523,132, filed on Jun. 21, 2017.

(51) Int. Cl.
| | | |
|---|---|---|
| *B01D 53/047* | (2006.01) | |
| *B01D 53/62* | (2006.01) | |
| *B01D 53/72* | (2006.01) | |
| *B01D 53/96* | (2006.01) | |
| *F24F 8/10* | (2021.01) | |
| *F24F 11/00* | (2018.01) | |
| *F24F 11/30* | (2018.01) | |
| *F24F 11/39* | (2018.01) | |
| *F24F 11/62* | (2018.01) | |
| *F24F 11/65* | (2018.01) | |
| *G05B 15/02* | (2006.01) | |
| *B60H 3/06* | (2006.01) | |
| *F24F 8/90* | (2021.01) | |
| *F24F 110/10* | (2018.01) | |
| *F24F 110/12* | (2018.01) | |
| *F24F 110/20* | (2018.01) | |
| *F24F 110/22* | (2018.01) | |
| *F24F 110/50* | (2018.01) | |
| *F24F 110/65* | (2018.01) | |
| *F24F 110/66* | (2018.01) | |
| *F24F 110/70* | (2018.01) | |
| *F24F 120/10* | (2018.01) | |
| *F24F 130/00* | (2018.01) | |
| *F24F 130/10* | (2018.01) | |
| *F24F 140/40* | (2018.01) | |

(52) U.S. Cl.
CPC ..... *B01D 53/0454* (2013.01); *B01D 53/0473* (2013.01); *B01D 53/62* (2013.01); *B01D 53/72* (2013.01); *B01D 53/96* (2013.01); *F24F 8/10* (2021.01); *F24F 11/30* (2018.01); *F24F 11/39* (2018.01); *F24F 11/62* (2018.01); *F24F 11/65* (2018.01); *G05B 15/02* (2013.01); *B01D 53/02* (2013.01); *B01D 2257/504* (2013.01); *B01D 2257/708* (2013.01); *B01D 2258/06* (2013.01); *B01D 2259/40088* (2013.01); *B01D 2259/4068* (2013.01); *B01D 2259/4508* (2013.01); *B60H 2003/0691* (2013.01); *F24F 8/90* (2021.01); *F24F 2011/0002* (2013.01); *F24F 2110/10* (2018.01); *F24F 2110/12* (2018.01); *F24F 2110/20* (2018.01); *F24F 2110/22* (2018.01); *F24F 2110/50* (2018.01); *F24F 2110/65* (2018.01); *F24F 2110/66* (2018.01); *F24F 2110/70* (2018.01); *F24F 2120/10* (2018.01); *F24F 2130/00* (2018.01); *F24F 2130/10* (2018.01); *F24F 2140/40* (2018.01)

(56) References Cited

U.S. PATENT DOCUMENTS

| | | |
|---|---|---|
| 6,726,558 B1 | 4/2004 | Meirav |
| 6,866,701 B2 | 3/2005 | Meirav |
| 8,157,892 B2 | 4/2012 | Meirav |
| 8,491,710 B2 | 7/2013 | Meirav |
| 8,690,999 B2 | 4/2014 | Meirav et al. |
| 9,316,410 B2 | 4/2016 | Meirav et al. |
| 9,328,936 B2 | 5/2016 | Meirav et al. |
| 9,375,672 B2 | 6/2016 | Meirav et al. |
| 9,399,187 B2 | 7/2016 | Meirav et al. |
| 9,447,985 B2 | 9/2016 | Johnson |
| 9,533,250 B2 | 1/2017 | Meirav et al. |
| 9,566,545 B2 | 2/2017 | Meirav et al. |
| 10,871,756 B2 | 12/2020 | Johnson et al. |
| 10,908,578 B2 | 2/2021 | Johnson et al. |
| 10,921,768 B2 | 2/2021 | Johnson et al. |
| 11,156,978 B2 | 10/2021 | Johnson et al. |
| 2004/0112211 A1 | 6/2004 | Meirav |
| 2007/0082601 A1* | 4/2007 | Desrochers ............. F24F 3/044 454/239 |
| 2011/0198055 A1 | 8/2011 | Meirav et al. |
| 2011/0265648 A1 | 11/2011 | Meirav |
| 2011/0277490 A1 | 11/2011 | Meirav |
| 2012/0273980 A1 | 11/2012 | Meirav |
| 2013/0178987 A1 | 7/2013 | Meirav et al. |
| 2013/0291732 A1 | 11/2013 | Meirav |
| 2014/0020559 A1 | 1/2014 | Meirav et al. |
| 2014/0202330 A1 | 7/2014 | Meirav et al. |
| 2014/0260692 A1* | 9/2014 | Sharp ....................... F24F 11/74 73/863.23 |
| 2014/0298996 A1 | 10/2014 | Meirav et al. |
| 2014/0326428 A1 | 11/2014 | Meirav et al. |
| 2015/0078964 A1 | 3/2015 | Meirav et al. |
| 2015/0258488 A1 | 9/2015 | Meirav et al. |
| 2015/0298043 A1* | 10/2015 | Meirav .................. B01D 53/04 96/111 |
| 2015/0321135 A1 | 11/2015 | Meirav et al. |
| 2015/0352518 A1 | 12/2015 | Meirav et al. |
| 2015/0375157 A1 | 12/2015 | Meirav |
| 2016/0025578 A1 | 1/2016 | Meirav et al. |
| 2016/0082383 A1 | 3/2016 | Meirav et al. |
| 2016/0187012 A1 | 6/2016 | Meirav et al. |
| 2016/0228809 A1 | 8/2016 | Meirav et al. |
| 2016/0228811 A1 | 8/2016 | Meirav et al. |
| 2016/0282001 A1 | 9/2016 | Meirav et al. |
| 2016/0288043 A1 | 10/2016 | Meirav et al. |
| 2016/0303503 A1 | 10/2016 | Meirav et al. |
| 2016/0363333 A1 | 12/2016 | Meirav et al. |
| 2017/0056812 A1 | 3/2017 | Meirav et al. |
| 2017/0136399 A1 | 5/2017 | Meirav et al. |

FOREIGN PATENT DOCUMENTS

| | | |
|---|---|---|
| EP | 3 186 687 A4 | 7/2017 |
| EP | 3 497 377 A1 | 6/2019 |

OTHER PUBLICATIONS

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).
Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).
Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).
Johnson Heating and Cooling L.L.C., "Excel Rehabilitation Building Automation," URL: http://cooljohnson.com/Building-Automation-

(56) References Cited

OTHER PUBLICATIONS

Systems-Michigan/Waterford-Michigan/Building-Automation-System--Excel.html, retrieved from internet Oct. 27, 2022 (2 pages).
Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).
Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).
Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).
Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).
Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).
Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).
Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).
Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).
Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).
Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).
Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).
Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).
Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).
Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).
Johnson Solid State LLC, "Building Automation Gui," URL: http://cooljohnson.com/Video/Building_Automation/Confidential_Customer_BLD_2/Building_Automation_GUI.mp4, retrieved from internet Oct. 27, 2022 (24 pages).
Johnson Solid State LLC, "Cooling Logic Overview," URL: http://coolinglogic.com/documents/CoolingLogic_Overview_High_Quality.mp4, retrieved from internet Oct. 27, 2022 (16 pages).
Johnson Solid State LLC, "So what is CoolingLogic™?" URL: http://coolinglogic.com/Coolinglogic-How-it-Works.html, retrieved from the internet Oct. 27, 2022 (3 pages).
Johnson, David, "A Method to Increase HVAC System Efficiency And Decrease Energy Consumption," White Paper: Johnson Solid State, LLC, URL: http://coolinglogic.com/documents/16102106_White_Paper_High_Resolution_Protected.pdf, Sep. 24, 2016 (51 pages).
Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).
Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).
Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).
Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).

* cited by examiner

HVAC SCRUBBER UNIT WITH BUILDING MANAGEMENT SYSTEM INTEGRATION SYSTEMS AND METHODS

CROSS-REFERENCE TO RELATED APPLICATIONS

This a continuation of U.S. patent application Ser. No. 15/799,723, entitled "HVAC SCRUBBER UNIT WITH BUILDING MANAGEMENT SYSTEM INTEGRATION SYSTEMS AND METHODS," which claims priority to and benefit of U.S. Provisional Application No. 62/523,132, entitled "CONTAMINANT SCRUBBER OF AN HVAC SYSTEM" and filed Jun. 21, 2017, each of which is incorporated herein by reference in its entirety for all purposes.

BACKGROUND

The present disclosure generally relates to heating, ventilation, and air conditioning (HVAC) systems and, more particularly, to scrubber units that may be implemented in an HVAC system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, an HVAC system may operate to provide temperature controlled air to an internal space, for example, in a building. In particular, the HVAC system may adjust temperature of supply air provided to the internal space based on a temperature setpoint (e.g., target temperature of supply air), for example, via one or more heat exchangers. As supply air is provided, the HVAC system may receive return air from the internal space, for example, to facilitate maintaining air pressure within the internal space relatively constant.

However, in some instances, return air may include a contaminants, such as carbon dioxide, formaldehyde, and/or other volatile organic compounds. For example, carbon dioxide level (e.g., parts per billion) in return air may be higher than carbon dioxide level in outside air due to higher concentration of living beings (e.g., humans and/or animals) and, thus, breathing in the internal space. When contaminant level in return air is higher than a target contaminant level of supply air, the HVAC system may generate supply air provided to the internal space by combining return air with outside air. However, since temperature of return air is generally closer to target temperature of supply air, the HVAC system, at least in some instances, may adjust temperature of return air more efficiently than temperature of outside air.

SUMMARY

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In one embodiment, a building includes a building management system communicatively coupled to a security subsystem via a communication network, in which the building management system determines occupancy data indicative of current occupancy of the building, expected future occupancy of the building, or both; and a heating, ventilation, and air conditioning subsystem that includes a scrubber unit communicatively coupled to the building management system via the communication network. The scrubber unit includes a contaminant filter that sorbs air contaminants from a surrounding environment when an elevated pressure differential is introduced across the contaminant filter; an inlet sensor that determines sensor data indicative of contaminant level present in return air received by the scrubber unit from an internal portion of the building; and scrubber control circuitry that selectively instructs the scrubber unit to operate in one of multiple regeneration modes based at least in part on the occupancy data and the sensor data to facilitate improving filtering efficiency provided by the contaminant filter during subsequent operation.

In another embodiment, a scrubber unit to be implemented in a heating, ventilation, and air conditioning system includes a contaminant filter that sorbs air contaminants from a surrounding environment when an elevated pressure differential is introduced across the contaminant filter; an actuator mechanically coupled to an air damper, in which the air damper is fluidly coupled between the contaminant filter and an air conduit; a sensor that determines sensor data indicative of operational parameters of the scrubber unit; and scrubber control circuitry configured to generate a local clock signal; read the sensor data, output control commands to the actuator, or both in accordance with the local clock signal when a global clock signal is not received to enable deploying the scrubber unit in a standalone building subsystem; and read the sensor data, output control commands to the actuator, or both in accordance with the global clock signal when the global clock signal is received from a building management system to facilitate coordinating operation of the scrubber unit with one or more other building subsystems.

In another embodiment, a heating, ventilation, and air conditioning system includes an air handling unit fluidly coupled between an outside air conduit and a supply air conduit, in which the air handling unit provides temperature controlled supply air provided to the supply air conduit by flowing the supply air over a heat exchanger; an outside air actuator mechanically coupled to an outside air damper, in which the outside air damper is fluidly coupled between the outside air conduit and the supply air conduit; and a scrubber unit fluidly coupled to the air handling unit via a return air conduit. The scrubber unit includes a contaminant filter that sorbs air contaminants from return air flowing through the return air conduit; and scrubber control circuitry communicatively coupled to the outside air actuator, in which the scrubber control circuitry is configured to determine expected parameters of outside air in the outside air conduit; and instruct the outside air damper to adjust damper positon of the outside air damper based at least in part on the expected parameters of the outside air.

DRAWINGS

Various aspects of this disclosure may be better understood upon reading the following detailed description and upon reference to the drawings in which.

DETAILED DESCRIPTION

Figure 1:
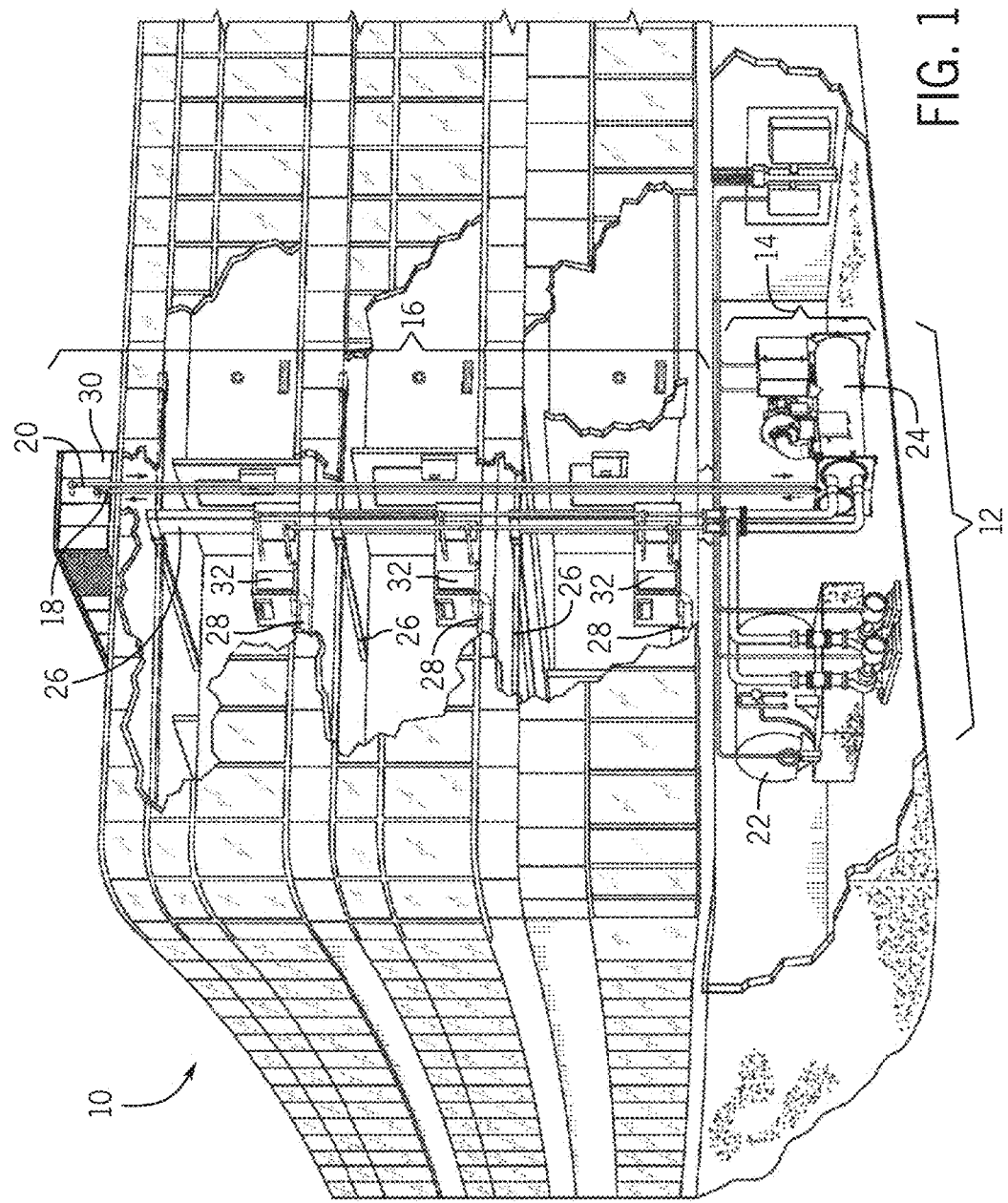
FIG. 1 is a perspective view of a building including a heating, ventilating, and air conditioning (HVAC) subsystem, in accordance with an aspect of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Often, a building includes one or more building subsystems, such as a heating, ventilation, and air conditioning (HVAC) subsystem that supplies temperature controlled air to an internal space within the building. To facilitate producing temperature controlled air, the HVAC subsystem may include an air handling unit (AHU) that operates to adjust temperature of supply air based on a temperature setpoint (e.g., target temperature) associated with the internal space. For example, when air flows over (e.g., around) a heat exchanger coil in the air handling unit while fluid (e.g., water or refrigerant) is being circulated through the air handling unit, the heat exchanger coil may facilitate heat transfer between the fluid and the air, thereby changing temperature of the air. Thus, to facilitate controlling temperature, the air handling unit may control flow rate of supply air over the heat exchanger coil and/or flow rate of fluid circulated through the air handling unit.

As supply air is provided to an internal space, the HVAC subsystem may receive (e.g., draw) return air from the internal space, for example, to facilitate maintaining air pressure within the internal space relatively constant. Since supply air is provided to the internal space, temperature of return air from the internal space may generally be close to the target temperature of the supply air. Thus, to facilitate improving operational efficiency, the air handling unit may produce supply air to be subsequently provided to the internal space using at least a portion of the return air.

However, in some instances, return air may include air contaminants, such as carbon dioxide, formaldehyde, and/or other volatile organic compounds (VOCs). For example, carbon dioxide level (e.g., parts per billion) in return air may be higher than carbon dioxide level in outside air due to higher concentration of living beings (e.g., humans and/or animals) and, thus, breathing in the internal space. When contaminant level in return air is higher than a target contaminant level of supply air, the air handling unit may generate the supply air by combining the return air with outside air. However, when difference between outside air temperature and the temperature setpoint is greater than difference between return air temperature and the temperature setpoint, operation of the air handling unit may less efficiently adjust temperature of supply air produced using a combination of return air and outside air, for example, compared to supply air produced using only return air. In other words, at least in some instances, amount of outside air used to produce supply air may affect operational efficiency of the air handling unit and, thus, the HVAC subsystem.

To facilitate improving operational efficiency, the present disclosure provides techniques for implementing and/or controlling operation of one or more scrubber units in an HVAC system (e.g., subsystem integrated with a building management system). As will be described in more detail below, in some embodiments, a scrubber unit may be fluidly coupled to one or more air handling units to facilitate reducing contaminant level present in return air, for example, when operating in a sorption mode. Additionally, in some embodiments, an internal portion of a scrubber unit may include a closed loop damper, a contaminant filter, a heater, and a fan. In particular, the heater may increase temperature of air within the internal portion of the scrubber unit when turned on, damper position of the closed loop damper may limit re-circulation of air within the internal portion of the scrubber unit, and the fan may force (e.g., push or pull) air through the contaminant filter when turned on. Additionally, in some embodiments, the contaminant filter may include chemical compounds that sorb (e.g., absorb or adsorb) contaminants from its surrounding environment while undergoing a first chemical reaction and that release previously sorbed contaminants into its surrounding environment while undergoing a second chemical reaction.

The scrubber unit may also include an outside inlet damper and an outside outlet damper fluidly coupled between its internal portion and one or more outside air conduits (e.g., ducts). In other words, damper position of the outside inlet damper may limit flow of outside air into the internal portion of the scrubber unit and damper position of the outside outlet damper may limit flow of air out from the internal portion of the scrubber unit to an outside air conduit. Additionally, the scrubber unit may include a return inlet damper and a return outlet damper fluidly coupled between the internal portion and one or more return air conduits (e.g., ducts). In other words, damper position of the return inlet damper may limit flow of return air into the internal portion of the scrubber unit and damper position of the return outlet damper may limit flow of air out from the internal portion of the scrubber unit to a return air conduit. For example, return air may flow through the internal portion of the scrubber unit when the return inlet damper and the return outlet damper are both in at least partially open positions.

To facilitate improving operational efficiency, as described above, the HVAC subsystem may be implemented such that one or more scrubber units are fluidly coupled to one or more air handling units. For example, an air handling unit may be fluidly coupled to the return air conduit along with the scrubber unit. To facilitate producing supply air, the air handling unit may also be fluidly coupled to an outside air conduit.

In some embodiments, the air handling unit may include a return air damper fluidly coupled between the return air conduit and an internal portion, which includes one or more heat exchanger coils. In other words, damper position of the return air damper may limit flow of return air into the internal portion of the air handling unit. Additionally, the air handling unit may include an outside air damper fluidly coupled between the outside air conduit and the internal portion of the air handling unit. In other words, damper position of the outside air damper may limit flow of outside air into the internal portion of the air handling unit. Thus, in some embodiments, the air handling unit may produce supply air using only return air, only outside air, or a combination of return air and outside air, for example, by controlling damper position of the return air damper and/or damper position of the outside air damper.

To facilitate reducing amount of outside air used in supply air, in some embodiments, a scrubber unit may operate in a sorption mode to sorb (e.g., trap) contaminants present in return air flowing through the scrubber unit. As described above, in some embodiments, a contaminant filter in the scrubber unit may sorb contaminants while the chemical compounds in its one or more filter cartridges undergo a first chemical reaction and release previously sorbed contaminants into its surrounding environment while the chemical compounds in its one or more filter cartridges undergo a second chemical reaction. In some embodiments, the second chemical reaction may occur when temperature of the contaminant filter is elevated, for example, above a temperature threshold. Additionally, in some embodiments, the first chemical reaction may occur when pressure differential across the contaminant filter is elevated, for example, above a pressure differential threshold.

Thus, while operating in the sorption mode, the scrubber unit may actively introduce a pressure differential across its contaminant filter, for example, by modulating speed of its fan based at least in part on a target sorption pressure differential. In some embodiments, the target sorption pressure differential may be determined based at least in part on the pressure differential threshold, for example, such that the target sorption pressure differential includes a range of pressure differentials at or above the pressure differential threshold. To facilitate sorbing air contaminants, in some embodiments, the scrubber unit may maintain temperature of its contaminant filter at a target sorption temperature, for example, which includes a range of temperatures at or below the temperature threshold by maintaining its heater off. Thus, when return air flows through scrubber unit while operating in the sorption mode, the scrubber unit may facilitate reducing contaminant level in the return air, which at least in some instances may facilitate improving operational efficiency of the air handling unit, for example, by enabling the supply air to be produced using less outside air.

In some embodiments, filtering efficiency of a contaminant filter may change over time. For example, as amount of sorbed air contaminants increases, filtering efficiency of the contaminant filter may gradually decrease. Thus, in some embodiments, the filtering efficiency may be determined and tracked. For example, filter efficiency may be determined based at least in part on input air contaminant level determined by a return inlet sensor coupled on the return inlet damper and output air contaminant level determined via a return outlet sensor coupled on the return outlet damper.

To facilitate improving filtering efficiency during subsequent operation, in some embodiments, a scrubber unit may operate in a regeneration mode to release and vent (e.g., exhaust) previously sorbed air contaminants from its contaminant filter. For example, the scrubber unit may operate in a quick regeneration mode when filtering efficiency of its contaminant filter is reduced below a filtering efficiency threshold. Additionally or alternatively, the scrubber unit may periodically operate in a regeneration mode based at least in part on current and/or expected (e.g., future) occupancy of the building. For example, the scrubber unit operate in an extended regeneration mode when the building is expected to be unoccupied a duration greater than a duration threshold and a standard regeneration mode when the building is expected to be unoccupied a duration not greater than the duration threshold. In any case, a regeneration mode may generally include a closed loop heating phase, a bleed phase, and a cool down phase.

While in the closed loop heating phase, a scrubber unit may operate to increase temperature of its contaminant filter from a previous target operating (e.g., sorption or standby) temperature, for example, by pulsing the heater on and off based at least in part on a target regeneration temperature (e.g., 145° Fahrenheit). As described above, in some embodiments, a contaminant filter may release previously sorbed contaminants into its surrounding environment while chemical compounds in its one or more filter cartridges undergo a second chemical reaction, for example, due to its temperature being elevated above the temperature threshold. Thus, in such embodiments, the target regeneration temperature may be determined based at least in part on the temperature threshold, for example, such that the target regeneration temperature includes a range of temperatures at or above the temperature threshold. By operating in this manner, the scrubber unit may begin releasing previously sorbed air contaminants from its contaminant filter during the closed loop heating phase.

Subsequently, the scrubber unit may operate in the bleed phase to exhaust (e.g., vent) released air contaminants from the HVAC subsystem, for example, by at least partially opening the outside outlet damper to enable the released air contaminants to flow from the internal portion of the scrubber unit to an outside air duct. To facilitate increasing amount of air contaminants released from its contaminant filter during a regeneration cycle, in some embodiments, the scrubber unit may continue controlling temperature of its contaminant filter based at least in part on the target regeneration temperature, thereby enabling the contaminant filter to continue releasing previously sorbed air contaminants during the bleed phase. Since temperature of outside air may differ from the target regeneration temperature, the scrubber unit, in such embodiments, may gradually exhaust released air contaminants during the bleed phase, for example, by gradually ramping the outside air damper from a closed position toward an open position to facilitate increasing amount of contaminants removed from the contaminant filter during a regeneration cycle.

As described above, in some embodiments, a contaminant filter may sorb contaminants from its surrounding environment while the chemical compounds in its one or more filter cartridges undergo a first chemical reaction, for example, due to pressure differential across the contaminant filter being elevated above the pressure differential threshold while its temperature is below the temperature threshold. In other words, to facilitate sorbing air contaminants during subsequent operation, temperature of the contaminant filter may be reduced below the temperature threshold, for example, based at least in part on a subsequent target operating (e.g., sorption or standby) temperature that includes a range of temperatures at or below the temperature threshold. Since contaminant filter temperature may be elevated during the closed loop heating phase and the bleed phase, a scrubber unit may operate in the cool down phase to facilitate reducing temperature of its contaminant filter, for example, by maintaining the heater off and maintaining the fan on. By operating in this manner, temperature of the contaminant filter may be reduced during the cool down phase, which at least in some instances may facilitate reducing duration before the scrubber unit is subsequently able to operate in the sorption mode.

In any case, by operating in a (e.g., quick, standard, or extended) regeneration mode, a scrubber unit may release previously sorbed air contaminants from its contaminant filter during a regeneration cycle, which at least in some instances may facilitate improving filtering efficiency provided by the contaminant filter during subsequent operation. As described above, in some embodiments, filtering efficiency of a contaminant filter may be determined based at least in part on input air contaminant level and/or output air contaminant level, for example, indicated by sensor data output from the return inlet sensor and/or the return outlet sensor of a scrubber unit. Additionally or alternatively, the return inlet sensor and/or the return outlet sensor may output sensor data indicative of other return air parameters, such as temperature and/or humidity of the return air flowing through the scrubber unit.

In some embodiments, operation of other portions of an HVAC subsystem may be controlled based at least in part on return air parameters. For example, contaminant level present in return air may be used to control amount of outside air used by an air handling unit to produce supply air in accordance with the target contaminant level. Additionally or alternatively, temperature of return air may be used to control amount of temperature adjustment provided by the air handling unit to produce supply air in accordance with a temperature setpoint. However, implementing sensors in an HVAC subsystem may affect implementation associated cost, such as component count in the HVAC subsystem, manufacturing steps used to implement the HVAC subsystem, and/or size (e.g., physical footprint) of the HVAC subsystem.

To facilitate reducing implementation associated cost, in some embodiments, a scrubber unit may operate in a standby mode to enable flow of return air through the scrubber unit without actively introducing a pressure differential across its contaminant filter, for example, by at least partially opening its return inlet damper and its return outlet damper while maintaining its fan off. In other words, the scrubber unit may operate to facilitate determination of return air parameters even when the contaminant filter is not actively sorbing air contaminants. In this manner, by operating in the standby mode, the scrubber unit may facilitate reducing implementation associated cost of the HVAC subsystem, for example, by obviating implementation of additional sensors for determination of return air parameters.

To facilitate switching between the various operational modes, in some embodiments, a scrubber unit may include scrubber (e.g., dedicated) control circuitry, for example, implemented in a control panel coupled to a housing of the scrubber unit. In some embodiments, the scrubber control circuitry may be communicatively coupled to sensors implemented in the scrubber unit, for example, to enable the scrubber control circuitry to monitor operation of the scrubber unit and/or parameters of air (e.g., outside air and/or return air) flowing through the scrubber unit based at least in part on sensor data received from the sensors. Additionally, the scrubber control circuitry may be communicatively coupled to equipment implemented in the scrubber unit, such as a fan motor, a switching device in a fan relay module, a switching device in a heater relay module, and/or an actuator mechanically coupled to an air damper in the scrubber unit. In this manner, the scrubber control circuitry may control operation of the scrubber unit by communicating control commands that instruct equipment in the scrubber unit to adjust operation.

In addition to controlling operation of the scrubber unit, in some embodiments, the scrubber control circuitry may control operation of other portions of the HVAC subsystem. For example, the scrubber control circuitry may instruct an actuator external from the scrubber unit to adjust damper position of an outside air damper implemented in an air handling unit based at least in part on a target outside air damper position. In some embodiments, the scrubber control circuitry may determine the target outside air damper position based at least in part on operational status of the air handling unit and/or parameters of outside air. To facilitate determining operational status of the air handling unit, in some embodiments, the scrubber control circuitry may be communicatively coupled to air handler (e.g., dedicated) control circuitry, for example, to enable the scrubber control circuitry to determine whether the air handling unit is on or off based at least in part on status data received from the air handler control circuitry. To facilitate determining outside air parameters, in some embodiments, the scrubber control circuitry may be communicatively coupled to one or more sensors external from the scrubber unit, for example, implemented on the outside air damper to enable the scrubber control circuitry to determine temperature, humidity, and/or contaminant level of outside air based at least in part on sensor data received from an external sensor. In this manner, the scrubber control circuitry may facilitate controlling and/or monitoring operation of an HVAC subsystem implemented to provide temperature controlled air to an internal space within a building.

As described above, in some embodiments, a building may include multiple building subsystems. For example, in addition to an HVAC subsystem, the building may include a lighting subsystem, an electrical subsystem, a security subsystem, and/or a water subsystem. In some embodiments, controlling operation of one building subsystem based at least in part on operation of another building subsystem may facilitate improving operational efficiency, for example, by reducing power consumption (e.g., usage) attributed to operation of the building subsystems.

As an illustrative example, occupancy status of a building may be determined based at least in part on video captured by an image sensor (e.g., camera) in a security subsystem. By controlling operation based at least in part on the occupancy status, an HVAC subsystem may adaptively (e.g., dynamically) adjust temperature setpoint for supply air. For example, when the occupancy status indicates that a building zone is unoccupied, the HVAC subsystem may adjust temperature setpoint such that less cooling is applied to supply air provided to that building zone. Additionally or alternatively, since each provides differing tradeoffs between duration a scrubber unit is unavailable to operate in the sorption mode and filtering efficiency provided during subsequent operation, the scrubber control circuitry may instruct the scrubber unit to operate in one of the quick regeneration mode, the standard regeneration mode, and the extended regeneration mode based at least in part on current occupancy and/or expected future occupancy of the building. In this manner, at least in some instances, coordinating operation of multiple building subsystems may facilitate improving operation of one or more of the multiple building subsystems.

In some embodiments, a building management system may be implemented to facilitate coordinating operation of multiple building subsystems. For example, the building management system may receive image data corresponding with video captured by the security system. By analyzing the image data, the building management system may determine a current occupancy status of the building and communicate occupancy (e.g., state) data indicative of the current occupancy status to the HVAC subsystem. In some embodiments, based at least in part on the occupancy data, the HVAC subsystem may determine whether the building is currently occupied, whether a building zone in the building is currently occupied, number of individuals currently occupying the building, number of individuals currently occupying the building zone, and/or location of individuals currently occupying the building. For example, when it determines that the building is currently occupied and filtering efficiency is below the filtering efficiency threshold, the scrubber control circuitry may instruct the scrubber unit to operate in the quick regeneration mode.

Additionally, in some embodiments, the building management system may determine expected future occupancy status of the building, for example, by predicting the future occupancy based at least in part on previous (e.g., historical) occupancy of the building. Based at least in part on occupancy data indicative of the expected future occupancy status, in some embodiments, the HVAC subsystem may determine when the building is expected to be unoccupied and/or duration before the building is expected to be occupied. For example, when it determines that the building is currently unoccupied and expected to remain unoccupied a duration greater than a duration threshold, the scrubber control circuitry may instruct the scrubber unit to operate in the extended regeneration mode. Additionally, when it determines that the building is currently unoccupied and that the duration the building is expected to remain unoccupied is not greater than the duration threshold, the scrubber control circuitry may instruct the scrubber to operate in the standard regeneration mode.

In some embodiments, to facilitate coordinating operation of multiple building subsystems, a building management system may generate and supply a supervisor clock signal to one or more of the building subsystems. For example, the building management system may instruct the security subsystem and/or the HVAC subsystem to operate using the supervisor clock signal. Nevertheless, in some embodiments, a building subsystem may generate an internal clock signal to facilitate improving implementation flexibility, for example, by enabling the building subsystem to be deployed as a standalone system. Thus, when deployed in an integrated system, the building management system may override the internal clock signal by instructing the building subsystem to instead operate using the supervisor clock signal. In other words, in some embodiments, scrubber control circuitry may selectively operate using its internal clock signal or a supervisor clock signal based at least in part on whether the HVAC subsystem is integrated with a building management system.

Moreover, in some embodiments, a building management system may facilitate controlling operation of a building subsystem based at least in part on information provided by a remote data source. For example, the building management system may retrieve weather information (e.g., data) from a remote data source, such as a database server or the internet. To facilitate controlling operation of an outside air damper of an air handling unit, the building management system may analyze the weather information to determine parameters of the outside air, such as temperature, humidity, and/or contaminant level. By communicating parameter (e.g., state) data indicative of the outside air parameters, the building management system may enable the scrubber control circuitry to determine suitability of outside air for use in supply air and/or for venting air contaminants released during a regeneration mode. In any case, by implementing and/or controlling operation of one or more scrubber units in this manner, the techniques described in the present disclosure may facilitate improving operational efficiency of an HVAC system (e.g., subsystem) and, thus, a building in which the HVAC system is implemented.

To help illustrate, an example of a building 10 including an HVAC subsystem 12 is shown in FIG. 1. It should be appreciated, that the depicted building 10 is merely intended by illustrative and not limiting. For example, the building 10 may be a commercial structure or a residential structure. Additionally or alternatively, the building 10 may include other subsystems, such as a lighting subsystem, an electrical subsystem, a security subsystem, and/or a water subsystem.

In any case, in the depicted example, the HVAC subsystem 12 includes an air side 16 and a fluid side 14, which may circulate fluid (e.g., water, glycol, or refrigerant) through the air side 16. For example, the fluid side 14 may supply temperature controlled fluid to the air side 16 via one or more supply fluid pipes 18 (e.g., conduits) and receive fluid returning from the air side 16 via one or more return fluid pipes 20 (e.g., conduits). To facilitate producing heated fluid, the fluid side 14 may include one or more boilers 22 that operate to add heat to the circulated fluid, for example, by burning combustible material (e.g., natural gas) or using an electric heating element. To facilitate producing cooled fluid, the fluid side 14 may include one or more chillers 24 that operate to remove heat from the circulated fluid, for example, by placing the circulated fluid in a heat exchange relationship with another fluid (e.g., refrigerant).

Additionally, in some embodiments, the air side 16 may circulate air through internal portions of the building 10. For example, the air side 16 may supply temperature controlled air to an internal space within the building 10 via one or more supply air ducts 26 (e.g., conduits) and receive return air from the internal space via one or more return air ducts 28 (e.g., conduits). To facilitate producing temperature controlled supply air, the air side 16 may include one or more air handling units (AHUs) 30 that adjust temperature of supply air, for example, by placing the supply air in a heat exchange relationship with the fluid received from the fluid side 14.

In some embodiments, an air handling unit 30 may produce supply air using any combination of air returned from an internal portion of the building 10 and air drawn from outside (e.g., external) the building 10. In other words, the air handling unit 30 may produce supply air using only return air, only outside air, or both return air and outside air. Additionally, in some embodiments, an air handling unit 30 may adjust temperature of supply air to be supplied to an internal portion of the building 10 based at least in part on an associated temperature setpoint, for example, set via a thermostat and/or user inputs received from a client device.

To facilitate providing more granular temperature control, in some embodiments, the internal portion of the building 10 may be divided into multiple building zones each associated with its own at least relatively independently adjustable temperature setpoint. For example, the building 10 may be divided such that each floor is identified as a different building zone. To facilitate varying supply air provided to different building zones, in some embodiments, the air side 16 may include one or more variable air volume (VAV) units 32 coupled on the supply air ducts 26 and/or the return air ducts 28. For example, a variable air volume unit 32 on each floor may control amount of supply air provided to its corresponding building zone. Thus, in some embodiments, a variable air volume unit 32 may include one or more air dampers and/or other flow control elements.

In any case, the HVAC subsystem 12 may operate to control parameters (e.g., flow rate, temperature, contaminant level, and/or humidity) of supply air provided to each building zone in the building 10. As described above, in some embodiments, a building 10 may include multiple building subsystems. In other words, in addition to an HVAC subsystem 12, the building 10 may include other subsystems, such as a lighting subsystem, an electrical subsystem, a security subsystem, and/or a water subsystem. Since operation of different building subsystems may affect one another, in some embodiments, a building management system (BMS) may coordinate operation of the various building subsystems implemented in a corresponding building 10 or group of buildings 10 (e.g., campus).

Figure 2:
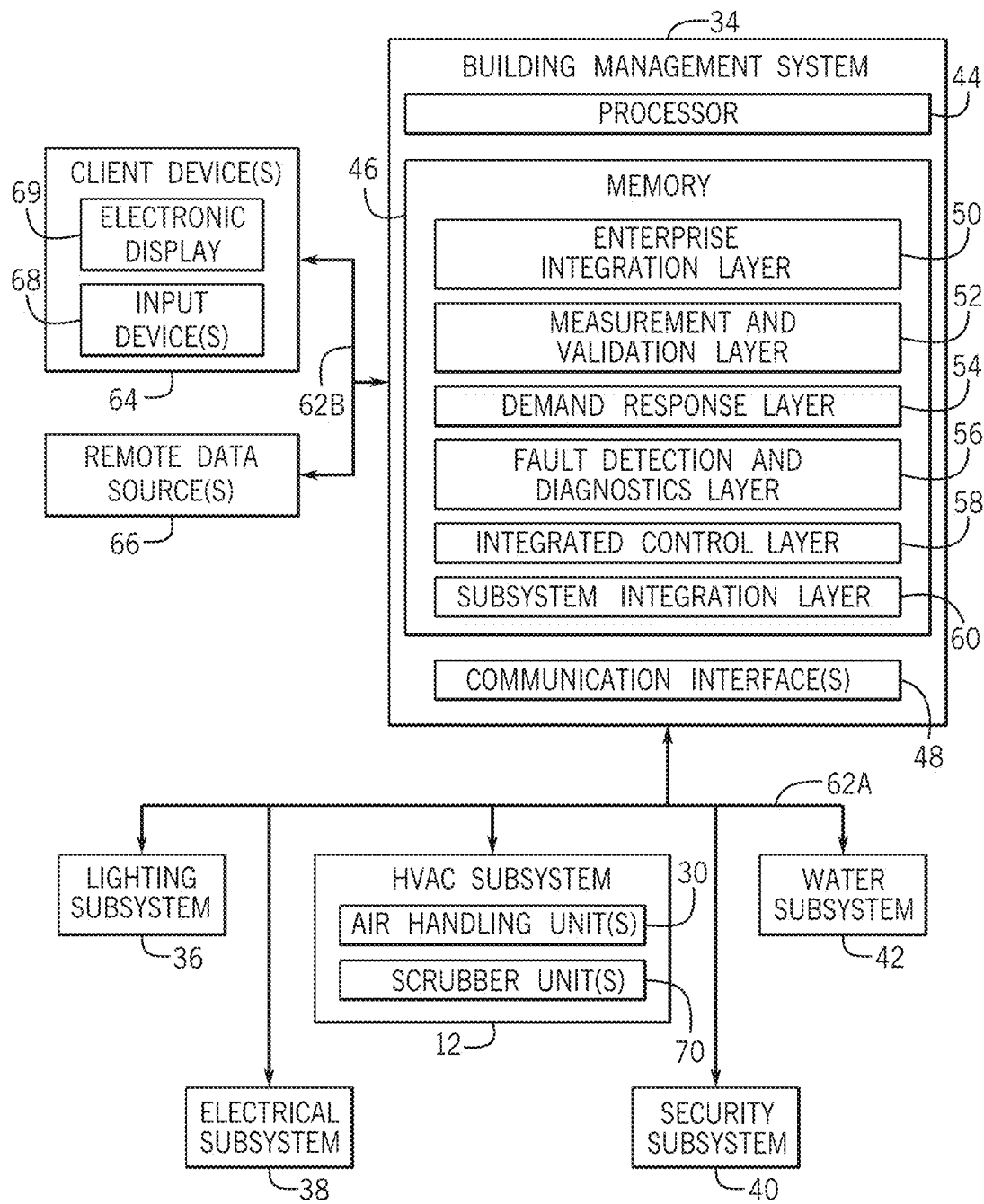
FIG. 2 is a block diagram of a portion of the building of FIG. 1 including a building management system (BMS) and various building subsystems, in accordance with an aspect of the present disclosure.

To help illustrate, an example of a building management system 34 implemented to coordinate operation of multiple building subsystems—namely an HVAC subsystem 12, a lighting subsystem 36, an electrical subsystem 38, a security subsystem 40, and a water subsystem 42—is shown in FIG. 2. It should be appreciated that the depicted embodiment is merely intended to be illustrative and not limiting. For example, in other embodiments, the building management system 34 may additionally or alternatively be integrated with other subsystems, such as a refrigeration subsystem, an advertising or signage subsystem, a cooking subsystem, a vending subsystem, a lift/escalators subsystem, a fire safety subsystem, an information communication technology (ICT) subsystem, and/or a printer or copy service subsystem.

To facilitate coordinating operation of multiple building subsystems, the building management system 34 may include a processor 44, memory 46, and one or more communication interfaces 48, for example, that operate in accordance with a supervisor clock signal. In some embodiments, a communication interface 48 may communicatively couple the building management system 34 to a communication network 62, such as a personal area network (PAN), a local area network (LAN), and/or a wide area network (WAN). For example, a first communication interface 48 may communicatively couple the building management system 34 to each of the building subsystems via a first communication network 62A, thereby enabling data communication between the building management system 34 and the various building subsystems. Additionally, a second communication interface 48 may communicatively couple the building management system 34 to one or more client devices 64 and/or to one or more remote data sources 66 via a second communication network 62B.

In some embodiments, the memory 46 may include one or more tangible, non-transitory, computer-readable media that store instructions executable by the processor 44 and/or data to be processed by the processor 44. For example, the memory 46 may include random access memory (RAM), read only memory (ROM), flash memory, hard drives, optical discs, and/or the like. Additionally, the processor 44 may include one or more general purpose microprocessors, one or more application specific processors (ASICs), one or more field programmable logic arrays (FPGAs), or any combination thereof.

In any case, by executing corresponding instructions, the building management system 34 may perform various operations (e.g., functions). In some embodiments, the building management system 34 may perform operations based on a supervisor clock signal, for example, generated by the building management system 34 and supplied to one or more building subsystems to facilitate coordinating operation with the building management system 34 and/or with one another. Additionally, in some embodiments, the operations may be organized into multiple hierarchal layers (e.g., applications). For example, the memory 46 may store instructions corresponding with an enterprise integration layer 50, a measurement and validation layer 52, a demand response layer 54, a fault detection and diagnostics layer 56, an integrated control layer 58, and a subsystem integration layer 60.

Generally, the building management system 34 may provide operational control across multiple building subsystem via the integrated control layer 58. For example, by executing instructions corresponding with the integrated control layer 58, the building management system 34 may determine a control strategy (e.g., one or more control actions) to be implemented by one or more of the building subsystems over a control horizon (e.g., period of time). In some embodiments, the building management system 34 may determine a control strategy based at least in part on operational parameters of the building subsystems, for example, indicated by sensor data output from a sensor and/or state data determined based at least in part on the sensor data. Additionally, in some embodiments, the building management system 34 may determine a control strategy based at least in part on information received from a remote data source 66, such as a weather server that communicates weather data indicative of environmental conditions (e.g., temperature, atmospheric pressure, contaminant level, and/or humidity of outside air) to the building management system 34. Furthermore, in some embodiments, the building management system 34 may determine a control strategy based at least in part on user (e.g., operator) commands, for example, received via input devices 68 on a client device 64.

In addition to receiving user commands, in some embodiments, a client device 64 may facilitate communicating information to a user, for example, by displaying a visual representation of building subsystem operational parameters and/or a visual representation of a determined control strategy. To implement a determined control strategy, the building management system 34 may communicate at least corresponding portions of the control strategy to the building subsystems. In other words, the building management system 34 may communicate on a subsystem level with each of the various building subsystems and on an enterprise level with an enterprise application, for example, running on a client device 64 and/or a remote data source 66.

Often, electronic devices communicate data using one of any number of communication protocols, which often are not directly compatible. For example, control modules manufactured by a first vendor may communicate using one (e.g., BACnet) communication protocol while control modules manufactured by a second vendor communicate using a different (e.g., Modbus) communication protocol. Thus, to facilitate improving operational flexibility, the subsystem integration layer 60 may integrate data communication between the building management system 34 and the building subsystems, for example, by converting communication protocol used to indicate received sensor data (e.g., signals) and/or output control commands (e.g., signals). Additionally, the enterprise integration layer 50 may integrate data communication between the building management system 34 and enterprise applications, for example, by generating a graphical user interface that includes a visual representation of a building subsystem operational parameter and/or converting communication protocol used to indicate input (e.g., user or remote) data. A more detailed description of the various layers that may be implemented in a building management system 34 can be found in commonly assigned U.S. Pat. No. 8,600,556, which is incorporated herein by reference in its entirety for all purposes.

In any case, by operating in this manner, a building management system 34 may facilitate coordinating operation of multiple building subsystems by enabling operation of one building subsystem to be controlled based at least in part on information determined outside that building subsystem, for example, by a different building subsystem and/or by a remote data source 66. As an illustrative example, when a building employee badges in at a parking garage, the security subsystem 40 may indicate occurrence of the event to the building management system 34. Based on indication of the event, the building management system 34 may determine a control strategy in which the lighting subsystem 36 turns on the lights in the building employee's office, the electrical system 38 boots up the building employee's computer, and/or the HVAC subsystem 12 begins cooling the building employee's office.

In other words, as in the above example, a security subsystem 40 may facilitate determining occupancy status (e.g., current occupancy) of a corresponding building 10. To facilitate determining occupancy status, in some embodiments, a security system 40 may include one or more video surveillance cameras that each captures a visual representation (e.g., video) of its proximate surroundings as image data. Additionally or alternatively, the security subsystem 40 may include other equipment the facilitates determining occupancy (e.g., state) data indicative of occupancy status, such as occupancy sensors, digital video recorders, video processing servers, intrusion detection devices, access control devices, motion sensors, and/or the like.

At least in some instances, controlling operation of a building subsystem based at least in part on building occupancy may facilitate improving operational efficiency, for example, by reducing power consumption resulting from its operation. As an illustrative example, when occupancy data is indicative of the building 10 being 20% occupied, the building management system 34 may determine a control strategy in which the electrical subsystem 38 disconnects electrical power from 80% of the elevators in the building 10, thereby facilitating a reduction in power consumption. Additionally, when occupancy data is indicative of a building zone being unoccupied, the building management system 34 may determine a control strategy that adjusts target temperature and/or target flow rate of supply air provided by the HVAC subsystem 12 to the unoccupied building zone.

To implement its corresponding portion of a control strategy, control circuitry may control operation of equipment in the HVAC subsystem 12. For example, the control circuitry may control operation of an air handling unit 30 to adjust temperature of the supply air. Additionally, the control circuitry may control position of one or more air dampers, for example, to adjust amount of return air used to produce the supply air. As described above, contaminant level is often the limiting factor on amount of return air that may be used in supply air. Thus, to facilitate increasing amount of return air used to produce supply air, the control circuitry may control operation of one or more scrubber units 70 to sorb (e.g., absorb or adsorb) air contaminants from the return air, which at least in some instances may facilitate improving operational efficiency of the HVAC subsystem 12.

Figure 3:
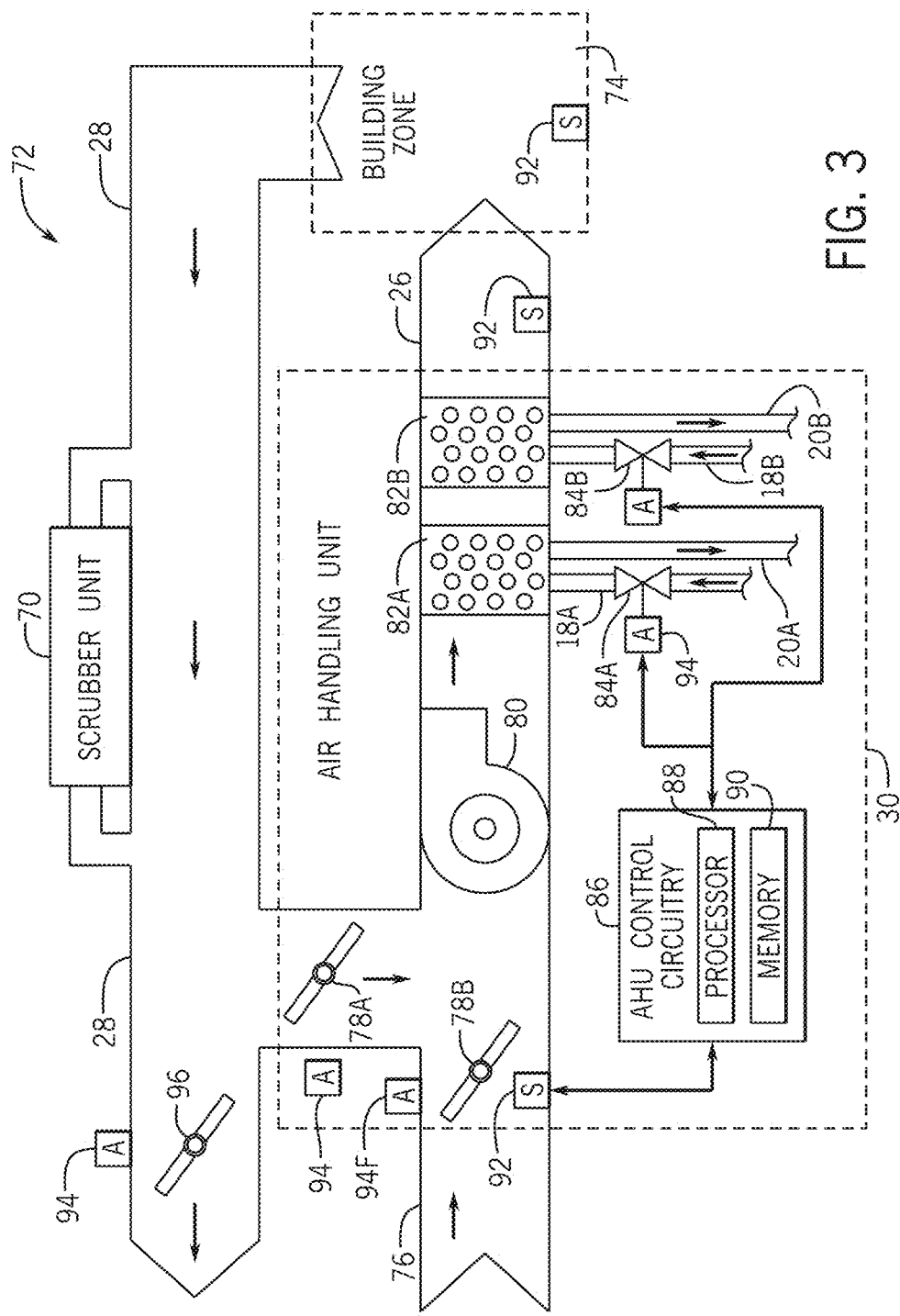
FIG. 3 is schematic diagram of an example of the HVAC subsystem of FIG. 1 including an air handling unit (AHU) and a scrubber unit, in accordance with an aspect of the present disclosure.

To help illustrate, an example of a portion 72 (e.g., air side 16) of an HVAC subsystem 12 including an air handling unit 30 and a scrubber unit 70 is shown in FIG. 3. It should be appreciated that the depicted example is merely intended to be illustrative and not limiting. For example, in other embodiments, the HVAC subsystem 12 may include multiple scrubber units 70 and/or multiple air handling units 30.

In any case, as described above, an air handling unit 30 may provide supply air to a building zone 74. Thus, as in the depicted example, an air handling unit 30 may be fluidly coupled to a supply air duct 26. Additionally, as described above, an air handling unit 30 may produce supply air using any combination of return air and outside air. Thus, as in the depicted example, an air handling unit 30 may also be fluidly coupled to a return air duct 28 and an outside air duct 76.

To facilitate producing supply air, the air handling unit 30 may include one or more air dampers, one or more fans 80, one or more heat exchanger coils 82, and one or more fluid valves 84. For example, the air handling unit 30 may include a first heat exchanger coil 74A, which is fluidly coupled to a boiler 22 via a first supply fluid pipe 18A and a first return fluid pipe 20A, and a second heat exchanger coil 74B, which is fluidly coupled to a chiller 24 via a second supply fluid pipe 18B and a second return fluid pipe 20B. Additionally, the air handling unit 30 may include a return air damper 78A, which is fluidly coupled between the return air duct 28 and an internal portion of the air handling unit 30, and an (e.g., first) outside air damper 78B, which is fluidly coupled between the outside air duct 76 and the internal portion of the air handling unit 30. In some embodiments, a second outside air damper 78B may be fluidly coupled in the outside air duct 76 upstream of the first outside air damper 78B such that operation of the second outside air damper 78B is controlled by the scrubber unit 70 while operation of the first outside air damper is controlled by the air handling unit 30.

In some embodiments, air handler control circuitry 86 may control operation of equipment (e.g., devices or machines) in the air handling unit 30, for example, based at least in part on target parameters (e.g., temperature, humidity, and/or contaminant level) of supply air. To facilitate controlling operation, the air handler control circuitry 86 may include a processor 88 and memory 90, for example, which selectively operate in accordance with a supervisor clock signal or an internal clock signal. In some embodiments, the memory 90 may include one or more tangible, non-transitory, computer-readable media that store instructions executable by the processor 88 and/or data to be processed by the processor 88. For example, the memory 90 may include random access memory (RAM), read only memory (ROM), flash memory, hard drives, optical discs, and/or the like. Additionally, the processor 88 may include one or more general purpose microprocessors, one or more application specific processors (ASICs), one or more field programmable logic arrays (FPGAs), or any combination thereof.

Furthermore, as in the depicted example, the air handler control circuitry 86 may be communicatively coupled to one or more sensors 92 and/or to one or more actuators 94, which is each mechanically coupled to a corresponding air damper 78 or fluid valve 84. In this manner, the air handler control circuitry 86 may receive sensor data indicative of operation parameters of the air handling unit 30. For example, based at least in part on sensor data received from a sensor 92 coupled in the supply air duct 26, the air handler control circuitry 86 may determine temperature of supply air provided to the building zone 74 and control operation of equipment in the air handling unit 30 based at least in part on difference between the sensed temperature and a temperature setpoint (e.g., target temperature of the supply air) associated with the building zone 74.

In some embodiments, air handler control circuitry 86 may control operation of equipment by communicating one or more control commands (e.g., signals) to the equipment. For example, to control temperature of supply air, the air handler control circuitry 86 may transmit control commands that instruct an electric motor to adjust (e.g., modulate) speed of the fan 80, an actuator 94 to adjust valve position of a first fluid valve 84A fluidly coupled to the first heat exchanger coil 82A, and/or an actuator 94 to adjust valve position of a second fluid valve 84B fluidly coupled to the second heat exchanger coil 82B. To control amount of return air and/or amount of outside air used to produce supply air, the air handler control circuitry 86 may transmit control commands that instruct an actuator 94 to adjust damper position of the return air damper 78A and/or an actuator 94 to adjust damper position of the (e.g., first) outside air damper 78B.

In addition to the air dampers 78 implemented in the air handling unit 30, in some embodiments, one or more air dampers may be implemented in other portions of an HVAC subsystem 12. For example, the HVAC subsystem 12 may include an exhaust air damper 96 coupled in the return air duct 28. Additionally, one or more air dampers may be implemented in the scrubber unit 70. As described above, a scrubber unit 70 may be implemented to sorb (e.g., absorb or adsorb) contaminants from return air, for example, while operating in a sorption mode. Thus, as in the depicted example, a scrubber unit 70 may be fluidly coupled to the return air duct 28. In this manner, a scrubber unit 70 may facilitate increasing amount of return air and, thus, reducing amount of outside air used to produce supply air, which at least in some instances may improve operational efficiency of the HVAC subsystem 12.

Figure 4:
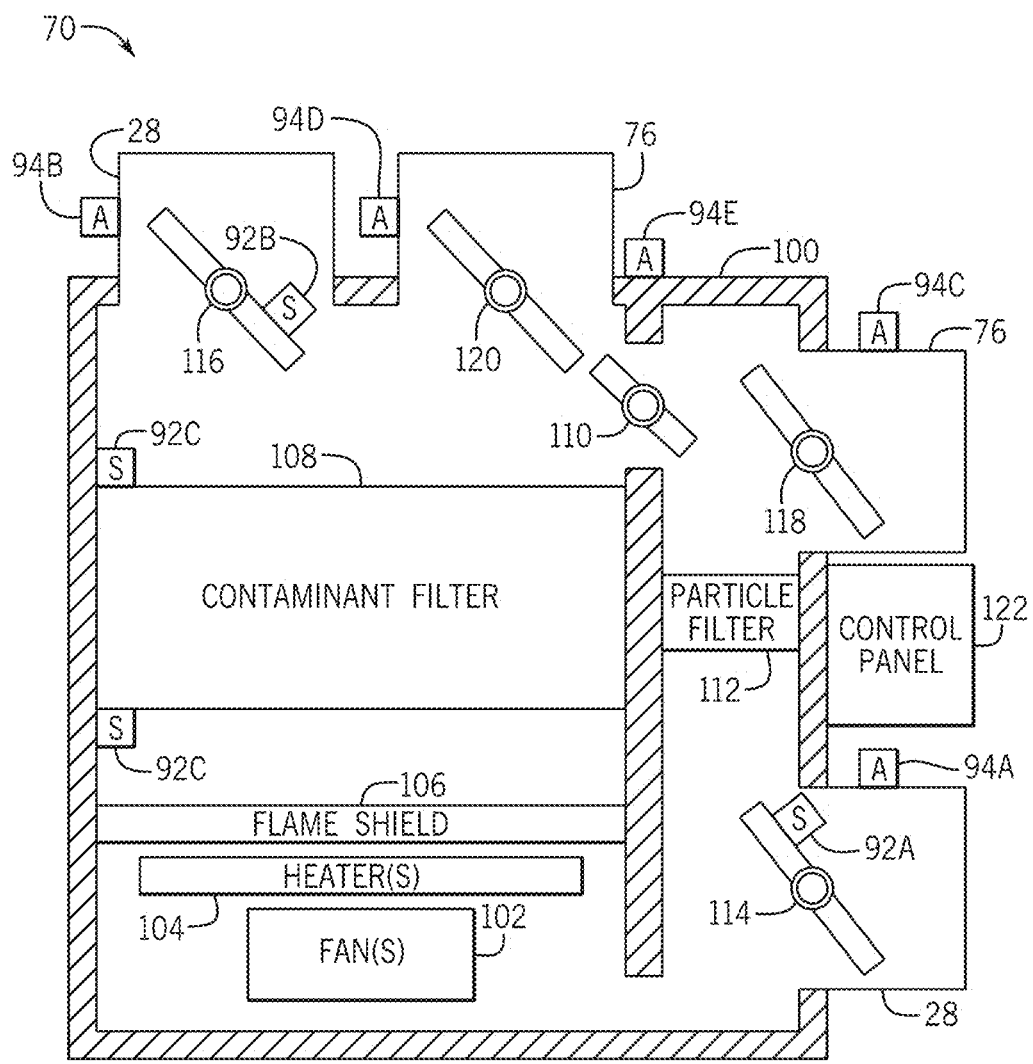
FIG. 4 is a schematic diagram of an example of the scrubber unit of FIG. 3 including a control panel, in accordance with an aspect of the present disclosure.

To help illustrate, an example of a scrubber unit 70 is shown in FIG. 4. It should be appreciated that the depicted example is merely intended to be illustrative and not limiting. In particular, specific arrangement of the components may vary between different scrubber unit 70 embodiments.

In any case, as in the depicted example, a housing 100 may enclose an internal portion of a scrubber unit 70, which includes one or more fans 102, one or more heaters 104, a flame shield 106, a contaminant filter 108, a closed loop damper 110, and a particle filter 112. Additionally, the scrubber unit 70 may include a return inlet damper 114 and a return outlet damper 116 fluidly coupled between the internal portion and a return air duct 28. Furthermore, the scrubber unit 70 may include an outside inlet damper 118 and an outside outlet damper 120 fluidly coupled between the internal portion and an outside air duct 76.

To facilitate adjusting damper position, an actuator 94 may be mechanically coupled to each air damper in the scrubber unit 70. Additionally, to facilitate monitoring operation, sensors 92 may be implemented in the scrubber unit 70. For example, a return inlet sensor 92A may be coupled on the return inlet damper 114 to facilitate determining parameters of return air flowing into the scrubber unit 70 and a return outlet sensor 92B may be coupled on the return outlet damper 116 to facilitate determining characteristics of return air flowing out of the scrubber unit 70. Additionally, one or more filter sensors 92C may facilitate determining operational parameters, such as temperature of the contaminant filter 108 and/or pressure differential across the contaminant filter 108.

In some embodiments, the contaminant filter 108 may include one or more filter cartridges, which each includes chemical compounds that sorb (e.g., absorb or adsorb) air contaminants when placed under certain environmental conditions. For example, when placed under an elevated pressure differential condition, the chemical compounds may undergo a first (e.g., forward) chemical reaction, which causes the each filter cartridge to sorb air contaminants from its surrounding environment. Additionally, when placed under an elevated temperature condition, the chemical compounds may undergo a second (e.g., reverse) chemical reaction, which causes each filter cartridge to release previously sorbed air contaminants into its surrounding environment.

Furthermore, in some embodiments, scrubber (e.g., dedicated) control circuitry may control operation of equipment (e.g., devices or machines) in the scrubber unit 70. For example, based at least in part on sensor data indicative of filter temperature, the scrubber control circuitry may pulse the heater 104 on and off to control temperature of the contaminant filter 108. Additionally, based at least in part on sensor data indicative of pressure differential, the scrubber control circuitry may pulse the fan 102 on and off to control pressure differential across the contaminant filter 108. In some embodiments, the scrubber control circuitry may be implemented in a control panel 122 formed on the housing 100 of the scrubber unit 70.

Figure 5:
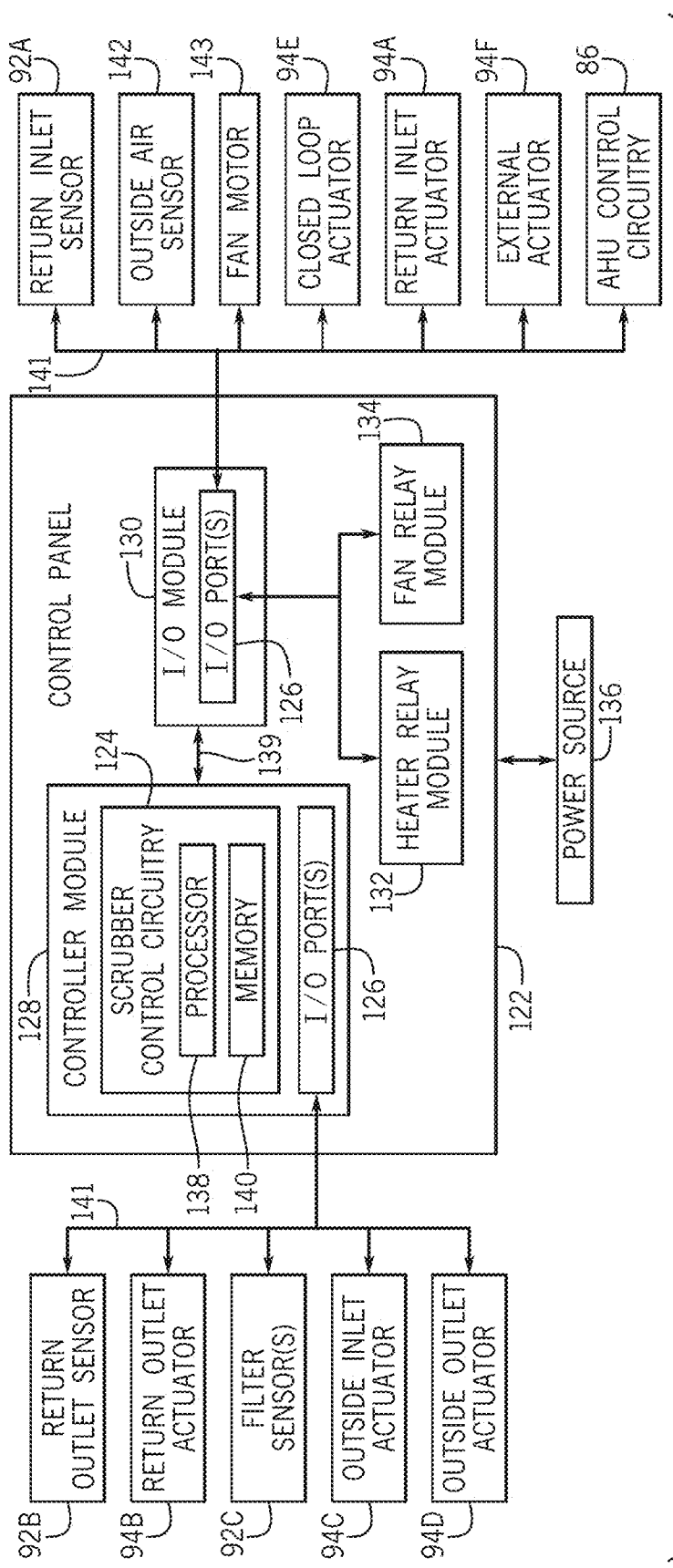
FIG. 5 is a block diagram of an example of the control panel of FIG. 4 including scrubber control circuitry, in accordance with an aspect of the present disclosure.

To help illustrate, an example of a control panel 122 that includes scrubber control circuitry 124 is shown in FIG. 5. To facilitate improving operational flexibility and/or serviceability, in some embodiments, the control panel 122 may be implemented using multiple modules, for example, each physically enclosed by a separate housing. In the depicted example, the control panel 122 includes a controller module 128, an input/output (I/O) module 130, a heater relay module 132, and a fan relay module 134.

When implemented modularly, serviceability of the control panel 122 may be improved, for example, by enabling a faulty module to be replaced with little or no effect on other modules in the control panel 122. As an illustrative example, the heater relay module 132 may be removed from the control panel 122 when identified as faulty and a replacement heater relay module 132 may be connected while the controller module 128, the I/O module 130, and the fan relay module 134 remain connected in the control panel 122. In other words, modularly implementing the control panel 122 may facilitate targeting serving to relevant portions, for example, instead of the control panel 122 as a whole.

Moreover, a modular implementation may facilitate improving operational flexibility, for example, by enabling functionality provided by the control panel 122 to be adaptively (e.g., dynamically) adjusted. As an illustrative example, the scrubber control circuitry 124 may communicate data (e.g., sensor data, state data, and/or control commands) via input/output (I/O) ports 126. However, in some embodiments, number of I/O ports 126 implemented on the controller module 128 may be limited, for example, due to a balance between physical size and control application compatibility.

Thus, as in the depicted example, the control panel 122 may be implemented with a separate input/output (I/O) module 130, which includes additional I/O ports 126. By communicatively coupling the I/O module 130 to the controller module 128 via a communication bus 139 (e.g., a sensor actuator bus and/or a field controller bus), number of I/O ports 126 accessible by the scrubber control circuitry 124 may be increased, which at least in some instances may facilitate improving control granularity and/or control transparency. For example, via an I/O port 126 in the I/O module 130, the scrubber control circuitry 124 may instruct a switching device (e.g., relay or contactor) in the fan relay module 134 to electrically connect or disconnect the fan 102 and a power source 136. Nevertheless, it should be appreciated that the depicted example is merely intended to be illustrative and not limiting. For example, in other embodiments, the controller module 128 may be implemented with sufficient number of I/O ports 126 such that a separate I/O module 130 is obviated.

In any case, to facilitate controlling operation, the scrubber control circuitry 124 may include a processor 138 and memory 140, for example, which selectively operate in accordance with a supervisor clock signal or an internal clock signal. In some embodiments, the memory 140 may include one or more tangible, non-transitory, computer-readable media that store instructions executable by the processor 138 and/or data to be processed by the processor 138. For example, the memory 140 may include random access memory (RAM), read only memory (ROM), flash memory, hard drives, optical discs, and/or the like. Additionally, the processor 138 may include one or more general purpose microprocessors, one or more application specific processors (ASICs), one or more field programmable logic arrays (FPGAs), or any combination thereof.

To operate the scrubber control circuitry 124, electrical power may be supplied from the power source 136 to the control panel 122. Since the power source 136 may also supply electrical power to other electrical components, in some embodiments, the power source 136 may be an alternating current (AC) power source. To facilitate improving operational flexibility, in some embodiments, the controller module 128 may operate using AC electrical power, for example, by internally converting the AC electrical power to direct current (DC) electrical power. In other words, as an illustrative example, the control module 128 may operate using twenty-four volt AC electrical power output from a transformer that receive one-hundred twenty volt AC electrical power from the power source 136 (e.g., power grid).

In any case, as described above, the scrubber control circuitry 124 may communicate with equipment (e.g., sensor and/or actuators) in the scrubber unit 70 via the I/O ports 126. For example, the scrubber control circuitry 124 may receive sensor data indicative of return air parameters (e.g., temperature, humidity, and/or contaminant level) from the return inlet sensor 92A and/or the return outlet sensor 92B via wires 141 coupled to the I/O ports 126. Additionally, the scrubber control circuitry 124 may receive sensor data from one or more filter sensors 92C indicative of temperature and/or pressure differential across the contaminant filter 108 via wires 141 coupled to the I/O ports 126. Furthermore, the scrubber control circuitry 124 may receive parameter (e.g., state) data from a fan motor 143 indicative of operational parameters, such as speed of a corresponding fan 102, via wires 141 coupled to the I/O ports 126.

In addition to communicating parameter data with the fan motor 143, the scrubber control circuitry 124 may communicate control commands, for example, that instruct the fan motor 143 to adjust (e.g., modulate) speed of the fan 102. Additionally or alternatively, the scrubber control circuitry 124 may control fan speed by pulsing the fan 102 on and off, for example, by communicating control commands that instruct a switching device in the fan relay module 134 to selectively connect and disconnect electrical power. In a similar manner, the scrubber control circuitry 124 may control operation of the heater 104 by communicating control commands that instruct a switching device in the heater relay module 132 to selectively connect and disconnect electrical power, for example, to pulse the heater 104 on and off. Furthermore, the scrubber control circuitry 124 may communicate control commands to a return inlet actuator 94A mechanically coupled to the return inlet damper 114, a return outlet actuator 94B mechanically coupled to the return outlet damper 116, an outside inlet actuator 94C mechanically coupled to the outside inlet damper 118, an outside outlet actuator 94D mechanically coupled to the outside outlet damper 120, and/or a closed loop actuator 94E mechanically coupled to the closed loop damper 110, for example, that instructs an actuator 94 to adjust position of a corresponding damper.

In some embodiments, the scrubber control circuitry 124 may additionally communicate with equipment, sensors, and/or other electronic devices external from the scrubber unit 70. For example, the scrubber control circuitry 124 may communicate control commands to an external actuator 94F mechanically coupled to the outside air damper 78B in the air handling unit 30. The control commands may instruct the external actuator 94F to adjust damper position of the outside air damper 78B, thereby enabling the scrubber control circuitry 124 to control amount of outside air available to the air handling unit 30 for producing supply air.

In some embodiments, damper position of the outside air damper 78B may be controlled based at least in part on operational state of the air handling unit 30 and/or parameters (e.g., temperature, humidity, and/or contaminant level) of outside air. To facilitate determining outside air parameters, in some embodiments, the scrubber control circuitry 124 may be communicatively coupled to an outside air sensor 142, which outputs sensor data indicative of the outside air parameters to the scrubber control circuitry 124. Additionally or alternatively, the scrubber control circuitry 124 may determine parameters of outside air based at least in part on weather information, for example, received from the building management system 34 or a remote data source 66. In any case, the scrubber control circuitry 124 may operate in this manner to control operation of the scrubber unit 70 as well as other portions of the HVAC subsystem 12, such as the air handling unit 30.

Figure 6:
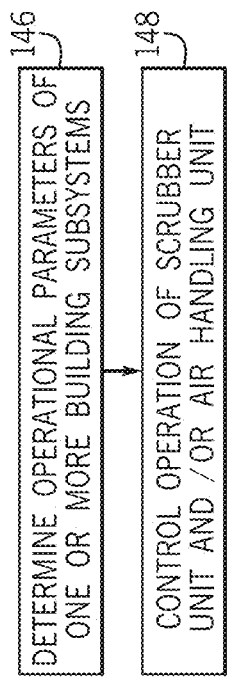
FIG. 6 is a flow diagram of a process for operating the scrubber control circuitry of FIG. 5, in accordance with an aspect of the present disclosure.

To help illustrate, an example of a process 144 for operating scrubber control circuitry 124 is described in FIG. 6. Generally, the process 144 includes determining a controlling clock signal (process block 145), determining operational parameters of one or more building subsystems (process block 146), and controlling operation of a scrubber unit and/or an air handling unit (process block 148). In some embodiments, the process 144 may be implemented at least in part by executing instructions stored in tangible, non-transitory, computer-readable media, such as memory 140, using processing circuitry, such as processor 138.

Accordingly, in some embodiments, scrubber control circuitry 124 may determine a controlling clock signal (process block 145). As described above, in some embodiments, scrubber control circuitry 124 may generate an internal (e.g., local) clock signal to facilitate improving implementation flexibility, for example, by enabling a corresponding HVAC subsystem 12 and/or scrubber unit 70 to be deployed as a standalone system. Additionally, as described above, a building management system 34 may supply a supervisor (e.g., global) clock signal to the HVAC subsystem 12, for example, to facilitate coordinating operation of HVAC subsystem 12 with the building management system 34 and/or another building subsystem.

Thus, in some embodiments, the scrubber control circuitry 124 may determine the controlling clock signal by selecting between an internal clock signal and a supervisor control signal. To facilitate its selection, in some embodiments, the scrubber control circuitry 124 may determine whether a corresponding scrubber unit 70 and/or HVAC subsystem 12 is deployed as a standalone system or an integrated system, which includes a building management system 34. For example, when a supervisor control signal is received, the scrubber control circuitry 124 may determine that the corresponding scrubber unit 70 and/or HVAC subsystem 12 is deployed as an integrated system and, thus, select the supervisor control signal as the controlling clock signal. On the other hand, when a supervisor control signal is not received, the scrubber control circuitry 124 may determine that the corresponding scrubber unit 70 and/or HVAC subsystem 12 is deployed as a standalone system and, thus, select the internal control signal as the controlling clock signal. In some embodiments, the scrubber control circuitry 124 may nevertheless select the local clock signal as the controlling clock signal even when a supervisor control signal is received, for example, when scrubber control circuitry 124 otherwise determines that the corresponding scrubber unit 70 and/or HVAC subsystem 12 is not deployed as an integrated system.

Based at least in part on the controlling clock signal, the scrubber control circuitry 124 may determine operational parameters associated with an HVAC subsystem 12 and/or other building subsystems (process block 146). In some embodiments, operational parameters associated with an HVAC subsystem 12 may include operational parameters of a scrubber unit 70 in the HVAC subsystem 12, operational parameters of an air handling unit 30 in the HVAC subsystem 12, and/or parameters of air (e.g., supply air, return air, and/or outside air) flowing through the HVAC subsystem 12. For example, the scrubber control circuitry 124 may determine return air parameters based at least in part on sensor data received from the return inlet sensor 92A and/or the return outlet sensor 92B.

Based at least in part on sensor data received from the return inlet sensor 92A and/or the return outlet sensor 92B, the scrubber control circuitry 124 may additionally or alternatively determine operational parameters of the scrubber unit 70. For example, the scrubber control circuitry 124 may determine filtering efficiency of the contaminant filter 108 based at least in part on contaminant level indicated by the return inlet sensor 92A compared to contaminant level indicated by the return outlet sensor 92B. Additionally, the scrubber control circuitry 124 may determine temperature and/or pressure drop across the contaminant filter 108 based at least in part on sensor data indicated by one or more filter sensor 92C. In some embodiments, the scrubber control circuitry 124 may additionally or alternatively receive an indication of other operational parameters associated with the HVAC subsystem 12, such as air handling unit 30 operational status, from the air handler control circuitry 86.

As described above, in some embodiments, operation of the HVAC subsystem 12 may be controlled based at least in part on operational parameters associated with other building subsystems, for example, to facilitate improving operational efficiency by reducing power consumption resulting from operation of the HVAC subsystem 12. In some embodiments, the scrubber control circuitry 124 may receive an indication of operational parameters directly from another building subsystem. Additionally or alternatively, the scrubber control circuitry 124 may receive an indication of operational parameters from the building management system 34. For example, the building management system 34 may determine occupancy (e.g., state) data indicative of occupancy status of a building zone 74 based at least in part on processing of sensor (e.g., image) data captured by the security subsystem 40 and communicate the occupancy data to the scrubber control circuitry 124.

Based at least in part on the operational parameters and the controlling clock signal, the scrubber control circuitry 124 may control operation of at least a portion of the HVAC subsystem 12, which includes an air handling unit 30 and/or a scrubber unit 70 (process block 148). As described above, in some embodiments, the scrubber control circuitry 124 may control operation of an air handling unit 30 by communicating control commands that instruct the external actuator 94F to adjust damper position of an outside air damper 78B in the air handling unit 30. In this manner, the scrubber control circuitry 124 may control amount of outside air available to the air handling unit 30 for producing supply air.

To control operation of a scrubber unit 70, the scrubber control circuitry 124 may communicate control commands that instruct the return inlet actuator 94A to adjust damper position of the return inlet damper 114 and/or that instruct the outside inlet actuator 94C to adjust damper position of the outside inlet damper 118. In this manner, the scrubber control circuitry 124 may control source and/or flow of air into the internal portion of the scrubber unit 70. Additionally, the scrubber control circuitry 124 may communicate control commands that instruct the return outlet actuator 94B to adjust damper position of the return outlet damper 116 and/or that instruct the outside outlet actuator 94D to adjust damper position of the outside outlet damper 120. In this manner, the scrubber control circuitry 124 may control sink and/or flow of air out from the internal portion of the scrubber unit 70.

To control flow of air within the internal portion of the scrubber unit 70, the scrubber control circuitry 124 may communicate control commands that instruct the closed loop actuator 94E to adjust damper position of the closed loop damper 110 and/or that instruct the fan motor 143 to adjust (e.g., modulate) speed of the fan 102. Additionally or alternatively, by communicating control commands that instruct the fan motor 143 to adjust fan speed, the scrubber control circuitry 124 may control pressure drop across the contaminant filter 108. To control temperature of the contaminant filter 108, the scrubber control circuitry 124 may communicate control commands that instruct a switching device in the heater relay module 132 to turn on the heater 104 by connecting electrical power or to turn off the heater 104 by disconnecting electrical power. For example, in this manner, the heater 104 may be pulsed on and off to control temperature of the contaminant filter 108 based at least in part on a target regeneration temperature.

Figure 7:
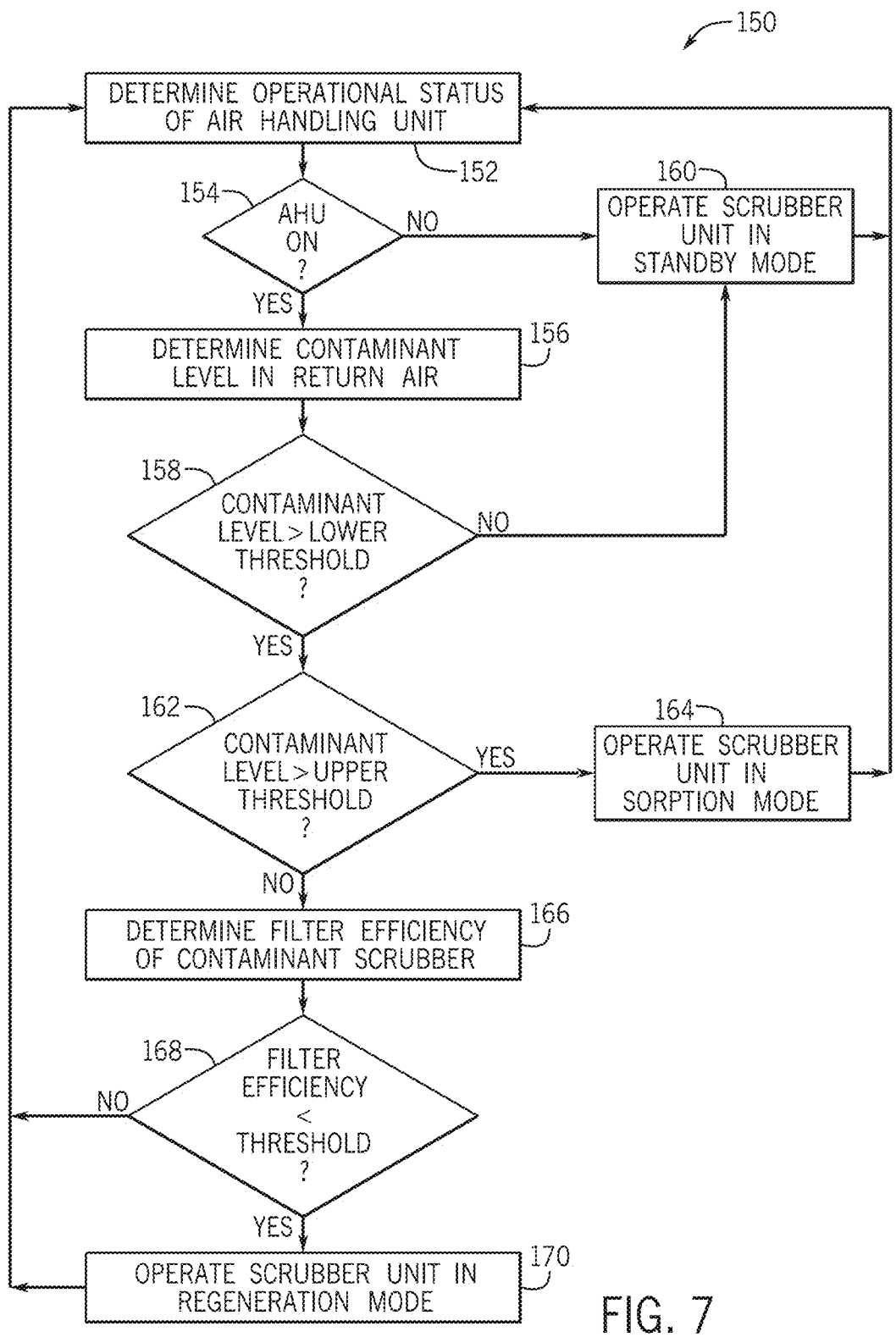
FIG. 7 is a flow diagram of a process for controlling operation of the scrubber unit of FIG. 4, in accordance with an aspect of the present disclosure.

To help further illustrate, an example of a process 150 for controlling operation of a scrubber unit 70 is described in FIG. 7. Generally, the process 150 includes determining operational status of an air handling unit (process block 152), determining whether the operational status of the air handling unit is on (decision block 154), determining contaminant level in return air when the air handling unit is on (process block 156), determining whether the contaminant level is greater than a lower threshold (decision block 158), and operating the scrubber unit in a standby mode when the air handling unit is not on and/or when the contaminant level is not greater than the lower threshold (process block 160). When the contaminant level is greater than the lower threshold, the process 150 includes determining whether the contaminant level is greater than an upper threshold (decision block 162) and operating the scrubber unit in a sorption mode when the contaminant level is greater than the upper threshold (process block 164). When the contaminant level is not greater than the upper threshold, the process 150 includes determining filtering efficiency of the scrubber unit (process block 166), determining whether the filtering efficiency is less than an efficiency threshold (decision block 168), and operating the scrubber unit in a regeneration mode when the filtering efficiency is less than the efficiency threshold (process block 170). In some embodiments, the process 150 may be implemented at least in part by executing instructions stored in tangible, non-transitory, computer-readable media, such as memory 140, using processing circuitry, such as processor 138.

Accordingly, in some embodiments, scrubber control circuitry 124 may determine operational status of an air handling unit 30, for example, implemented in the same HVAC subsystem 12 as a corresponding scrubber unit 70 (process block 152). As described above, in some embodiments, the scrubber control circuitry 124 may receive an indication of operational status and/or other operational parameters associated with an air handling unit 30 from corresponding air handler control circuitry 86. Additionally or alternatively, the scrubber control circuitry 124 may receive an indication of the operational parameters associated with the air handling unit 30 from the building management system 34. For example, the scrubber control circuitry 124 may determine operational status of an air handling unit 30 based at least in part on received parameter (e.g., state) data, which indicates whether the air handling unit 30 in an on state or an off state.

When the air handling unit 30 is on, the scrubber control circuitry 124 may determine contaminant level present in return air (process block 156) and determine whether the contaminant level is greater than a contaminant level lower threshold (decision block 158). As described above, in some embodiments, the scrubber control circuitry 124 may determine contaminant level present in return air based at least in part on sensor data received from the return inlet sensor 92A and/or sensor data received from the return outlet sensors 92B. Additionally, in some embodiments, the contaminant level lower threshold may predetermined and stored in a tangible, non-transitory, computer-readable medium, such as memory 140. Thus, in such embodiments, the scrubber control circuitry 124 may retrieve the contaminant level lower threshold from the tangible, non-transitory, computer-readable medium and compare the contaminant level present in return air with the contaminant level lower threshold. Furthermore, in some embodiments, the contaminant level lower threshold may be set less based at least in part on target contaminant level of supply air, for example, such that the contaminant lower threshold is less than or equal to the target contaminant level.

Accordingly, when the contaminant level is not greater than the contaminant level lower threshold and/or the air handling unit 30 is not on, the scrubber control circuitry 124 may determine that use of return air to produce supply air is not limited by return air contaminant level and, thus, instruct the scrubber unit 70 to operate in a standby mode (process block 160). While operating in the standby mode, at least a portion of return air may flow through the scrubber unit 70 without the scrubber unit 70 actively introducing a pressure differential across its contaminant filter 108. In this manner, the scrubber control circuitry 124 may continue monitoring parameters of return air using the return inlet sensor 92A and/or the return outlet sensor 92B while the scrubber unit 70 is not actively sorbing or releasing previously sorbed air contaminants. At least in some instances, this may facilitate reducing implementation associated cost of an HVAC subsystem 12, for example, by obviating implementation of additional sensors 92 for determination of return air parameters.

Figure 8:
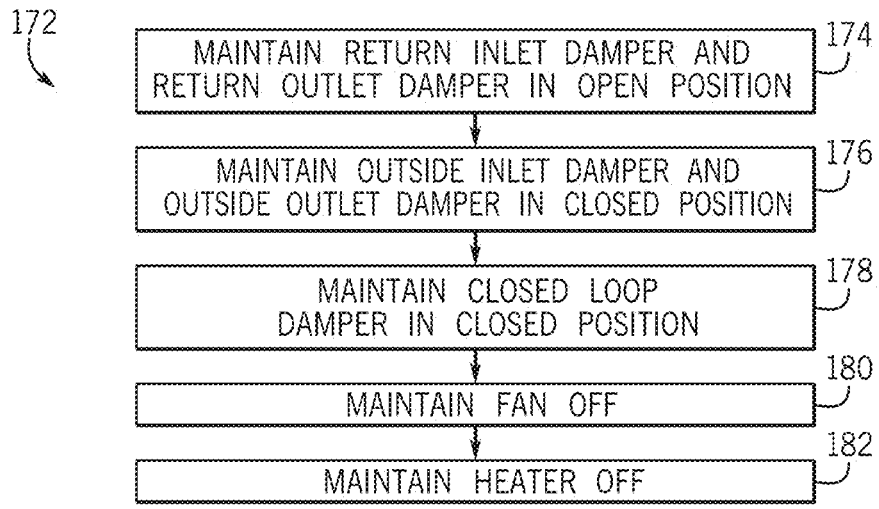
FIG. 8 is a flow diagram of a process for operating the scrubber unit of FIG. 4 in a standby mode, in accordance with an aspect of the present disclosure.

To help illustrate, an example of a process 172 for operating a scrubber unit 70 in a standby mode is described in FIG. 8. Generally, the process 172 includes maintaining a return inlet damper and a return outlet damper in an open position (process block 174), maintaining an outside inlet damper and an outside outlet damper in a closed position (process block 176), maintaining a closed loop damper in a closed position (process block 180), maintaining a fan off (process block 180), and maintaining a heater off (process block 182). In some embodiments, the process 172 may be implemented at least in part by executing instructions stored in tangible, non-transitory, computer-readable media, such as memory 140, using processing circuitry, such as processor 138.

Accordingly, in some embodiments, scrubber control circuitry 124 may control operation of a scrubber unit 70 such that its return inlet damper 114 and return outlet damper 116 are both maintained in an at least partially open position (process block 174). While operating in the standby mode, in some embodiments, damper position of the return inlet damper 114 and/or the return outlet damper 116 may be controlled based at least in part on a target standby damper position. For example, the scrubber control circuitry 124 may instruct the return inlet actuator 94A to transition to and/or maintain damper position of the return inlet damper 114 in an at least partially open position, thereby enabling return air to flow from the return air duct 28 into the internal portion of the scrubber unit 70. Similarly, the scrubber control circuitry 124 may instruct the return outlet actuator 94B to transition to and/or maintain damper position of the return outlet damper 116 in an at least partially open position, thereby enabling return air to flow from the internal portion of the scrubber unit 70 back into the return air duct 28.

Additionally, the scrubber control circuitry 124 may control operation of the scrubber unit 70 such that its outside inlet damper 118 and its outside outlet damper 120 are both maintained in a fully closed position (process block 176). For example, the scrubber control circuitry 124 may instruct the outside inlet actuator 94C to transition to and/or maintain the outside inlet damper 118 in a fully closed position, thereby blocking outside air from flowing into the internal portion of the scrubber unit 70. Similarly, the scrubber control circuitry 124 may instruct the outside outlet actuator 94D to transition to and/or maintain the outside outlet damper 120 in a fully closed position, thereby blocking flow of return air from the internal portion of the scrubber unit 70 to an outside air duct 76.

Furthermore, the scrubber control circuitry 124 may control operation of the scrubber unit 70 such that its closed loop damper 110 is maintained in a fully closed position (process block 178). For example, the scrubber control circuitry 124 may instruct the closed loop actuator 94E to transition to and/or maintain the closed loop damper 110 in a fully closed position. In this manner, the scrubber control circuitry 124 may reduce likelihood of return air being trapped within the internal portion of scrubber unit 70. At least in some instances this may facilitate improving accuracy of return air parameter determination by the return inlet sensor 92A and/or the return outlet sensor 92B, for example, when return air parameters vary significantly (e.g., noticeably) over time.

The scrubber control circuitry 124 may also control operation of the scrubber unit 70 such that its fan 102 is maintained in an off state (process block 180) and such that its heater 104 is maintained in an off state (process block 182). To maintain the fan 102 off, in some embodiments, the scrubber control circuitry 124 may instruct the fan motor 143 to maintain speed of the fan 102 at zero. Additionally or alternatively, the scrubber control circuitry 124 may instruct a switching device in the fan relay module 134 to switch to and/or maintain an open position, thereby disconnecting electrical power from the fan 102. Similarly, in some embodiments, the scrubber control circuitry 124 may maintain the heater 104 off by instructing a switching device in the heater relay module 132 to switch to and/or maintain an open position, thereby disconnecting electrical power from the heater 104. In this manner, a scrubber unit 70 may operate in the standby mode to facilitate continued monitoring of return air parameters using its return inlet sensor 92A and/or return outlet sensor 92B, which at least in some instances may facilitate reducing implementation associated cost of an HVAC subsystem 12, for example, by obviating implementation of additional sensors for determination of return air parameters.

Returning to the process 150 of FIG. 7, when contaminant level present in return air is greater than the contaminant level lower threshold, the scrubber control circuitry 124 may determine whether the contaminant level is greater than a contaminant level upper threshold (decision block 162). As with the contaminant level lower threshold, in some embodiments, the contaminant level upper threshold may predetermined and stored in a tangible, non-transitory, computer-readable medium, such as memory 140. Thus, in such embodiments, the scrubber control circuitry 124 may retrieve the contaminant level upper threshold from the tangible, non-transitory, computer-readable medium and compare the contaminant level present in return air with the contaminant level upper threshold. Furthermore, in some embodiments, the contaminant level upper threshold may be set based at least in part on target contaminant level of supply air, for example, such that the contaminant level upper threshold is at or above the target contaminant level.

Accordingly, when the contaminant level is greater than the contaminant level upper threshold, the scrubber control circuitry 124 may determine that use of return air to produce supply air is limited by return air contaminant level and, thus, instruct the scrubber unit 70 to operate in a sorption mode (process block 164). While operating in the sorption mode, the scrubber unit 70 may actively introduce a pressure differential across its contaminant filter 108, which causes chemical compounds in the contaminant filter 108 to sorb (e.g., adsorb or absorb) air contaminants from return air flowing through the scrubber unit 70. In this manner, the scrubber unit 70 may facilitate reducing contaminant level present in return air, which at least in some instances may facilitate improving operational efficiency of an HVAC subsystem 12, for example, by enabling supply air to be produced using more return air and/or less outside air.

Figure 9:
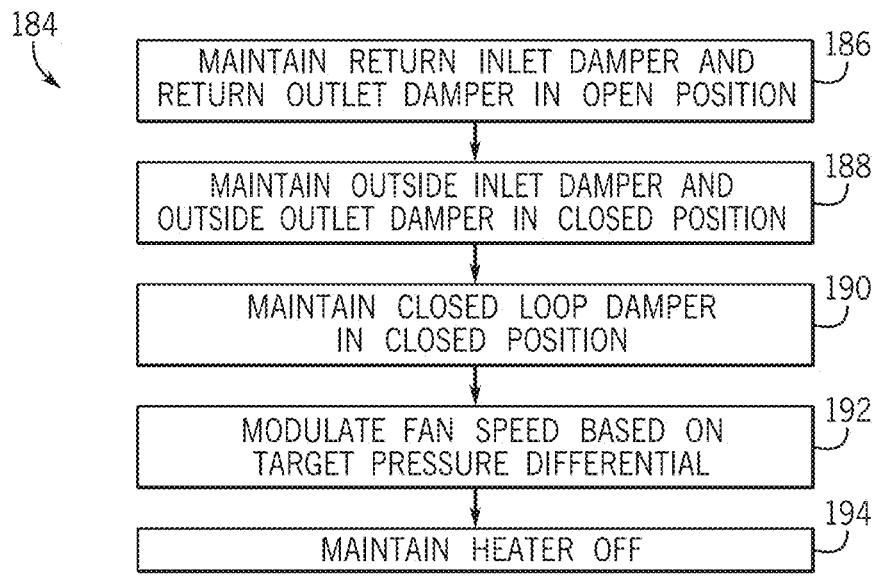
FIG. 9 is a flow diagram of a process for operating the scrubber unit of FIG. 4 in a sorption mode, in accordance with an aspect of the present disclosure.

To help illustrate, an example of a process 184 for operating a scrubber unit 70 in a sorption mode is described in FIG. 9. Generally, the process 184 includes maintaining a return inlet damper and a return outlet damper in an open position (process block 186), maintaining an outside inlet damper and an outside outlet damper in a closed position (process block 188), maintaining a closed loop damper in a closed position (process block 190), modulating fan speed based on a target pressure differential (process block 192), and maintaining a heater off (process block 194). In some embodiments, the process 184 may be implemented at least in part by executing instructions stored in tangible, non-transitory, computer-readable media, such as memory 140, using processing circuitry, such as processor 138.

Accordingly, in some embodiments, scrubber control circuitry 124 may control operation of a scrubber unit 70 such that its return inlet damper 114 and its return outlet damper 116 are both maintained in an at least partially open position (process block 186). While operating in the sorption mode, in some embodiments, damper position of the return inlet damper 114 and/or the return outlet damper 116 may be controlled based at least in part on a target sorption damper position. For example, the scrubber control circuitry 124 may instruct the return inlet actuator 94A to transition to and/or maintain damper position of the return inlet damper 114 in an at least partially open position, thereby enabling return air to flow from the return air duct 28 into the internal portion of the scrubber unit 70. Similarly, the scrubber control circuitry 124 may instruct the return outlet actuator 94B to transition to and/or maintain damper position of the return outlet damper 116 in an at least partially open position, thereby enabling return air to flow from the internal portion of the scrubber unit 70 back into the return air duct 28.

Additionally, the scrubber control circuitry 124 may control operation of the scrubber unit 70 such that its outside inlet damper 118 and its outside outlet damper 120 are both maintained in a fully closed position (process block 188). For example, the scrubber control circuitry 124 may instruct the outside inlet actuator 94C to transition to and/or maintain the outside inlet damper 118 in a fully closed position, thereby blocking outside air from flowing into the internal portion of the scrubber unit 70. Similarly, the scrubber control circuitry 124 may instruct the outside outlet actuator 94D to transition to and/or maintain the outside outlet damper 120 in a fully closed position, thereby blocking flow of return air from the internal portion of the scrubber unit 70 to an outside air duct 76.

Furthermore, the scrubber control circuitry 124 may control operation of the scrubber unit 70 such that the closed loop damper 110 is maintained in a fully closed position (process block 190). For example, when the closed loop damper 110 is in an at least partially open position, the scrubber control circuitry 124 may instruct the closed loop actuator 94E to transition to and/or maintain the closed loop damper 110 in a fully closed position. In this manner, the scrubber control circuitry 124 may reduce likelihood of filtered return air being re-circulated through the internal portion of scrubber unit 70, which at least in some instances may facilitate improving operational stability, for example, due to contaminant level in return air gradually changing over time.

As described above, in some embodiments, the contaminant filter 108 in a scrubber unit 70 may be implemented (e.g., designed) to sorb air contaminants under specific temperature and/or pressure differential conditions. For example, the contaminant filter 108 may sorb air contaminants when its temperature is below a temperature threshold and the pressure differential across the contaminant filter 108 is above a pressure threshold. Thus, while operating in the sorption mode, the scrubber control circuitry 124 may control operation of the scrubber unit 70 such that the heater 104 is maintained in an off state (process block 194). To maintain the heater 104 off, in some embodiments, the scrubber control circuitry 124 may instruct a switching device in the heater relay module 132 to switching to and/or maintain an open position, thereby disconnecting electrical power from the heater 104.

Additionally, the scrubber control circuitry 124 may also control operation of the fan 102 to actively introduce a pressure differential across the contaminant filter 108 based at least in part on a target sorption pressure differential (process block 192). For example, when pressure differential across the contaminant filter 108 resulting from maintaining the fan 102 off is less than the target sorption pressure differential, the scrubber control circuitry 124 may instruct the fan motor 143 to actuate (e.g., rotate) the fan 102, thereby forcing air through and, thus, increasing the pressure differential across the contaminant filter 108. Generally, the pressure differential across the contaminant filter 108 may vary based at least in part on speed at which the fan 102 rotates. To facilitate sorbing air contaminants, in some embodiments, the target sorption pressure differential may set based at least in part on the pressure threshold, for example, such that the target sorption pressure differential includes a range of pressure differentials at or above the pressure threshold. In this manner, a scrubber unit 70 may operate in the sorption mode to facilitate reducing contaminant level present in return air, which at least in some instances may facilitate improving operational efficiency of an HVAC subsystem 12, for example, by increasing amount of return air and/or reducing amount of outside air used to produce supply air.

Returning to the process 150 of FIG. 7, when the contaminant level present in return air is not greater than the contaminant level upper threshold, the scrubber control circuitry 124 may determine filtering efficiency of the contaminant filter 108 in the scrubber unit 70 (process block 166). As described above, in some embodiments, filtering efficiency of a contaminant filter 108 may be determined based at least in part on contaminant level present before passing through the contaminant filter 108 and contaminant level present after passing through the contaminant filter 108. Thus, in such embodiments, the scrubber control circuitry 124 may determine filtering efficiency based at least in part on sensor data received from the return inlet sensor 92A and sensor data received from the return outlet sensor 92B. For example, the scrubber control circuitry 124 may determine the filtering efficiency as a ratio of contaminant level present in return air flowing into the scrubber unit 70 and amount of contaminants sorbed from the return air (e.g., input contaminant level minus output contaminant level).

As a contaminant filter 108 continues to sorb air contaminants, in some embodiments, filtering efficiency of the contaminant filter 108 may gradually decrease, thereby reducing amount of air contaminants sorbed during subsequent operation. To facilitate improving filtering efficiency provided during subsequent operation, the scrubber control circuitry 124 may determine whether the current filtering efficiency is less than a filtering efficiency threshold (decision block 168) and instruct the scrubber unit 70 to operate in a regeneration mode when the current filtering efficiency is less than the filtering efficiency threshold (process block 170). In some embodiments, the filtering efficiency threshold may predetermined and stored in a tangible, non-transitory, computer-readable medium, such as memory 140. Thus, in such embodiments, the scrubber control circuitry 124 may retrieve the filtering efficiency threshold from the tangible, non-transitory, computer-readable medium and compare the current filtering efficiency with the filtering efficiency threshold. Additionally, by operating in a regeneration mode, previously sorbed air contaminants may be vented (e.g., exhausted and/or released) from the scrubber unit 70, which at least in some instances may facilitate improving filtering efficiency and, thus, amount of air contaminants sorbed during subsequent operation.

Figure 10:
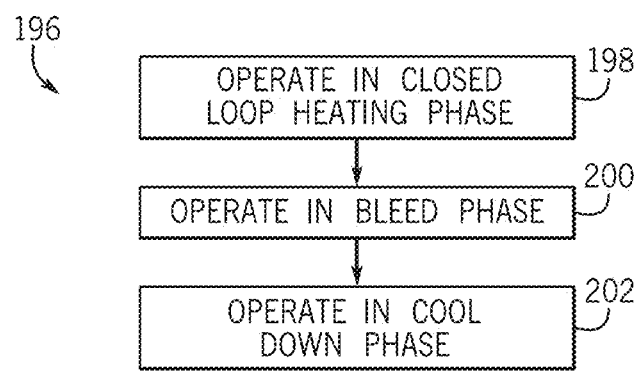
FIG. 10 is a flow diagram of a process for operating the scrubber unit of FIG. 4 in a regeneration mode, in accordance with an aspect of the present disclosure.

To help illustrate, an example of a process 196 for operating a scrubber unit 70 in a regeneration mode is described in FIG. 10. Generally, the process 196 includes operating in a closed loop heating phase (process block 198), operating in a bleed phase (process block 200), and operating in a cool down phase (process block 202). In some embodiments, the process 196 may be implemented at least in part by executing instructions stored in tangible, non-transitory, computer-readable media, such as memory 140, using processing circuitry, such as processor 138.

Accordingly, in some embodiments, scrubber control circuitry 124 may instruct a scrubber unit 70 to operate in the closed loop heating phase (process block 198). As described above, in some embodiments, a contaminant filter 108 may release previously sorbed air contaminants when its temperature is above a temperature threshold. Thus, when temperature of return air is less than the temperature threshold, the scrubber control circuitry 124 may control operation of the scrubber unit 70 to increase temperature of the contaminant filter 108 above the temperature threshold during the closed loop heating phase.

Figure 11:
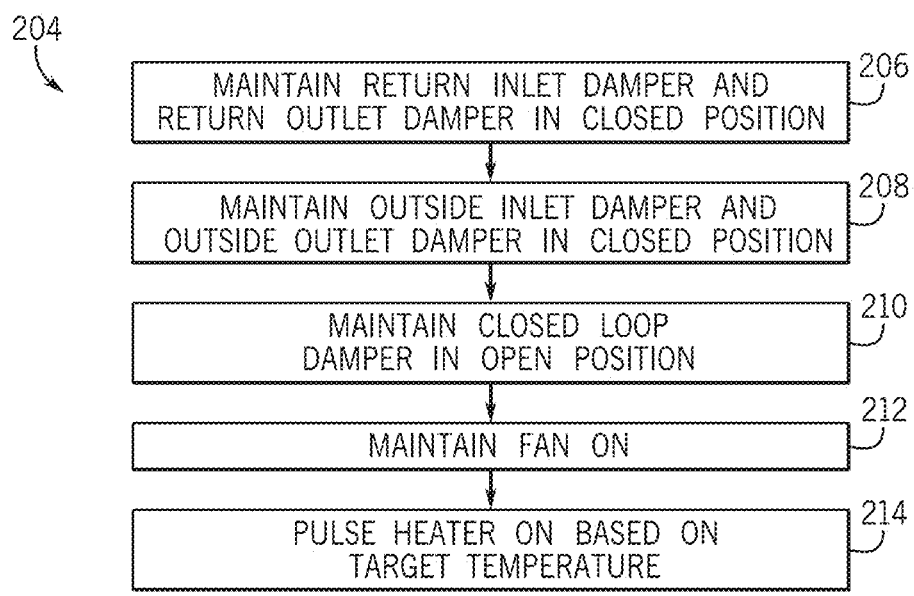
FIG. 11 is a flow diagram of a process for operating the scrubber unit of FIG. 4 in a closed loop heating phase of the regeneration mode, in accordance with an aspect of the present disclosure.

To help illustrate, an example of a process 204 for operating a scrubber unit 70 in a closed loop heating phase of a regeneration mode is described in FIG. 11. Generally, the process 204 includes maintaining a return inlet damper and a return outlet damper in a closed position (process block 206), maintaining an outside inlet damper and an outside outlet damper in a closed position (process block 208), maintaining a closed loop damper in an open position (process block 210), maintaining a fan on (process block 212), and pulsing a heater on based on a target temperature (process block 214). In some embodiments, the process 204 may be implemented at least in part by executing instructions stored in tangible, non-transitory, computer-readable media, such as memory 140, using processing circuitry, such as processor 138.

Accordingly, in some embodiments, scrubber control circuitry 124 may control operation of a scrubber unit 70 such that its return inlet damper 114 and return outlet damper 116 are both maintained in a fully closed position (process block 206). For example, the scrubber control circuitry 124 may instruct the return inlet actuator 94A to transition to and/or maintain the return inlet damper 114 in a fully closed position, thereby blocking flow of return air into the internal portion of the scrubber unit 70. Similarly, the scrubber control circuitry 124 may instruct the return outlet actuator 94B to transition to and/or maintain the return outlet damper 116 in a fully closed position, thereby blocking flow of air out from the internal portion of the scrubber unit 70 to a return air duct 28.

Additionally, the scrubber control circuitry 124 may control operation of the scrubber unit 70 such that its outside inlet damper 118 and its outside outlet damper 120 are both maintained in a fully closed position (process block 208). For example, the scrubber control circuitry 124 may instruct the outside inlet actuator 94C to transition to and/or maintain the outside inlet damper 118 in a fully closed position, thereby blocking outside air from flowing into the internal portion of the scrubber unit 70. Similarly, the scrubber control circuitry 124 may instruct the outside outlet actuator 94D to transition to and/or maintain the outside outlet damper 120 to a fully closed position, thereby blocking flow of air from the internal portion of the scrubber unit 70 to an outside air duct 76.

Furthermore, the scrubber control circuitry 124 may control operation of the scrubber unit 70 such that its closed loop damper 110 is maintained in an at least partially open position (process block 210). While operating in the standby mode, in some embodiments, damper position of the closed loop damper 110 may be controlled based at least in part on a target closed loop heating damper position. For example, the scrubber control circuitry 124 may instruct the outside inlet actuator 94C to transition to and/or maintain the outside inlet damper 118 in a fully (e.g., 100%) open position, thereby enabling air circulation within the internal portion of the scrubber unit 70.

To facilitate controlling air circulation within the scrubber unit 70, the scrubber control circuitry 124 may control operation the scrubber unit such that its fan 102 is maintained on (process block 212). For example, the scrubber control circuitry 124 may instruct the fan motor 143 to maintain the fan 102 at a target (e.g., maximum or substantially constant) speed. By maintaining the fan 102 on, circulated air may flow through the contaminant filter 108 and, thus, temperature of the contaminant filter 108 may be dependent on temperature of the circulated air.

Thus, to facilitate controlling temperature of the contaminant filter 108, the scrubber control circuitry 124 may control operation the heater 104 based at least in part on a target regeneration temperature associated with the contaminant filter 108 (process block 214). For example, when temperature of the contaminant filter 108 is below the target regeneration temperature, the scrubber control circuitry 124 may turn on the heater 104 by instructing a switching device in the heater relay module 132 to connect electrical power to the heater 104. On the other hand, when temperature of the contaminant filter 108 is above the target regeneration temperature, the scrubber control circuitry 124 may turn off the heater 104 by instructing the switching device in the heater relay module 132 to disconnect electrical power from the heater 104.

As described above, in some embodiments, a contaminant filter 108 may release previously sorbed air contaminants when its temperature is above a temperature threshold. Thus, in such embodiments, the target regeneration temperature may set based at least in part on the temperature threshold, for example, such that the target regeneration temperature includes a range of temperature at or above the temperature threshold. In this manner, a scrubber unit 70 may operate in a closed loop heating phase of a regeneration mode to facilitate releasing previously sorbed air contaminants, for example, by pulsing its heater 104 pulsed on and off to increase temperature of the contaminant filter 108 above its normal operating (e.g., standby or sorption) temperature.

Returning to the process 196 of FIG. 10, after the closed loop heating phase, the scrubber control circuitry 124 may instruct the scrubber unit 70 to operate in the bleed phase (process block 200). As described above, during the closed loop heating phase, temperature of the contaminant filter 108 may be controlled such that the contaminant filter 108 releases previously sorbed air contaminants. To reduce likelihood of released air contaminants merely being re-sorbed by the contaminant filter 108, the scrubber control circuitry 124 may control operation of the scrubber unit 70 to vent (e.g., exhaust) the released air contaminants during the bleed phase.

Figure 12:
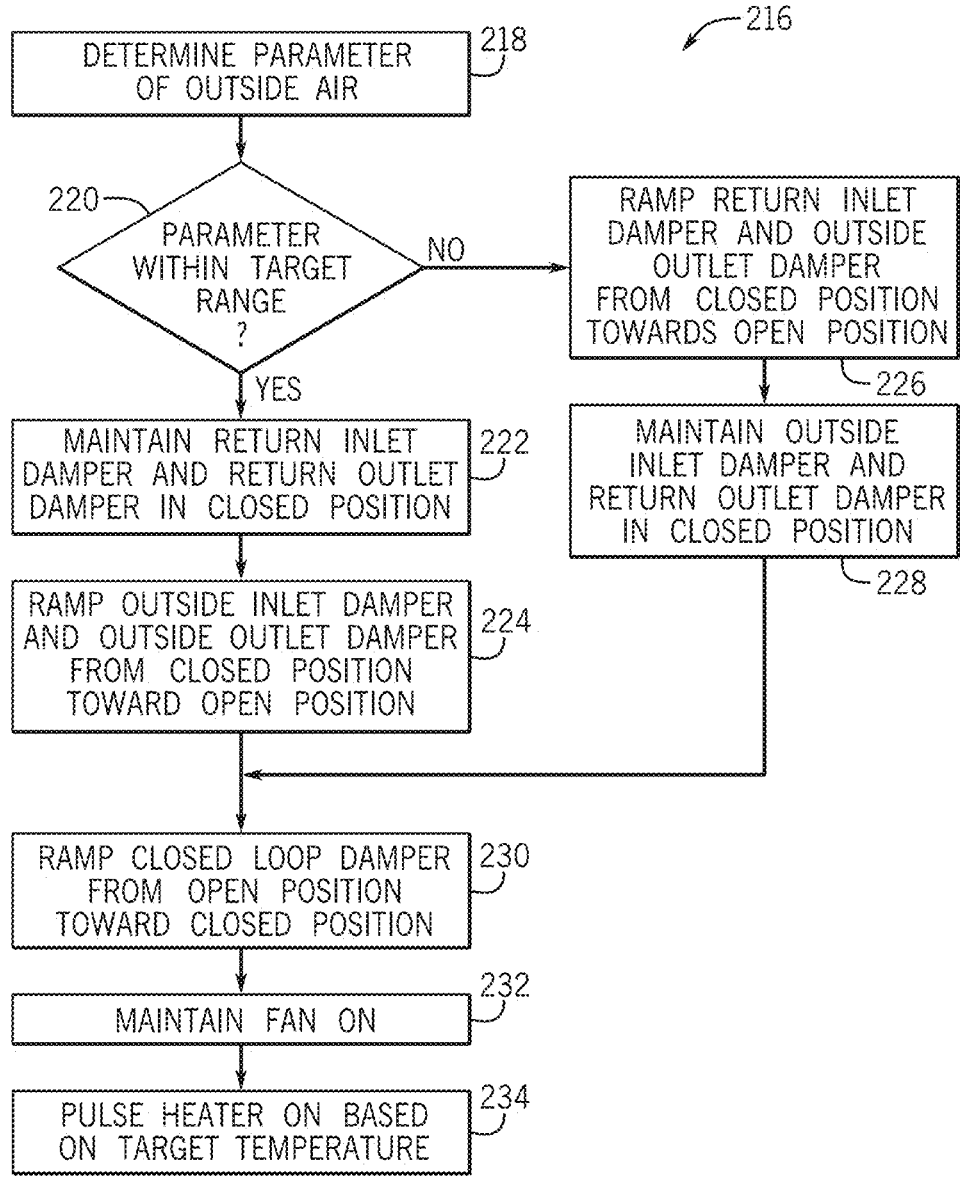
FIG. 12 is a flow diagram of a process for operating the scrubber unit of FIG. 4 in a bleed phase of the regeneration mode, in accordance with an aspect of the present disclosure.

To help illustrate, an example of a process 216 for operating a scrubber unit 70 in a bleed phase of a regeneration mode is described in FIG. 12. Generally, the process 216 includes determining a parameter of outside air (process block 218), determining whether the parameter of the outside air is within a target range (decision block 220), and, when the parameter is within the target range, maintaining a return inlet damper and a return outlet damper in a closed position (process block 222), and ramping an outside inlet damper and an outside outlet damper from a closed position toward an open position (process block 224). When the parameters are not within the target range, the process 216 includes ramping the return inlet damper and the outside outlet damper from a closed position toward an open position (process block 226) and maintaining the outside inlet damper and the return outlet damper in a closed position (process block 228). Additionally, the process 216 includes ramping a closed loop damper from an open position toward a closed position (process block 230), maintaining a fan on (process block 232), and pulsing a heater on based on a target temperature (process block 234). In some embodiments, the process 216 may be implemented at least in part by executing instructions stored in tangible, non-transitory, computer-readable media, such as memory 140, using processing circuitry, such as processor 138.

Accordingly, in some embodiments, scrubber control circuitry 124 may determine parameters of outside air, such as temperature, humidity, and/or contaminant level (process block 218). As described above, in some embodiments, the scrubber control circuitry 124 may determine parameters of outside air based at least in part on sensor data received from an outside air sensor 142. Additionally or alternatively, the scrubber control circuitry 124 may determine parameters of outside air based at least in part on weather data, for example, received by the building management system 34 from a remote data source 66 and communicated from the building management system 34 to the scrubber control circuitry 124.

Based at least in part on whether the outside air parameters are within corresponding target ranges, the scrubber control circuitry 124 may determine whether the outside air is suitable for venting (e.g., exhausting) released air contaminants from the scrubber unit 70 (decision block 220). In particular, as described above, a contaminant filter 108 may release previously sorbed air contaminants when its temperature is above a temperature threshold. As such, temperature of air used to vent released air contaminants may affect temperature of the contaminant filter 108 and, thus, release of previously sorbed air contaminants. For example, using cold air to vent the scrubber unit 70 may result in the contaminant filter 108 prematurely ceasing release of sorbed air contaminants (e.g., before entering the cool down phase).

Thus, in some embodiments, the scrubber control circuitry 124 may determine suitability of outside air for venting based at least in part on whether temperature of the outside air is within a target venting temperature range, for example, above a low temperature threshold. In some embodiments, release of previously sorbed air contaminants may additionally or alternatively be affected by other parameters of venting air, such as humidity. Thus, in such embodiments, the scrubber control circuitry 124 may determine suitability of outside air for venting based at least in part on whether humidity of the outside air is within a target venting humidity range, for example, above a lower humidity threshold and below an upper humidity threshold.

When the parameters are indicative of outside air being suitable for venting, the scrubber control circuitry 124 may control operation of the scrubber unit 70 such that it outside inlet damper 118 and its outside outlet damper 120 are both ramped from a fully closed position toward an open position (process block 224) while its return inlet damper 114 and its return outlet damper 116 are both maintained in a fully closed position (process block 222). For example, when in a fully closed position (e.g., 0% open) during the closed loop heating phase, the scrubber control circuitry 124 may instruct the outside inlet actuator 94C to transition to and/or maintain the outside inlet damper 118 at a 10% open position and the outside outlet actuator 94D to transition to and/or maintain the outside outlet damper 120 at a 10% open position during a first duration in the bleed phase. During a second duration in the bleed phase after the first duration, the scrubber control circuitry 124 may instruct the outside inlet actuator 94C to transition to and/or maintain the outside inlet damper 118 at a 20% open position and the outside outlet actuator 94D to transition to and/or maintain the outside outlet damper 120 to a 20% open position. Additionally, the scrubber control circuitry 124 may instruct the outside inlet actuator 94C to transition to and/or maintain the outside inlet damper 118 at a 30% open position and the outside outlet actuator 94D to transition to and/or maintain the outside outlet damper 120 to a 30% open position during a third duration in the bleed phase after the second duration. During a fourth duration in the bleed phase after the third duration, the scrubber control circuitry 124 may instruct the outside inlet actuator 94C to transition to and/or maintain the outside inlet damper 118 at a 40% open position and the outside outlet actuator 94D to transition to and/or maintain the outside outlet damper 120 at a 40% open position. Furthermore, the scrubber control circuitry 124 may instruct the outside inlet actuator 94C to transition to and/or maintain the outside inlet damper 118 at a 50% open position and the outside outlet actuator 94D to transition to and/or maintain the outside outlet damper 120 at a 50% open position during a fifth duration in the bleed phase after the fourth duration.

In some embodiments, amount of air contaminants released from a contaminant filter 108 generally increases the longer temperature of the contaminant filter 108 is maintained at a target regeneration temperature (e.g., temperature above the temperature threshold). Since temperature of outside air is generally lower than the target regeneration temperature, gradually ramping damper position of the outside inlet damper 118 and/or the outside outlet damper 120 may facilitate increasing duration temperature of the contaminant filter is maintained at the target regeneration temperature and, thus, amount of previously sorbed air contaminants that is released from the contaminant filter 108 during a regeneration cycle. In fact, in some embodiments, the scrubber control circuitry 124 may select one of multiple regeneration modes, which each have varying total durations.

For example, the scrubber control circuitry 124 may select from a quick regeneration mode, a standard regeneration mode, and an extended regeneration mode. In some embodiments, the quick regeneration mode, the standard regeneration mode, and the extended regeneration mode may have differing bleed phases. For example, in the quick regeneration mode, the first duration during its bleed phase may be eight minutes, the second duration during its bleed phase may be five minutes, the third duration during its bleed phase may be three minutes, the fourth duration during its bleed phase may be two minutes, and the fifth duration during its bleed phase may be two minutes. Additionally, in the standard regeneration mode, the first duration during its bleed phase may be twenty minutes, the second duration during its bleed phase may be fifteen minutes, the third duration during its bleed phase may be fifteen minutes, the fourth duration during its bleed phase may be ten minutes, and the fifth duration during its bleed phase may be ten minutes. Furthermore, in the extended regeneration mode, the first duration during its bleed phase may be forty minutes, the second duration during its bleed phase may be thirty-five minutes, the third duration during its bleed phase may be thirty minutes, the fourth duration during its bleed phase may be twenty-five minutes, and the fifth duration during its bleed phase may be twenty minutes.

In other words, in some embodiments, each of the multiple regeneration modes may provide differing tradeoffs between duration a scrubber unit 70 is unavailable to operate in the sorption mode and filtering efficiency available during subsequent operation. Since contaminant level present in return air is generally higher when a building 10 is occupied, in some embodiments, the scrubber control circuitry 124 may select between the multiple regeneration modes based at least in part on occupancy status (e.g., current occupancy and/or expected future occupancy) of the building 10 as will be described in more detail below. In any case, by operating in this manner, a scrubber unit 70 may vent (e.g., exhaust) released air contaminants using outside air during a bleed phase of a regeneration mode when parameters of the outside air are acceptable (e.g., within corresponding target ranges).

On the other hand, when outside air is not suitable for venting, the scrubber control circuitry 124 may control operation of the scrubber unit 70 such that the return inlet damper 114 and the outside outlet damper 120 are both ramped from a fully closed position toward an open position (process block 226) while the outside inlet damper 118 and the return outlet damper 116 are both maintained in a fully closed position (process block 228). In other words, when parameters of outside air are indicative of the outside air being unsuitable for venting, the scrubber control circuitry 124 may instruct the scrubber unit 70 to instead vent released air contaminants using return air, which at least in some instances may facilitate improving subsequent filtering efficiency, for example, compared to venting using outside air with parameters outside corresponding target parameter ranges. Nevertheless, in a similar manner as the outside outlet damper 120, the scrubber control circuitry 124 may gradually ramp the return inlet damper 114 from a fully closed position toward an open position to facilitate increasing amount of air contaminants released from the contaminant filter 108 and, thus, filtering efficiency provided during subsequent operation.

For example, when in a fully closed (e.g., 0% open) position during the closed loop heating phase, the scrubber control circuitry 124 may instruct the return inlet actuator 94A to transition to and/or maintain the return inlet damper 114 at a 10% open position and the outside outlet actuator 94D to transition to and/or maintain the outside outlet damper 120 at a 10% open position during the first duration in the bleed phase. During the second duration in the bleed phase, the scrubber control circuitry 124 may instruct the return inlet actuator 94A to transition to and/or maintain the return inlet damper 114 at a 20% open position and the outside outlet actuator 94D to transition to and/or maintain the outside outlet damper 120 at a 20% open position. Additionally, the scrubber control circuitry 124 may instruct the return inlet actuator 94A to transition to and/or maintain the return inlet damper 114 at a 30% open position and the outside outlet actuator 94D to transition to and/or maintain the outside outlet damper 120 at a 30% open position during the third duration in the bleed phase. During the fourth duration in the bleed phase, the scrubber control circuitry 124 may instruct the outside inlet actuator to transition to and/or maintain the return inlet damper 114 at a 40% open position and the outside outlet actuator 94D to transition to and/or maintain the outside outlet damper 120 at a 40% open position. Furthermore, the scrubber control circuitry 124 may instruct the return inlet actuator 94A to transition to and/or maintain the return inlet damper 114 at a 50% open position and the outside outlet actuator 94D to transition to and/or maintain the outside outlet damper 120 at a 50% open position during the fifth duration in the bleed phase.

In any case, the scrubber control circuitry 124 may also control operation of the scrubber unit 70 such that its closed loop damper 110 is maintained in an at least partially open position (process block 230), the fan 102 is maintained on (process block 232), and the heater 104 is pulsed on based at least in part on target regeneration temperature associated with the contaminant filter 108 (process block 234), thereby enabling heated air to continue being circulated within the scrubber unit 70. In some embodiments, the scrubber control circuitry 124 may gradually ramp the closed loop damper 110 toward a closed position during the bleed phase. For example, when in a fully (e.g., 100%) open position during the closed loop heating phase, the scrubber control circuitry 124 may instruct the closed loop actuator 94E to transition to and/or maintain the closed loop damper at a 90% open position during the first duration in the bleed phase. During the second duration in the bleed phase, the scrubber control circuitry 124 may instruct the closed loop actuator 94E to transition to and/or maintain the closed loop damper 110 at an 80% open position. Additionally, the scrubber control circuitry 124 may instruct the closed loop actuator 94E to transition to and/or maintain the closed loop damper 110 at a 70% open position during the third duration in the bleed phase. During the fourth duration in the bleed phase, the scrubber control circuitry 124 may instruct the closed loop actuator 94E to transition to and/or maintain the closed loop damper 110 at a 60% open position. Furthermore, the scrubber control circuitry 124 may instruct the closed loop actuator 94E to transition to and/or maintain the closed loop damper 110 at a 50% open position during the fifth duration in the bleed phase.

In other words, in some embodiments, the scrubber control circuitry 124 may ramp damper position of the closed loop damper 110 in coordination with the outside outlet damper 120 during the bleed phase. In any case, by operating in this manner, a scrubber unit 70 may vent (e.g., exhaust) released air contaminants during a bleed phase of a regeneration mode. Moreover, the scrubber unit 70 may continue maintaining temperature of its contaminant filter 108 at the target regeneration temperature to enable the contaminant filter 108 to continue releasing previously sorbed air contaminants during the bleed phase, which at least in some instances may facilitate improving filtering efficiency available during subsequent operation.

Returning to the process 196 of FIG. 10, after the bleed phase, the scrubber control circuitry 124 may instruct the scrubber unit 70 to operate in the cool down phase (process block 202). As described above, temperature of a contaminant filter 108 may be elevated above its normal (e.g., standby or sorption) operating temperature during the closed loop heating phase and/or the bleed phase. Additionally, as described above, a contaminant filter 108 may sorb air contaminants when its temperature is below a temperature threshold. Thus, to facilitate subsequently operating in the sorption mode, the scrubber control circuitry 124 may control operation of the scrubber unit 70 to reduce temperature of the contaminant filter 108 during the cool down phase.

Figure 13:
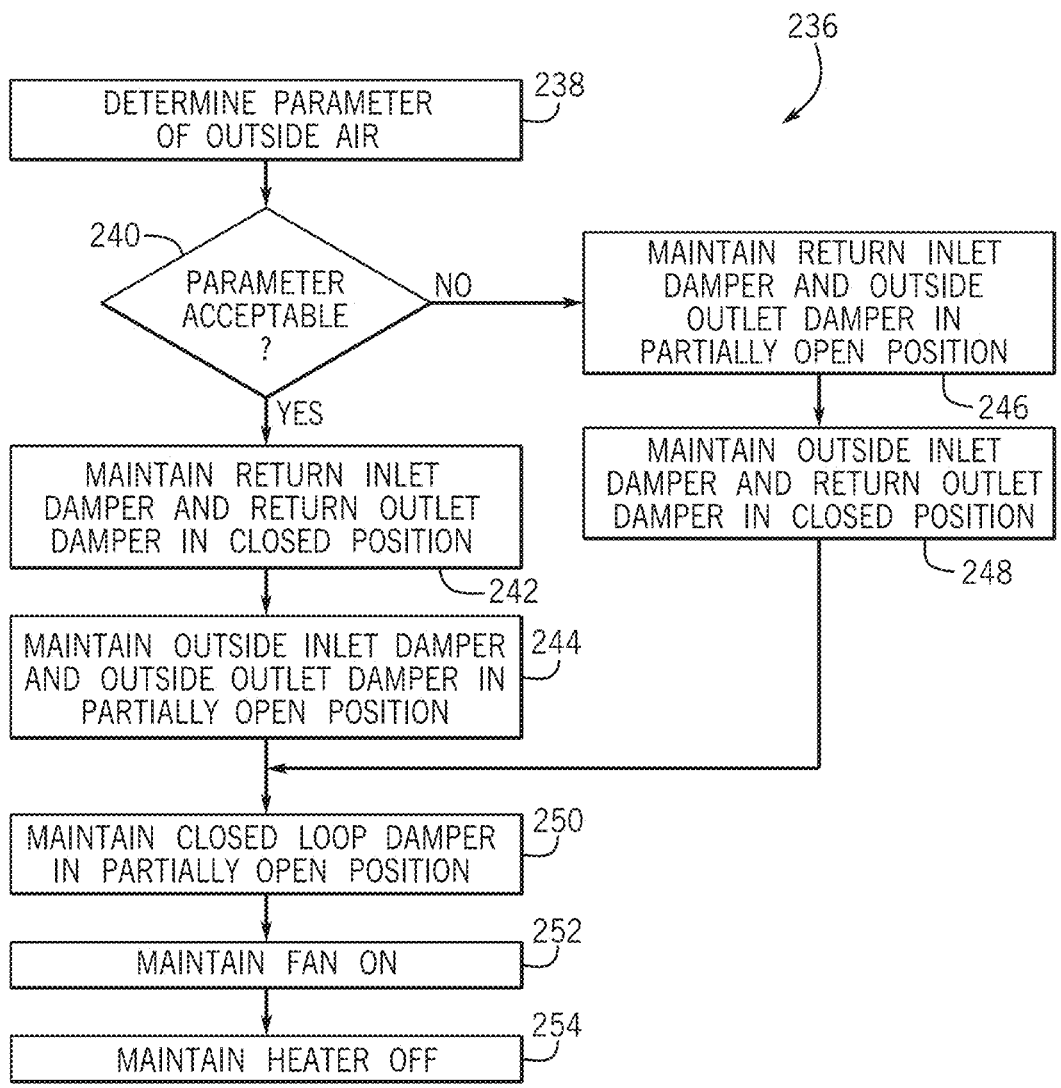
FIG. 13 is a flow diagram of a process for operating the scrubber unit of FIG. 4 in a cool down phase of the regeneration mode, in accordance with an aspect of the present disclosure.

To help illustrate, an example of a process 236 for operating a scrubber unit 70 in a cool down phase of a regeneration mode is described in FIG. 13. Generally, the process 236 includes determining parameters of outside air (process block 238), determining whether the parameters of the outside air are acceptable (decision block 240), and, when the parameters are acceptable, maintaining a return inlet damper and a return outlet damper in a closed position (process block 242), and maintaining an outside inlet damper and an outside outlet damper in a partially open position (process block 244). When the parameters are not acceptable, the process 236 includes maintaining the return inlet damper and the outside outlet damper in a partially open position (process block 246) and maintaining the outside inlet damper and the return outlet damper in a closed position (process block 248). Additionally, the process 236 includes maintaining a closed loop damper in a partially open position (process block 250), maintaining a fan on (process block 252), and maintaining a heater off (process block 254). In some embodiments, the process 236 may be implemented at least in part by executing instructions stored in tangible, non-transitory, computer-readable media, such as memory 140, using processing circuitry, such as processor 138.

Accordingly, in some embodiments, scrubber control circuitry 124 may determine parameters of outside air, such as temperature, humidity, and/or contaminant level (process block 238). As described above, in some embodiments, the scrubber control circuitry 124 may determine parameters of outside air based at least in part on sensor data received from an outside air sensor 142. Additionally or alternatively, the scrubber control circuitry 124 may determine parameters of outside air based at least in part on weather data, for example, received by the building management system 34 from a remote data source 66 and communicated from the building management system 34 to the scrubber control circuitry 124.

When outside air parameters are determined during the bleed phase, in some embodiments, re-determining the parameters during the cool down phase may be obviated. In any case, as described above, air contaminants released from the contaminant filter may be selectively vented using either return air or outside air based at least in part on parameters of the outside air. Since the cool down phase follows the bleed phase, the scrubber unit 70 may continue using air received from the venting air source (e.g., return air duct 28 or outside air duct 76) during the cool down phase.

In other words, when outside air is used for venting during the bleed phase, the scrubber control circuitry 124 may control operation of the scrubber unit 70 such that the return inlet damper 114 and the return outlet damper 116 are maintained in a fully closed position (process block 242) while the outside inlet damper 118 and the outside outlet damper 120 are both maintained in a partially open position (process block 244), thereby enabling outside air to continue flowing through the scrubber unit 70 during the cool down phase. For example, during the cool down phase, the scrubber control circuitry 124 may instruct the outside inlet actuator 94C to transition to and/or maintain the outside inlet damper 118 at a 60% open position. Additionally, the scrubber control circuitry 124 may instruct the outside outlet actuator 94D to transition to and/or maintain the outside outlet damper 120 at a 60% open position.

On the other hand, when return air is used for venting during the bleed phase, the scrubber control circuitry 124 may control operation of the scrubber unit 70 such that the outside inlet damper 118 and the return outlet damper 116 are both maintained in a fully closed position (process block 248) while the return inlet damper 114 and the outside outlet damper 120 are both maintained in a partially open position (process block 246), thereby enabling return air to continue flowing through the scrubber unit 70 during the cool down phase. For example, during the cool down phase, the scrubber control circuitry 124 may instruct the return inlet actuator 94A to transition to and/or maintain the return inlet damper 114 at a 60% open position. Additionally, the scrubber control circuitry 124 may instruct the outside outlet actuator 94D to transition to and/or maintain the outside outlet damper 120 at a 60% open position.

To facilitate reducing temperature of the contaminant filter 108, the scrubber control circuitry 124 may also control operation of the scrubber unit 70 such that the closed loop damper 110 is maintained in a partially open position (process block 250), the fan 102 is maintained on (process block 252), and the heater 104 is maintained off (process block 254). In this manner, the fan 102 may circulate air (e.g., outside air or return air) through the scrubber unit 70 without artificially increasing temperature via the heater 104. Since temperature of the circulated air is generally lower than the target regeneration temperature of the contaminant filter 108, circulating air through the contaminant filter 108 may facilitate reducing temperature of the contaminant filter 108 during the cool down phase.

In some embodiments, the scrubber unit 70 may operate in the cool down phase for a fixed duration. For example, the duration of the cool down phase may be ten minutes. Additionally or alternatively, the scrubber unit 70 may operate in the cool down phase for a variable duration, for example, until temperature of the contaminant filter 108 is within a target sorption temperature range. In any case, in this manner, a scrubber unit 70 may operate in a cool down phase of a regeneration mode to facilitate reducing temperature of its contaminant filter 108, which at least in some instances may reduce duration before the scrubber unit 70 is able to operate in the sorption mode.

In this manner, when filtering efficiency is less than a filtering efficiency threshold, the scrubber control circuitry 124 may autonomously initiate a regeneration cycle by instructing the scrubber unit 70 to operate in a regeneration mode. Additionally or alternatively, the scrubber control circuitry 124 may periodically initiate a regeneration mode, for example, based at least in part on predetermined schedule. Furthermore, in some embodiments, a regeneration mode may be initiated by a user input, for example, communicated from a client device 64 to the building management system 34 and from the building management system 34 to the HVAC subsystem 12.

Moreover, as described above, the scrubber control circuitry 124, in some embodiments, may selectively instruct the scrubber unit 70 to operate in one of multiple regeneration modes (e.g., quick regeneration mode, standard regeneration mode, and extended regeneration mode). In some embodiments, each of multiple regeneration modes may provide differing tradeoffs between duration a scrubber unit 70 is unavailable to operate in the sorption mode and filtering efficiency provided during subsequent operation, for example, due to varying bleed phase durations. Since contaminant level present in return air generally varies at least in part with number of living beings in the building 10, likelihood that the scrubber unit 70 is instructed to operate in the sorption mode may increase as occupancy of the building 10 increases. Thus, in some embodiments, the scrubber control circuitry 124 may instruct the scrubber unit 70 to operate in one of the multiple regeneration modes based at least in part on occupancy status of the building 10.

Figure 14:
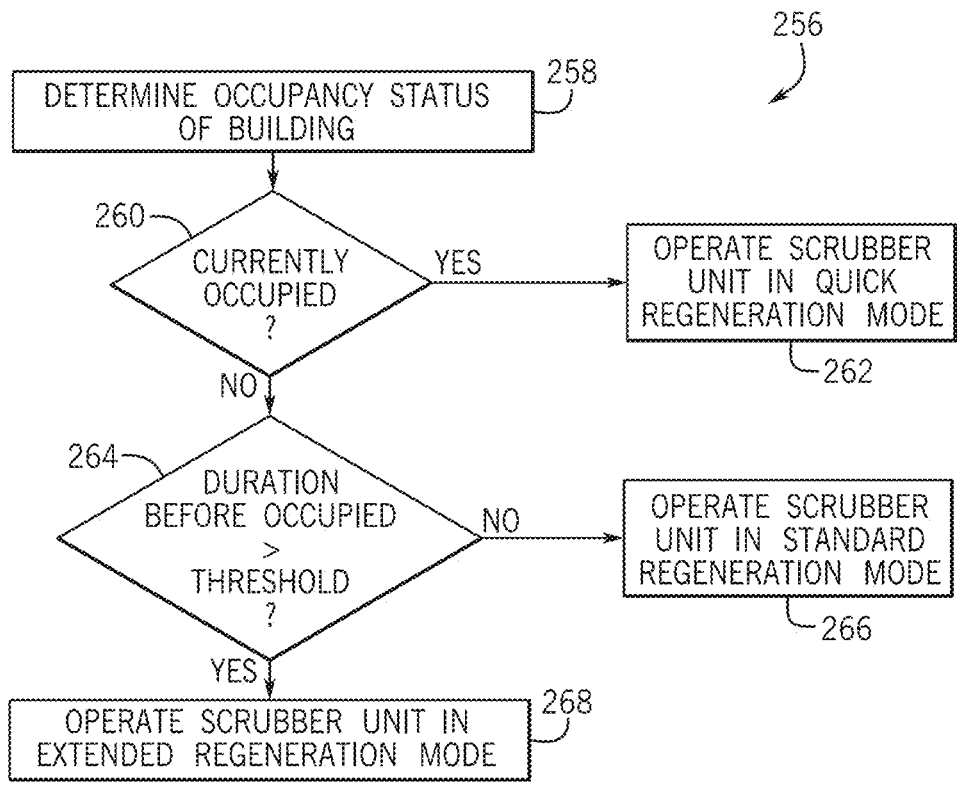
FIG. 14 is a flow diagram of a process for operating the scrubber unit of FIG. 4 in one of multiple regeneration modes, in accordance with an aspect of the present disclosure.

To help illustrate, an example of a process 256 for selectively operating a scrubber unit in one of multiple regeneration modes is described in FIG. 14. Generally, the process 256 includes determining occupancy status of a building (process block 258), determining whether the building is currently occupied (decision block 260), and operating a scrubber unit in a quick regeneration mode when the building is currently occupied (process block 262). When the building is not currently occupied, the process 256 includes determining whether duration before the building is expected to be occupied is greater than a duration threshold (decision block 264), operating the scrubber unit in a standard regeneration mode when the duration before the building is expected to be occupied is not greater than the duration threshold (process block 266), and operating the scrubber unit in an extended regeneration mode when the duration before the building is expected to be occupied is greater than the duration threshold (process block 268). In some embodiments, the process 256 may be implemented at least in part by executing instructions stored in tangible, non-transitory, computer-readable media, such as memory 140, using processing circuitry, such as processor 138.

Accordingly, in some embodiments, scrubber control circuitry 124 may determine occupancy (e.g., current occupancy and/or expected future occupancy) status of a building 10 (process block 258). As described above, in some embodiments, a building management system 34 may determine occupancy (e.g., state) data indicative of occupancy status of a building 10. For example, by analyzing image data (e.g., video) captured by the security system 40, the building management system 34 may determine current occupancy status of the building 10 and indicate the current occupancy status via corresponding occupancy data. Thus, in some embodiments, the scrubber control circuitry 124 may determine whether the building 10 is currently occupied, whether a building zone 74 in the building 10 is currently occupied, number of individuals currently occupying the building 10, number of individuals currently occupying the building zone 74, and/or location of individuals currently occupying the building 10 based at least in part on corresponding occupancy data.

Additionally, in some embodiments, a building management system 34 may determine expected future occupancy status of the building 10. For example, by analyzing previous (e.g., historical) occupancy trends, the building management system 34 may predict occupancy of the building 10 expected to occur over a prediction horizon (e.g., future time period) and indicated the expected future occupancy status via corresponding occupancy data. Thus, in some embodiments, the scrubber control circuitry 124 may determine an expected occupancy schedule, when the building 10 is expected to be unoccupied, when a building zone 74 in the building 10 is expected to be unoccupied, duration the building 10 is expected to remain unoccupied, and/or duration the building zone 74 is expected to remain unoccupied based at least in part on corresponding occupancy data.

As described above, in some embodiments, a quick regeneration mode, a standard regeneration mode, and an extended regeneration mode may each include a closed loop heating phase, a bleed phase, and a cool down phase. However, each of the regeneration modes may provide differing tradeoffs between duration the scrubber unit 70 is unavailable to operate in the sorption mode and filtering efficiency available during subsequent operation. For example, due to its shorter bleed phase, the quick regeneration mode may facilitate reducing total duration of a regeneration cycle and, thus, duration the scrubber unit 70 is unavailable to operate in the sorption mode compared to the standard regeneration mode and even more so the extended regeneration mode.

Accordingly, when occupancy status is indicative of the building 10 being currently occupied, the scrubber control circuitry 124 may control operation of a scrubber unit 70 such that the scrubber unit 70 operates in the quick regeneration mode (process block 262). In this manner, filtering efficiency provided by the scrubber unit 70 during subsequent operation may be improved while reducing duration operation in the sorption mode is unavailable, for example, compared to the standard regeneration mode or the extended regeneration mode. However, due to its longer bleed phase, the standard regeneration mode may facilitate increasing amount of previously sorbed air contaminants released from the contaminant filter 108 during a regeneration cycle and, thus, subsequent filtering efficiency compared to the quick regeneration mode. Moreover, due to its longer bleed phase, the extended regeneration mode may facilitate increasing amount of previously sorbed air contaminants released from the contaminant filter 108 during a regeneration cycle and, thus, subsequent filtering efficiency compared to the standard regeneration mode.

Accordingly, when occupancy status is indicative of the building 10 being currently unoccupied, the scrubber control circuitry 124 may determine whether to operate the scrubber unit 70 in the standard regeneration mode or the extended regeneration mode based at least in part on duration the building is expected to remain unoccupied, for example, in comparison with a duration threshold (decision block 264). In some embodiments, the duration threshold may be predetermined and stored in a tangible, non-transitory, computer-readable medium, such as memory 140. Thus, in such embodiments, the scrubber control circuitry 124 may retrieve the duration threshold from the tangible, non-transitory, computer-readable medium and compare the expected unoccupied duration with the duration threshold. Furthermore, in some embodiments, the duration threshold may be set based at least in part on total duration of a cycle through the extended regeneration mode, for example, such that duration threshold is equal to or longer than the duration of an extended regeneration cycle.

Accordingly, when occupancy status is indicative of the building 10 remaining unoccupied a duration not greater than the duration threshold, the scrubber control circuitry 124 may determine that there is insufficient time to complete a cycle through the extended regeneration mode before the building 10 is expected to be occupied and, thus, operate the scrubber unit 70 in the standard regeneration mode (process block 266). On the other hand, when occupancy status is indicative of the building 10 remaining unoccupied a duration greater than the duration threshold, the scrubber control circuitry 124 may determine that there is sufficient time to complete a cycle through the extended regeneration mode before the building 10 is expected to be occupied and, thus, operate the scrubber unit 70 in the extended regeneration mode (process block 268). In this manner, a scrubber unit 70 may selectively implement one of multiple regeneration modes based at least in part on occupancy status of a building 10, for example, to facilitate varying tradeoff between duration the scrubber unit 70 is unavailable to operate in the sorption mode and filtering efficiency available during a subsequent cycle through the sorption mode.

Figure 15:
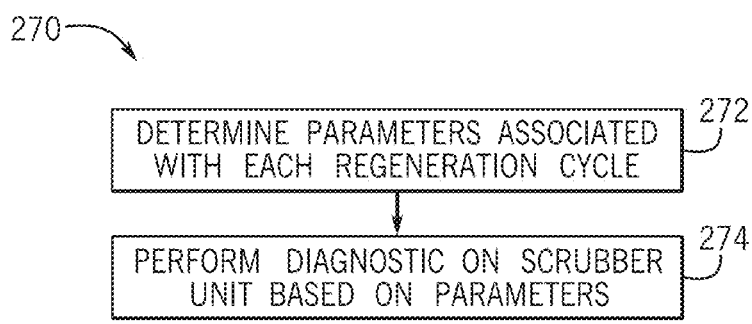
FIG. 15 is a flow diagram of a process for monitoring operation of the scrubber unit of FIG. 4, in accordance with an aspect of the present disclosure.

To facilitate improving operational reliability, in some embodiments, diagnostics may be performed on a scrubber unit 70 based at least in part on its operation during one or more regeneration cycles. To help illustrate, an example of a process 270 for performing diagnostics on a scrubber unit 70 is described in FIG. 15. Generally, the process 270 includes determining parameters associated with each regeneration cycle (process block 272) and performing diagnostics on a scrubber unit based at least in part on the parameters (process block 274). In some embodiments, the process 270 may be implemented at least in part by executing instructions stored in a tangible, non-transitory, computer-readable medium, such as memory 140, using processing circuitry, such as processor 138.

Accordingly, in some embodiments, scrubber control circuitry 124 may determine parameters associated with each time a scrubber unit 70 cycles through a regeneration mode (process block 272). In some embodiments, parameters associated with a regeneration cycle may include operational parameters of the contaminant filter 108, such as filtering efficiency before the regeneration cycle and/or filtering efficiency after the regeneration cycle. Additionally, in some embodiments, parameters associated with a regeneration cycle may include when the regeneration cycle is initiated, when the regeneration cycle is completed, duration of its closed loop heating phase, duration of its bleed phase, duration of its cool down phase, and/or total duration of the regeneration cycle.

To facilitate subsequent analysis, in some embodiments, parameters associated with a regeneration cycle may be stored in a tangible, non-transitory, computer-readable medium. For example, the scrubber control circuitry 124 may store parameters associated with one or more regeneration cycles in memory 140. Additionally or alternatively, parameters associated with one or more regeneration cycles may be stored in a remote data source 66, for example, by a building management system 34 and/or scrubber control circuitry 124.

By analyzing the regeneration cycle parameters, the scrubber control circuitry 124 may perform diagnostics on operation of the scrubber unit 70 (process block 274). Thus, when stored in a tangible, non-transitory, computer-readable medium, the scrubber control circuitry 124 may retrieve parameters associated with one or more regeneration cycles from the tangible, non-transitory, computer-readable medium. Additionally, in some embodiments, the scrubber control circuitry 124 may perform diagnostics by analyzing parameter trends. For example, when duration between successive quick regeneration cycles trends below a duration threshold, the scrubber control circuitry 124 may determine that operating in the quick regeneration mode insufficiently improves filtering efficiency during subsequent operation and, thus, the contaminant filter 108 should be replaced.

To facilitate improving operational reliability, in some embodiments, the scrubber control circuitry 124 may autonomously adjust operation of the scrubber unit 70 based at least in part on the diagnostic results. Additionally or alternatively, the diagnostic results may be presented to a user (e.g., operator), for example, via a graphical user interface displayed on the electronic display 69 of a client device 64. In this manner, in addition to controlling operation of a corresponding scrubber unit 70, scrubber control circuitry 124 may facilitate monitoring operation of the scrubber unit 70.

As described above, in some embodiments, scrubber control circuitry 124 may also control operation of other equipment in an HVAC subsystem 12. In fact, in some embodiments, equipment controlled by scrubber control circuitry 124 may be external from its corresponding scrubber unit 70. For example, the scrubber control circuitry 124 may control operation of an outside air damper 78B implemented in an air handling unit of the HVAC subsystem 12.

In some embodiments, the scrubber control circuitry 124 may control operation of the outside air damper 78B based at least in part on operational mode of the scrubber unit 70. For example, while operating in a regeneration mode, a scrubber unit 70 may be unavailable to operate in the sorption mode. Thus, to facilitate producing supply air in accordance with a target contaminant level, the scrubber control circuitry 124 may control operation of the air handling unit 30 such that the outside air damper 78B is transitioned to and/or maintained in a fully open position, thereby enabling corresponding air handler control circuitry 86 to control supply air contaminant level by adjusting amount of outside air used to produce the supply air. While in other operating (e.g., standby or sorption) modes, in some embodiments, the scrubber control circuitry 124 may control operation of the outside air damper 78B based at least in part on parameters of return air and/or parameters of outside air.

Figure 16:
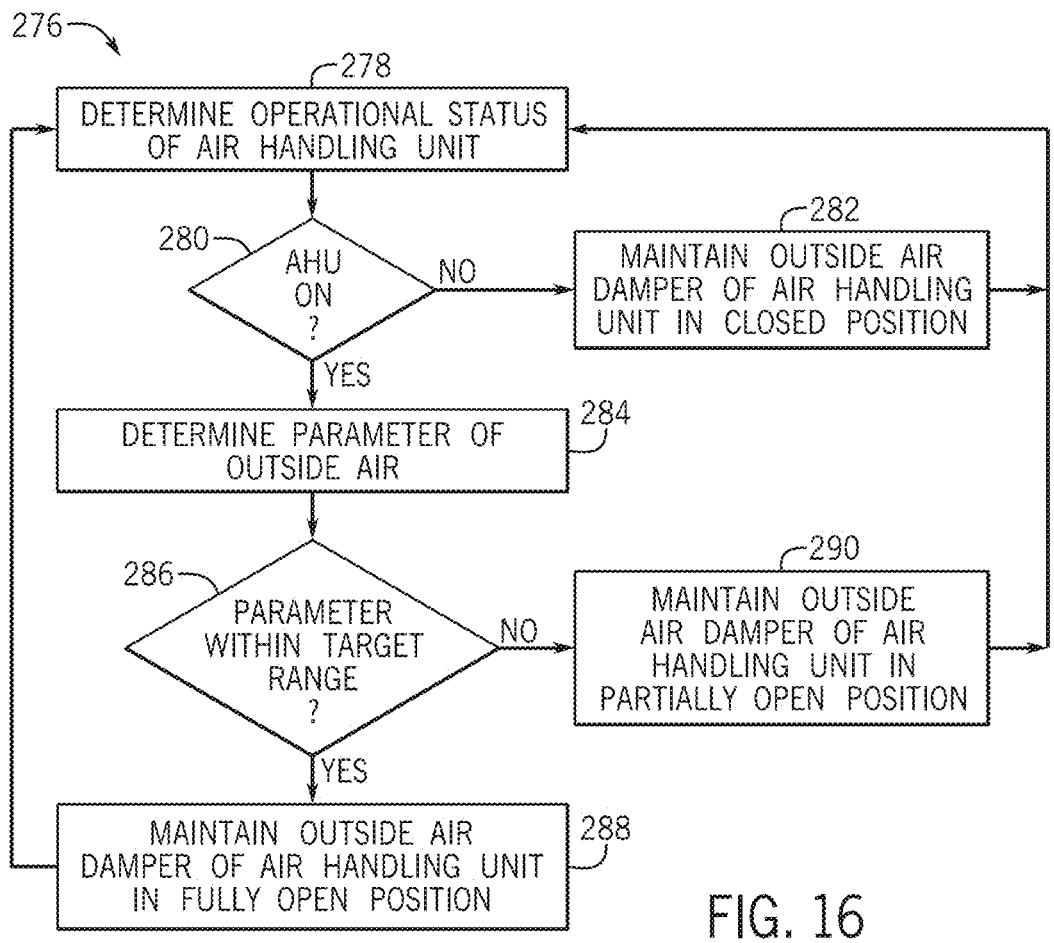
FIG. 16 is a flow diagram of a process for controlling operation of the air handling unit (AHU) of FIG. 3 when the scrubber unit of FIG. 4 is in the standby mode or the regeneration mode, in accordance with an aspect of the present disclosure.

To help illustrate, an example of a process 276 for controlling operation of an outside air damper 78B implemented in an air handling unit 30 while a corresponding scrubber unit 70 operates in a standby mode is described in FIG. 16. Generally, the process 276 includes determining operational status of an air handling unit (process block 278), determining whether the operational status of the air handling unit is on (decision block 280), and maintaining an outside air damper of the air handling unit in a closed position when the air handling unit is not on (process block 282). When the air handling unit is on, the process 276 includes determining a parameter of outside air (process block 284), determining whether the parameter of the outside air is within a target range (decision block 286), maintaining the outside air damper of the air handling unit in a fully open position when the parameter is within the target range (process block 288), and maintaining the outside air damper of the air handling unit in a partially open position when the parameter is not within the target range (process block 290). In some embodiments, the process 276 may be implemented at least in part by executing instructions stored in a tangible, non-transitory, computer-readable medium, such as memory 140, using processing circuitry, such as processor 138.

Accordingly, in some embodiments, scrubber control circuitry 124 may determine operational status of an air handling unit 30, for example, implemented in the same HVAC subsystem 12 as a corresponding scrubber unit 70 (process block 278). As described above, in some embodiments, the scrubber control circuitry 124 may receive an indication of operational status and/or other operational parameters associated with an air handling unit 30 from corresponding air handler control circuitry 86. Additionally or alternatively, the scrubber control circuitry 124 may receive an indication of the operational parameters associated with the air handling unit 30 from the building management system 34. For example, the scrubber control circuitry 124 may determine operational status of an air handling unit 30 based at least in part on received parameter (e.g., state) data, which indicates whether the air handling unit 30 is in an on state or an off state.

When the air handling unit 30 is off, the scrubber control circuitry 124 may control operation of the air handling unit 30 such that at least one of its outside air damper 78B is maintained in a fully closed position (process block 282). For example, the scrubber control circuitry 124 may instruct an external actuator 94F to transition to and/or maintain a corresponding outside air damper 78B in a fully closed position. As described above, in some embodiments, an air handling unit 30 may include multiple outside air dampers 78B. For example, the air handling unit 30 may include a first outside air damper 78B, which is controlled by its air handler control circuitry 86. To facilitate adapting (e.g., retrofit) the air handling unit 30 based on the techniques described herein, in some embodiments, a second outside air damper 78B, which is controlled by the scrubber control circuitry 124, may be coupled upstream relative to the first outside air damper 78B. In other words, in such embodiments, the scrubber control circuitry 124 may physically override the air handler control circuitry 86 since damper position of the second outside air damper 78B affects air flow to the first outside air damper 78B.

Nevertheless, in some embodiments, an air handling unit 30 may be implemented with a single outside air damper 78B. In such embodiments, the scrubber control circuitry 124 may control operation of the outside air damper 78B of the air handling unit 30 by digitally overriding the air handler control circuitry 86. For example, the scrubber control circuitry 124 may instruct the air handler control circuitry 86 to control damper position of the outside air damper 78B based on a first target outside air damper position determined by the scrubber control circuitry 124 instead of a second target outside damper position determined by the air handler control circuitry 86. In any case, by maintaining at least one outside air damper 78B in an air handling unit 30 in a fully closed position, flow of outside air into an internal portion of the air handling unit 30 may be blocked while the air handling unit 30 is in an off state.

As described above, when an air handling unit 30 is on, a scrubber unit 70 may operate in the standby mode while return air contaminant level is not greater than a contaminant level lower threshold. Thus, when the air handling unit 30 is on, the scrubber control circuitry 124 may determine suitability of outside air for use in supply air based at least in part on parameters of the outside air, such as temperature, humidity, and/or contaminant level (process block 284). As described above, in some embodiments, the scrubber control circuitry 124 may determine parameters of outside air based at least in part on sensor data received from an outside air sensor 142. Additionally or alternatively, the scrubber control circuitry 124 may determine parameters of outside air based at least in part on weather data, for example, received by the building management system 34 from a remote data source 66 and communicated from the building management system 34 to the scrubber control circuitry 124.

In some embodiments, the scrubber control circuitry 124 may determine suitability of outside air for use in supply air based at least in part on whether outside air parameters are within corresponding target ranges (decision block 286). For example, to reduce likelihood of freezing the air handling unit 30, the scrubber control circuitry 124 compare temperature of the outside air with a target outside air temperature. In some embodiments, likelihood of an air handling unit 30 freezing may substantially increase when temperature of air flowing through the air handling unit 30 is below a low temperature threshold. Thus, in such embodiments, the target outside air temperature may be set based at least in part on the low temperature threshold, for example, such that the target outside air temperature includes a range of temperature at or above the low temperature threshold.

Accordingly, when an outside air parameter is not within its target range, the scrubber control circuitry 124 may determine that outside air is less favorable for use in supply air compared to return air and, thus, control operation of the air handling unit 30 such that the at least one outside air damper 78B is maintained in a partially open position (process block 290). In some embodiments, damper position of the outside air damper 78B may be controlled based at least in part on a target standby damper position. For example, the scrubber control circuitry 124 may instruct the external actuator 94F to transition to and/or maintain a corresponding outside air damper 78B at a 10% (e.g., minimum) open position, thereby limiting flow of outside air into the air handling unit 30. At least in some instance, this may facilitate improving operational reliability of an air handling unit 30, for example, by reducing likelihood of cold outside air freezing equipment in the air handling unit 30.

On the other hand, when each outside air parameter is within its target range, the scrubber control circuitry 124 may determine that outside air favorable for use in supply air and, thus, control operation of the air handling unit 30 such that the at least one outside air damper 78B is maintained in a fully open position (process block 288). For example, the scrubber control circuitry 124 may instruct an external actuator 94F to transition to and/or maintain a corresponding outside air damper 78B in the fully open position. By maintaining the outside air damper 78B in the fully open, the scrubber control circuitry 124 may enable air handler control circuitry 86 corresponding with the air handling unit 30 to control supply air contaminant level by adjusting amount of outside air used to produce the supply air.

In this manner, while a corresponding scrubber unit 70 operates in the standby mode, scrubber control circuitry 124 may control operation of an air handling unit 30 based at least in part on operational status of the air handling unit 30 and parameters of outside air, which may be drawn into the air handling unit 30. As described above, in some embodiments, scrubber control circuitry 124 may additionally or alternatively control operation of an air handling unit 30 based at least in part on parameters of return air. For example, while a corresponding scrubber unit 70 operate in the sorption mode, the scrubber control circuitry 124 may control operation of the air handling unit 30 based at least in part on parameters of return air flowing through the scrubber unit 70.

Figure 17:
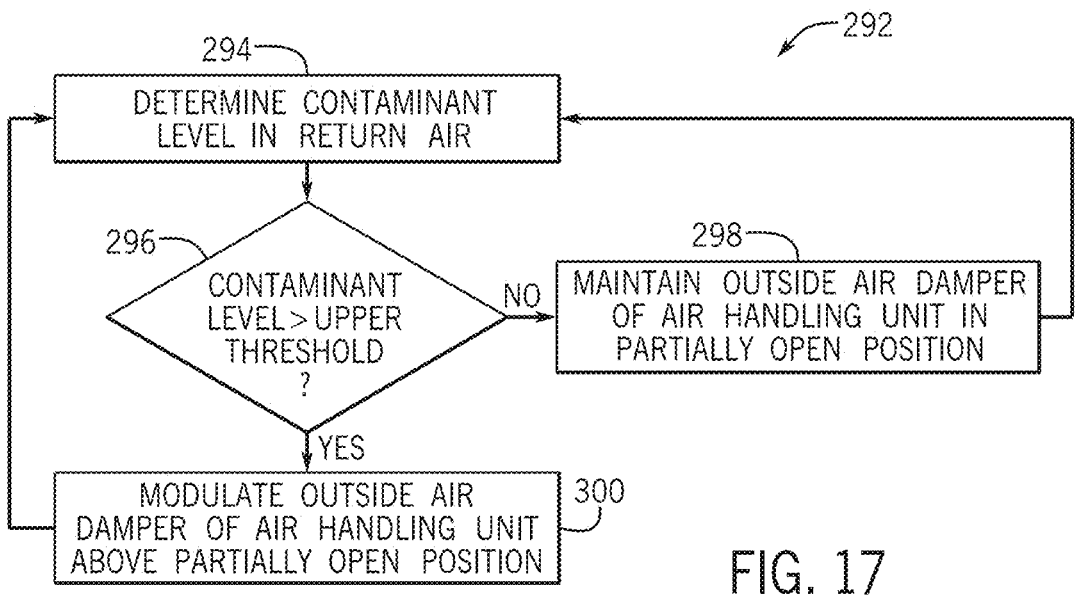
FIG. 17 is a flow diagram of a process for controlling operation of the air handling unit (AHU) of FIG. 3 when the scrubber unit of FIG. 4 is in the sorption mode, in accordance with an aspect of the present disclosure.

To help illustrate, an example of a process 292 for controlling operation of an outside air damper 78B implemented in an air handling unit 30 while a corresponding scrubber unit 70 operates in a sorption mode is described in FIG. 17. Generally, the process 292 includes determining contaminant level in return air (process block 294), determining whether the contaminant level is greater than an upper threshold (decision block 296), maintaining an outside air damper of an air handling unit in a partially open position when the contaminant level is not greater than the upper threshold (process block 298), and modulating the outside air damper of the air handling unit above the partially open position when the contaminant level is greater than the upper threshold (process block 300). In some embodiments, the process 292 may be implemented by executing instruction stored in a tangible, non-transitory, computer-readable medium, such as memory 140, using processing circuitry, such as processor 138.

Accordingly, in some embodiments, scrubber control circuitry 124 may determine contaminant level present in return air (process block 156). As described above, in some embodiments, a scrubber unit 70 may include a return inlet sensor 92A coupled on its return inlet damper 114 and/or a return outlet sensor 92B coupled on its return outlet damper 116. In such embodiments, the scrubber control circuitry 124 may determine contaminant level present in return air based at least in part on sensor data received from the return inlet sensor 92A and/or sensor data received from the return outlet sensors 92B.

As described above, in some embodiments, operation of a scrubber unit 70 in the sorption mode may be initiated (e.g., triggered) when return air contaminant level exceeds a contaminant level upper threshold. While operating in the sorption mode, the scrubber unit 70 may facilitate reducing contaminant level present in return air by actively introducing a pressure differential across its contaminant filter 108. As described above, when the pressure differential is within a target regeneration pressure range, chemical compounds in the contaminant filter may undergo a chemical reaction that sorbs (e.g., absorbs or adsorbs) air contaminants from return air flowing through the scrubber unit 70.

Accordingly, when return air contaminant level is able to be reduced below the contaminant level upper threshold, the scrubber control circuitry 124 may determine that operating the scrubber unit 70 in the sorption mode sufficiently reduces the contaminant level and, thus, control operation of the air handling unit 30 such that its outside air damper 78B is maintained in a partially open position (process block 298). In some embodiments, damper position of the outside air damper 78B may be controlled based at least in part on a target sorption damper position. For example, the scrubber control circuitry 124 may instruct the external actuator 94F to transition to and/or maintain a corresponding outside air damper 78B at a 10% (e.g., minimum) open position, thereby limiting flow of outside air into an internal portion of the air handling unit 30. At least in some instance, this may facilitate improving operational efficiency of an air handling unit 30 and, thus, an HVAC subsystem 12, for example, by enabling the air handling unit 30 to produce supply air using more return air and/or less outside air.

On the other hand, when return air contaminant level remains above the contaminant level upper threshold, the scrubber control circuitry 124 may determine that operating the scrubber unit 70 in the sorption mode insufficiently reduces the contaminant level. Thus, to facilitate producing supply air that meets a target contaminant level, the scrubber control circuitry 124 may control operation of the air handling unit 30 such that the outside air damper 78B is modulated above the partially open position (process block 300). For example, when return air contaminant level is above the contaminant level upper threshold, the scrubber control circuitry 124 may instruct the external actuator 94F to transition the corresponding outside air damper 78B from a 10% (e.g., partially) open position to a 15% open position. Additionally, if the return air contaminant level continues to remain above the contaminant level upper threshold, the scrubber control circuitry 124 may instruct the external actuator 94F to transition the corresponding outside air damper 78B from the 15% open position to a 20% open position.

As open position increases, limitation on air flow due to damper position of the outside air damper 78B may be reduced, thereby increasing amount of outside air available to the air handling unit 30 for producing supply air. In other words, by modulating the outside air damper 78B above the partially open position, the scrubber control circuitry 124 may supplement the contaminant level reduction provided by the scrubber unit 70. As described above, in some embodiments, contaminant level reduction provided by a scrubber unit 70 may be limited by filtering efficiency of its contaminant filter 108. Additionally, in some embodiments, filtering efficiency of a contaminant filter 108 and, thus, provided contaminant level reduction may gradually change (e.g., decrease) over time. Moreover, contaminant level present in return air may vary over time, for example, based at least in part on occupancy. By controlling operation of an air handling unit 30 in this manner, scrubber control circuitry 124 may facilitate improving operational reliability of an HVAC subsystem 12, for example, by accounting for changes over time to facilitate producing supply air that meets a target contaminant level.

To facilitate further improving operational reliability, in some embodiments, information related to operation of an HVAC subsystem 12 and/or other building subsystems may be communicated to a user (e.g., operator). For example, when a fault (e.g., fire) condition is detected in a scrubber unit 70, corresponding scrubber control circuitry 124 may control operation of the scrubber unit 70 such that its heater 104 is maintained off, its fan 102 is maintained off, its return inlet damper 114 is maintained in a fully closed position, its return outlet damper 116 is maintained in a fully closed position, its outside inlet damper 118 is maintained in a fully closed position, its outside outlet damper 120 is maintained in a fully closed position, and its closed loop damper 110 is maintained in a fully closed position, which at least in some instances may reduce likelihood of the fault condition spreading to other portions of the HVAC subsystem 12. Additionally or alternatively, the scrubber control circuitry 124 may facilitate alerting a user (e.g., operator) to the fault condition, for example, by communicating an indication of the fault condition to a building management system 34 to enable the building management system 34 to generate an audio alarm and/or a visual alarm.

Figure 18:
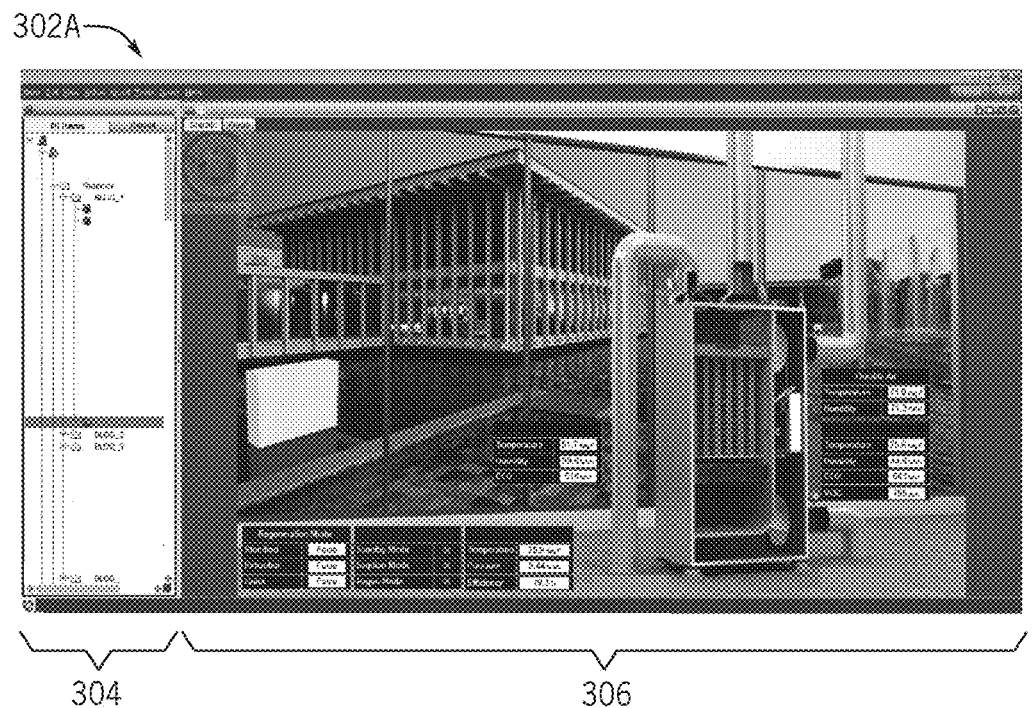
FIG. 18 is an example of a graphical user interface (GUI) generated by the building management system of FIG. 2, in accordance with an aspect of the present disclosure.
Figure 19:
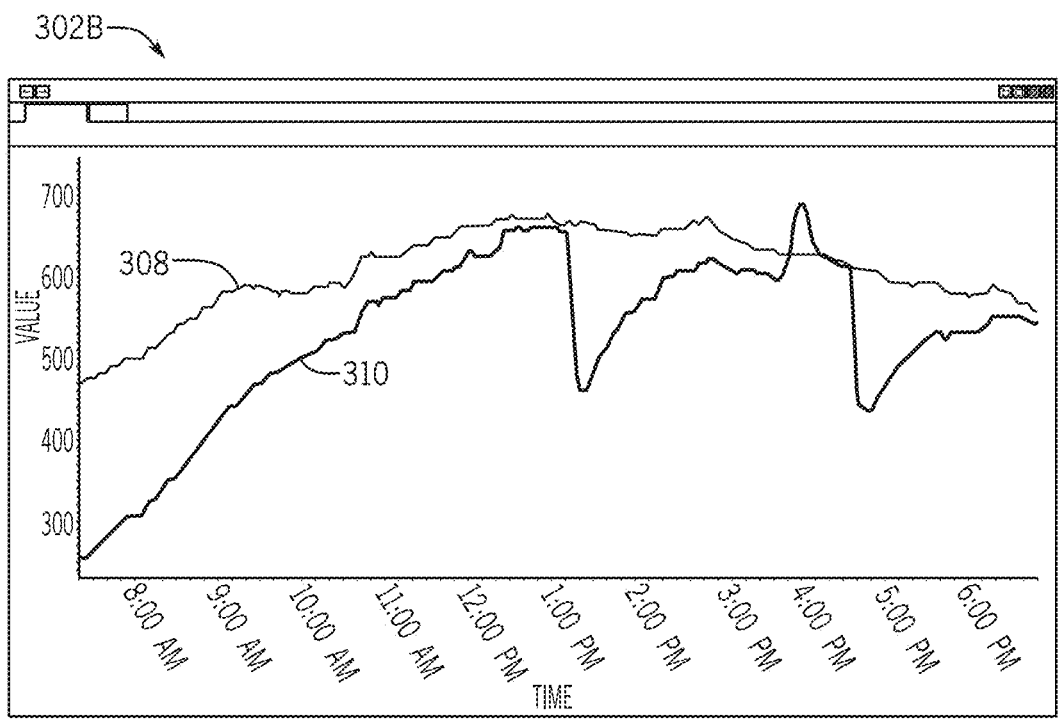
FIG. 19 is another example of a graphical user interface (GUI) generated by the building management system of FIG. 2, in accordance with an aspect of the present disclosure.

To facilitate communicating a visual alarm and/or other visual representations of information related to operation, in some embodiments, a building management system 34 may generate a graphical user interface (GUI) for display via an electronic display 69, for example, implemented on a client device 64 communicatively coupled to the building management system 34. To help illustrate, examples of graphical user interfaces 302, which may be generated by a building management system 34, are shown in FIGS. 17 and 18. In particular, a first graphical user interface 302A is shown in FIG. 17 and a second graphical user interface 302B is shown in FIG. 18. It should be appreciated that the example graphical user interfaces are merely intended to be illustrative and not limiting. For example, in other embodiments, the building management system 34 may generate a graphical user interface 302 that additionally or alternatively includes a visual representation of information related to a building subsystem other than an HVAC sub system 12.

In any case, with regard to FIG. 17, the first graphical user interface 302A includes a list portion 304 and a graphics portion 306. In some embodiments, the list portion 304 may include multiple entries listed based at least in part on hierarchal organization. For example, in the depicted example, the list portion 304 is organized by campus (e.g., site), building management systems 34 associated with each campus, buildings 10 implemented with subsystems controlled by each building management system 34, and equipment (e.g., variable air volume units 32, air handling units 30, and/or scrubber units 70) implemented in each building 10.

Additionally, in some embodiments, the graphics portion 306 may be generated based at least in part on selections made in the list portion 304, for example, by user inputs received via input devices 68 on a client device 64. In the depicted example, the graphics portion 306 includes a visual representation of information related to a scrubber unit 70 since an entry corresponding with the scrubber unit 70 is selected in the list portion 304. Since a campus may include multiple buildings 10, in some embodiments, the graphics portion 306 may include a visual representation of the building 10 served by equipment corresponding with the selected entry to facilitate indicating location of the equipment. In the depicted example, the graphics portion 306 displays a visual representation of building one (e.g., as captured by a camera) since the scrubber unit 70 corresponding with the selected entry serves building one.

Since a building 10 may include multiple different types of equipment, in some embodiments, the graphics portion 306 may include a visual representation of the equipment corresponding with a selected entry. In the depicted example, since the selected entry corresponds with a scrubber unit 70, the graphics portion 306 includes a visual representation of the scrubber unit 70, for example, as captured by a camera. In fact, in the depicted example, the visual representation of the scrubber unit 70 is superimposed on the visual representation of building one such that the scrubber unit 70 appears to be implemented in a room adjacent building one and building one is visible through a window in the room. In this manner, a graphics portion 306 of a graphical user interface 302 may facilitate communicating information, such as served building 10 and/or type of corresponding equipment, related to a selected entry.

Moreover, in some embodiments, the graphics portion 306 may include visual representations of operational parameters of equipment corresponding with a selected entry. In the depicted example, the graphics portion 306 includes a visual representation of outside air parameters, return air parameters determined via a return inlet sensor 92A, return air parameters determined via a return outlet sensor 92B, parameters of a contaminant filter 108, and operational mode of the scrubber unit 70. To facilitate improving control transparency, in some embodiments, a building management system 34 may generate a graphical user interface including additional information based at least in part on user interaction with the graphics portion 306.

For example, the building management system 34 may generate the second graphical user interface 302B shown in FIG. 18 when a user input selects the visual representation of the inlet return air parameters, the visual representation of the outlet return air parameters, or the visual presentation of the contaminant filter parameters. In any case, in the depicted example, the second graphical user interface 302B includes a plot of inlet return air parameters and outlet return air parameters. In particular, the plot includes a first curve 308, which indicates contaminant level of inlet return air over an approximately twenty-four hour period (e.g., 7:10 AM on a first day to 6:50 AM on a second day), and a second curve 310, which indicates contaminant level of outlet return air over the approximately twenty-four hour period.

In the depicted example, at the beginning of the twenty-four hour period, the outlet contaminant level is substantially lower than the inlet contaminant level, for example, due to previously completing an extended regeneration cycle. However, as the contaminant filter 108 continues to sorb air contaminants, the outlet contaminant level gradually increases. By approximately 12:30 PM, filtering efficiency (e.g., (inlet contaminant level−outlet contaminant level)/inlet contaminant level) may be reduced below an efficiency threshold, thereby triggering a first quick regeneration cycle.

In the depicted example, the first quick regeneration cycle is completed by approximately 1:30 PM and, thus, subsequent outlet contaminant level is substantially lower than the outlet contaminant level immediately before the first quick regeneration cycle even though the inlet contaminant level is approximately the same. As filtering efficiency again gradually decreases, by approximately 3:50 PM, filtering efficiency may be reduced below the efficiency threshold, thereby triggering a second quick regeneration cycle. In the depicted example, the second regeneration cycle is completed by approximately 4:50 PM and, thus, subsequent outlet contaminant level is substantially lower than the outlet contaminant level immediately before the second quick regeneration cycle.

Although outlet contaminant level may vary over time, as illustrated by the depicted example, operating a scrubber unit 70 utilizing the techniques described herein (e.g., the sorption mode) generally facilitates maintaining outlet contaminant level lower than inlet contaminant level. In some embodiments, sensor data received from a return outlet sensor 92B may indicate a spike in outlet contaminant level during a (e.g., second quick) regeneration cycle, for example, due to the return outlet sensor 92B determining contaminant level while the contaminant filter 108 is releasing previously sorbed air contaminants. However, by maintaining in a fully closed position during the regeneration cycle, the return outlet damper 116 may block flow of the released air contaminants from recombining with return air.

In other words, controlling operation of a scrubber unit 70 utilizing the techniques described herein may facilitate reducing contaminant level present in return air, for example, by sorbing air contaminants from return air flowing through the scrubber unit 70. As described above, reducing contaminant level present in return air may enable an air handling unit 30 to produce supply air using more of the return air and/or less outside air, which at least in some instances may facilitate reducing power consumption and, thus, improving operational efficiency of an HVAC subsystem 12 including the air handling unit 30. To facilitate further improving effectiveness of the control techniques, the present disclosure additionally provides techniques for implementing (e.g., designing and/or manufacturing) a scrubber unit 70.

Figure 20:
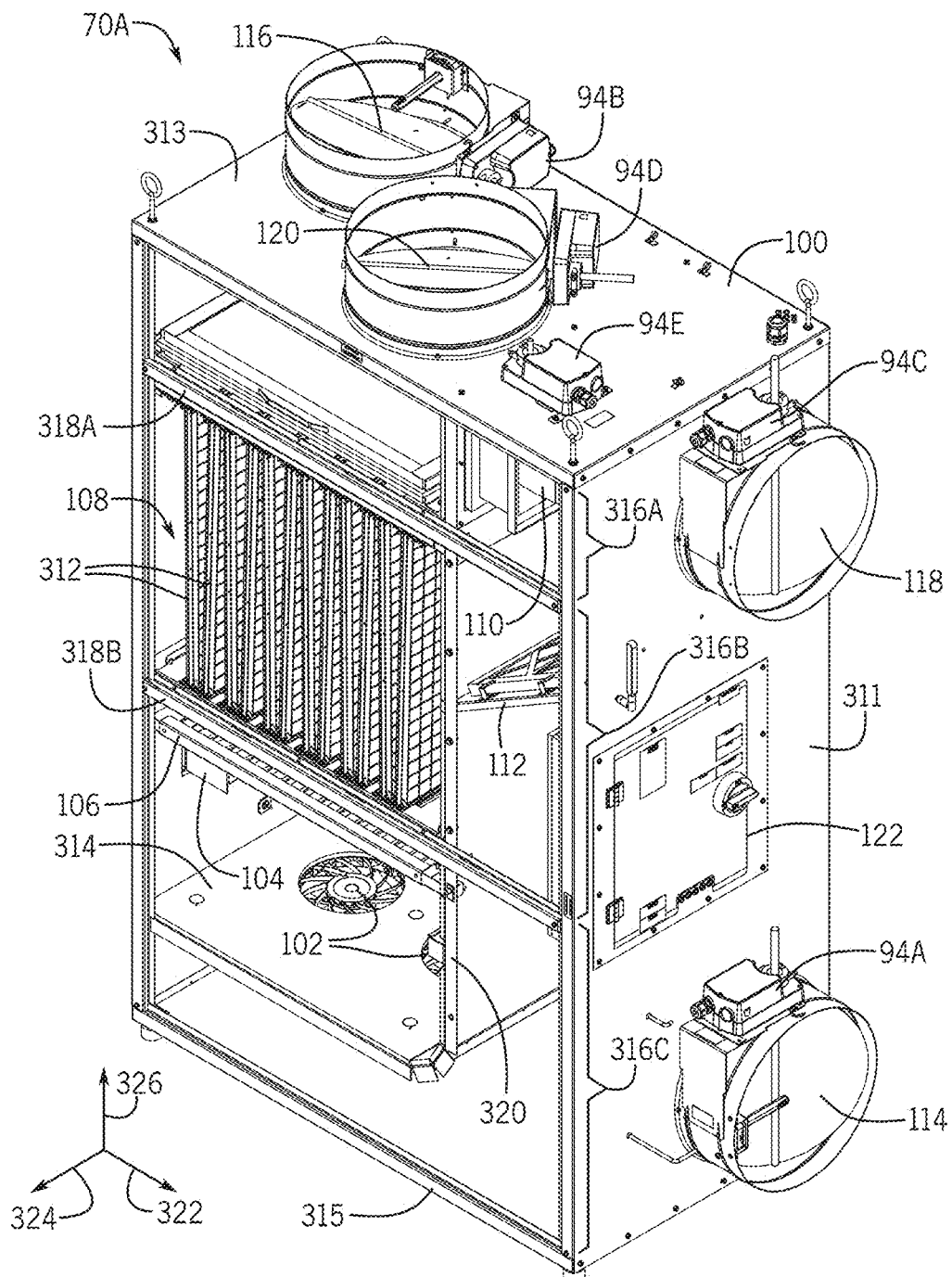
FIG. 20 is an overhead perspective view of the scrubber unit of FIG. 4, in accordance with an aspect of the present disclosure.

To help illustrate, a perspective view of an example scrubber unit 70A is shown in FIG. 20. It should be noted that, although not depicted in FIG. 20, the scrubber unit 70A may include additional components. For example, as will be described in more detail below, the scrubber unit 70A may additionally include one or more doors or door panels that cover the front (e.g., open) side of the scrubber unit 70A.

In the depicted example, the scrubber unit 70A includes a housing 100 formed by at least a side panel 311, a top panel 313, and a bottom panel 315. The housing 100 encloses an internal portion of the scrubber unit 70A, which includes two fans 102, a heater 104, a flame shield 106, a contaminant filter 108, a closed loop damper 110, and a particle filter 112. In the depicted example, the contaminant filter 108 is implemented using a set of multiple (e.g., twelve) filter cartridges 312 and the fans 102 are mounted in a fan panel 314, which extends in a first (e.g., horizontal) direction 322 and a second (e.g., outwardly) direction 324. Additionally, the heater 104 and the flame shield 106 are disposed between the fans 102 and the contaminant filter 108.

Furthermore, in the depicted example, the scrubber unit 70A includes a return inlet damper 114 and an outside inlet damper 118 each implemented in a corresponding opening formed in the side panel 311. The scrubber unit 70A also includes a return outlet damper 116 and an outside outlet damper 120 each implemented in a corresponding opening formed in the top panel 313. To facilitate adjusting damper position, the scrubber unit 70A includes a return inlet actuator 94A mechanically coupled to the return inlet damper 114, a return outlet actuator 94B mechanically coupled to the return outlet damper 116, an outside inlet actuator 94C mechanically coupled to the outside inlet damper 118, and an outside outlet actuator 94D mechanically coupled to the outside outlet damper 120. Similarly, to facilitate adjusting damper position of the closed loop damper 110, the scrubber unit 70A includes a closed loop actuator 94E mechanically coupled to the closed loop damper 110, for example, through an opening in the top panel 313.

A control panel 122 corresponding with the scrubber unit 70A is also implemented in an opening formed in the side panel 311. As described above, in some embodiments, the control panel 122 may include scrubber control circuitry 124 that controls operation of the scrubber unit 70A. For example, to facilitate controlling flow rate and/or source of air flowing into the internal portion of the scrubber unit 70A, the scrubber control circuitry 124 may instruct the return inlet actuator 94A to adjust damper position of the return inlet damper 114 and/or instruct the outside inlet actuator 94C to adjust damper position of the outside inlet damper 118. Additionally, to facilitate controlling flow rate and/or sink of air flowing out from the internal portion of the scrubber unit 70A, the scrubber control circuitry 124 may instruct the return outlet actuator 94B to adjust damper position of the return outlet damper 116 and/or instruct the outside outlet actuator 94D to adjust damper position of the outside outlet damper 120.

Furthermore, in some embodiments, the scrubber control circuitry 124 may instruct the closed loop actuator 94E to adjust damper position of the closed loop damper 110 to facilitate controlling flow of air within the internal portion of the scrubber unit 70A. In some embodiments, the internal portion of a scrubber unit 70A may be divided into multiple segments 316 (e.g., portions or compartments) by one or more cross-members 318. For example, in the depicted example, a first cross-member 318A separates a first (e.g., upper) segment 316A and a second (e.g., middle) segment 316B. Additionally, a second cross-member 318B separates the second segment 316B and a third (e.g., lower) segment 316C. Furthermore, in the depicted example, the closed loop damper 110 is implemented in an opening formed in an internal panel 320, which is coupled to the fan panel 314 in the third segment 316C and extends in a third (e.g., vertical) direction 326 through the first segment 316A and the second segment 316B.

Figure 21:
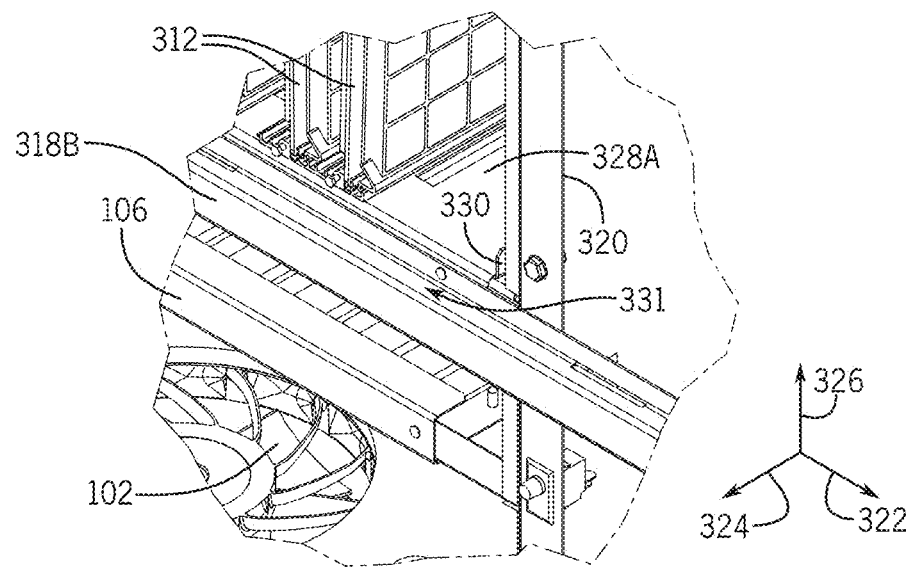
FIG. 21 is a close-up, overhead, perspective view of a cross-member implemented in the scrubber unit of FIG. 20, in accordance with an aspect of the present disclosure.

A more detailed view of a portion of the scrubber unit 70A around the junction between the internal panel 320 and the second cross-member 318B is shown in FIG. 21. In the depicted example, the internal panel 320 extends transverse to the second cross-member 318B, which at least in some instance may facilitate shielding the set of filter cartridges 312, the fans 102, the flame shield 106, and heater 104 implemented on one side of the internal panel 320 from the control panel 122 implemented on the opposite side of the internal panel 320. Additionally, the set of filter cartridges 312 may be coupled between cartridge decks 328.

Figure 22:
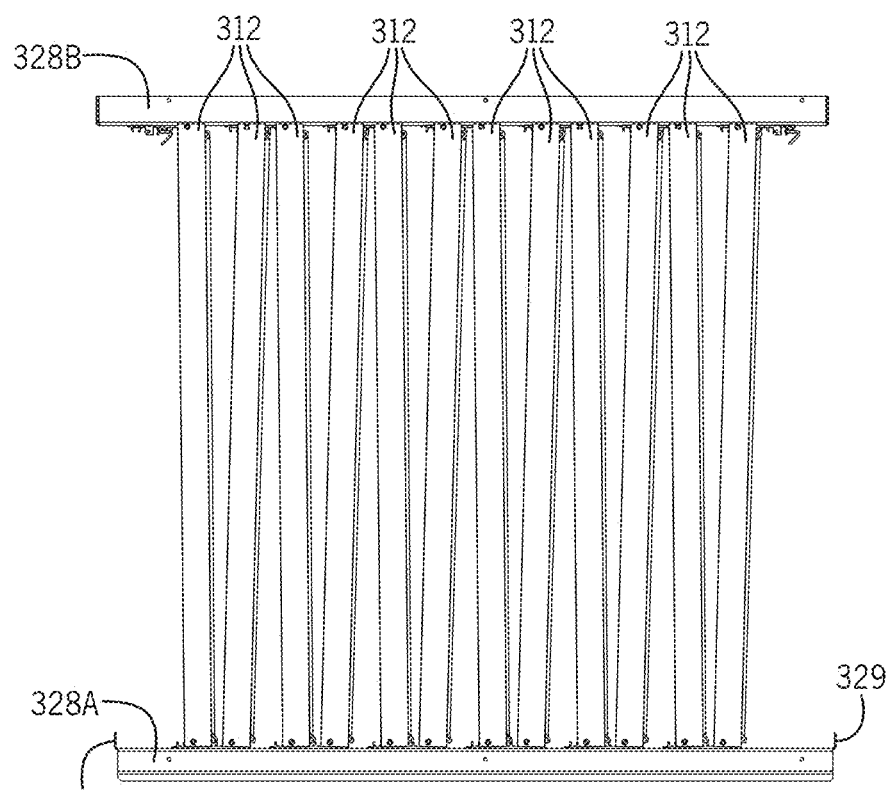
FIG. 22 is a front view of a set of filter cartridges implemented in the scrubber unit of FIG. 20, in accordance with an aspect of the present disclosure.

To help illustrate, a side view of the filter cartridges 312 coupled between a bottom cartridge deck 328A and a top cartridge deck 328B is shown in FIG. 22. As depicted, the bottom cartridge deck 328A includes a deck lip 329 formed on either side. In some embodiments, each deck lip 329 may extend along the length of a corresponding side of the bottom cartridge deck 328A (e.g., into the page). Additionally, each deck lip 329 may be implemented to slidably engage a rack implemented in the scrubber unit 70A.

For example, returning to FIG. 21, a rack 330 is implemented along the internal panel 320. In some embodiments, the rack 330 may extend along the internal panel 320, for example, in the second direction 324. Another rack 330 may similarly be formed along an inner surface of a side panel 311 of the scrubber unit 70A opposite the internal panel 320. By implementing in this manner, the filter cartridges 312 may be moved as a unit (e.g., single group), which at least in some instances may facilitate improving serviceability of the filter cartridges 312, for example, by enabling the set of filter cartridges 312 to be partially or even fully removed from the internal portion of the scrubber unit 70A as a unit.

In some embodiments, filtering efficiency may be improved by angling the filter cartridges 312 relative to one another. In other words, in such embodiments, filtering efficiency may be affected by deformation (e.g., sagging) of the cartridge decks 328, for example, due to weight of the filter cartridges 312. To reduce likelihood of such deformation, the cartridge decks 328 may be fixedly coupled to the cross-members 318. As depicted, the bottom cartridge deck 328A is fixedly coupled to the second cross-member 318B, for example, via a bolt 331 or other coupling means. In a similar manner, the top cartridge deck 328B may be additionally or alternatively coupled to the first cross-member 318A. Thus, when removably coupled to the scrubber unit 70A, the cross-members 318 along with the cartridge decks 318 and the filter cartridges 312 may be moved as a unit.

Figure 23:
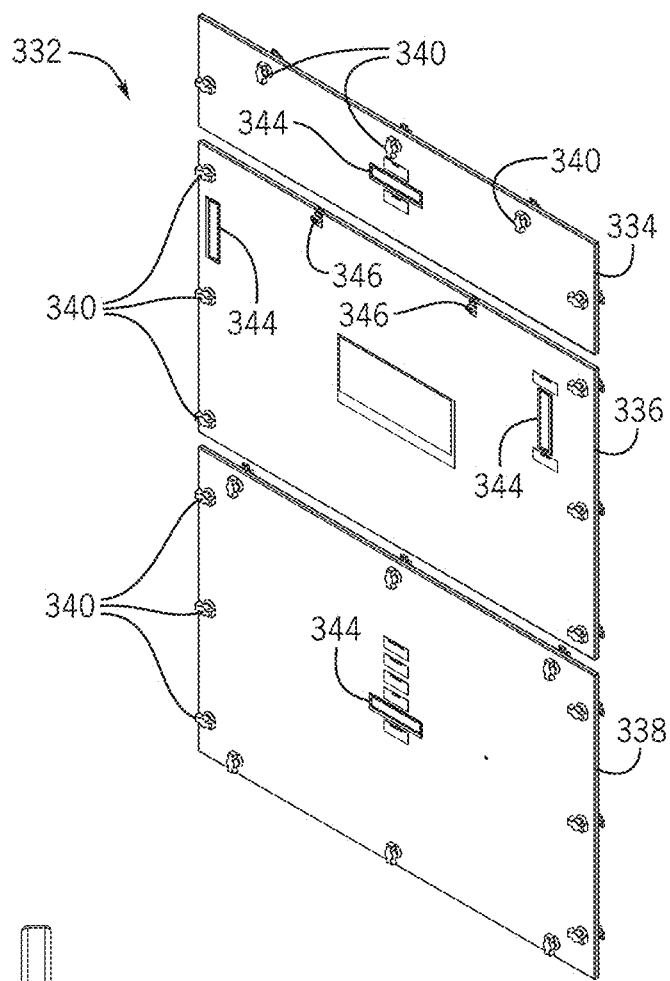
FIG. 23 is an overhead perspective view of a door system implemented on the scrubber unit of FIG. 20, in accordance with an aspect of the present disclosure.

To facilitate further improving serviceability, in some embodiments, doors or door panels may be disposed on either side of the illustrated cross-member 318. To help illustrate, an example of a door system 332, which may be used to at least partially cover openings in the scrubber unit 70A, is shown in FIG. 23. In the depicted example, the door system 332 includes a first (e.g., upper) door 334, a second (e.g., middle) door 336, and a third (e.g., lower) door 338. In some embodiments, the first door 334 may correspond with the first segment 316A, the second door 336 may correspond with the second segment 316B, and the third door 338 may correspond with the third segment 316C. By implementing in this manner, each segment 316 may be relatively independently serviced by removing a corresponding door, for example, while the others remain coupled to the housing 100 and/or the cross-members 318.

In any case, in the depicted example, the first door 334, the second door 336, and the third door 338 each includes multiple wing latches 340, which may facilitate securing a corresponding door to the scrubber unit 70A by interfacing with a structural panel (e.g., side panel 311) of the scrubber unit 70A. In some embodiments, a wing latch 340 may be rotatable with respect to its corresponding door. For example, a wing latch 340 may engage the structural panel when rotated a quarter turn one direction and disengage the structural panel when rotated a quarter turn the opposite direction.

Figure 24:
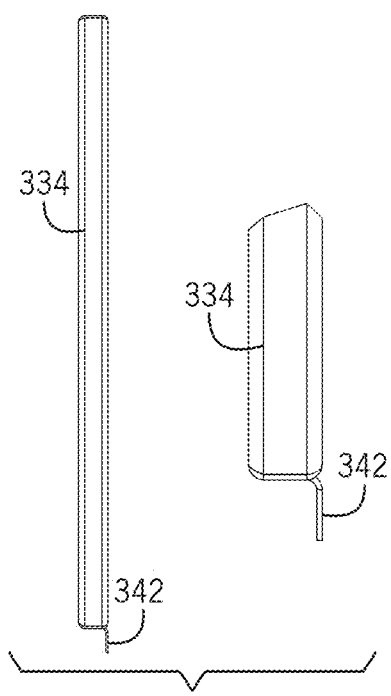
FIG. 24 is a close-up side view of a door included in the door system of FIG. 23, in accordance with an aspect of the present disclosure.

In some embodiments, one or more of the doors may include a lock-in tab. To help illustrate, a side view of the first door 334 including a lock-in tab 342 is shown in FIG. 24. In some embodiments, a lock-in tab 342 may extend along the length of a corresponding door (e.g., into the page). Thus, the lock-in tab 342 may engage a structure of the scrubber unit 70A, such as a cross-member 318, to facilitate positioning the first door 334 appropriately before the first door is secured in place, for example, via corresponding wing latches 340.

Returning to FIG. 23, in the depicted example, the first door 334, the second door 336, and the third door 338 each includes at least one recessed handle 344. In some embodiments, a recessed handle 344 may facilitate physically moving a corresponding door, for example, by enabling a user (e.g., operator or technician) to grip and/or pull the door. In the depicted example, the second door 336 additionally includes two thumb latches 346, which at least in some instances may facilitate improving serviceability of the scrubber unit 70A, for example, by enabling quick locking and/or unlocking of the second door 336. For example, when each wing latches 340 implemented on the second door 336 is rotated to an unlocked position, the second door 336 may be removed by pressing down on both of the thumb latches 346.

Figure 25:
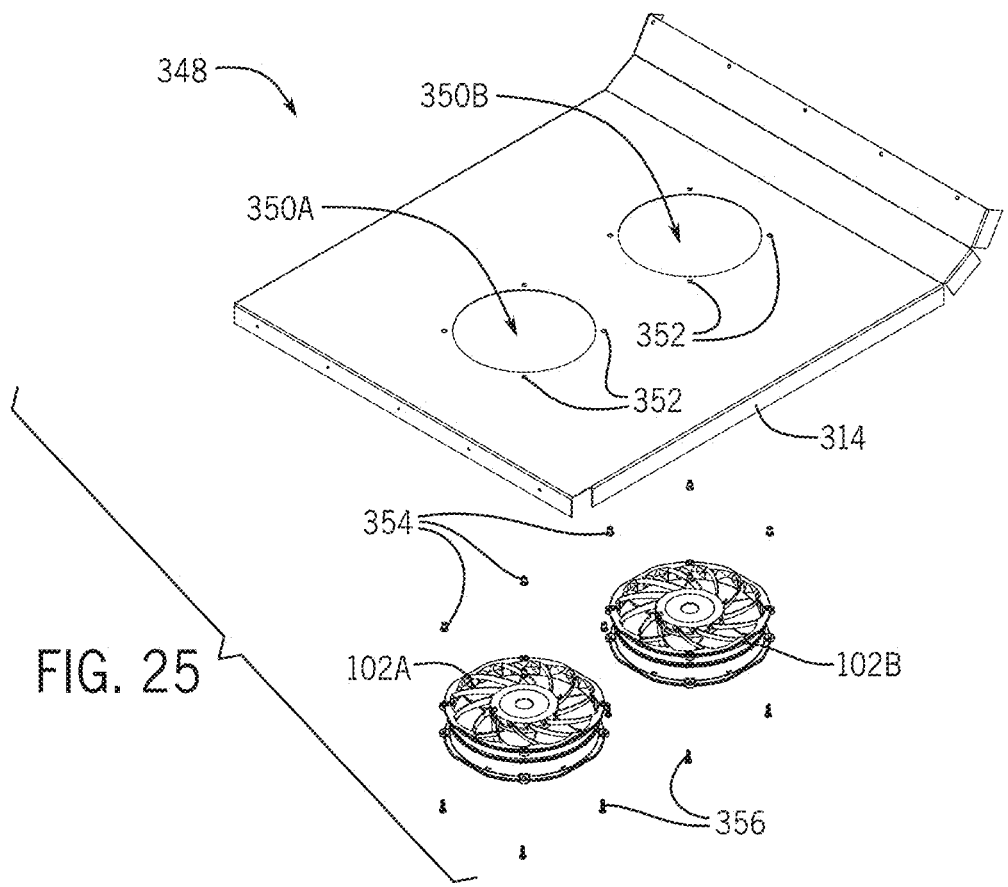
FIG. 25 is an exploded perspective view of a fan system implemented in the scrubber unit of FIG. 20, in accordance with an aspect of the present disclosure.

A more detailed view of the fan system 348 implemented in the scrubber unit 70A is shown in FIG. 25. In depicted example, the fan system 348 includes a first fan 102A, a second fan 102B, and the fan panel 314 (e.g., fan wall or main wall). In particular, the fan panel 314 include a first opening 350A implemented to receive the first fan 102 and a second opening 350B implemented to receive the second fan 102. To facilitate securing the fans 102, the fan panel 314 also includes a number of mounting holes 352 surrounding the first opening 350A and the second opening 350B. In the depicted example, four mounting holes 352 surround the first opening 350A and four mounting holes 352 surround the second opening 350B. However, in some embodiments, more or fewer mounting holes 352 may be formed around an opening 350 in the fan panel 314.

Each mounting hole 352 is may receive a nut blind insert 354. Additionally, each nut blind insert 354 may receive a nut blind screw 356 that also extends through an opening in the corresponding first fan 102 or the second fan 102. In other words, the nut blind screws 356 may extend through features of the fan panel 314 and engage the nut blind inserts 354 in order to mount the fans 102 in the corresponding openings 350 of the fan panel 314. In fact, the illustrated assembly may enable mounting of the fans 102 in the openings 350 without having to tighten screws in an area of the scrubber unit 70A having low or insufficient clearance, which at least in some instances facilitates improving serviceability of the fan system 348. However, other fastening assemblies are also possible.

Figure 26:
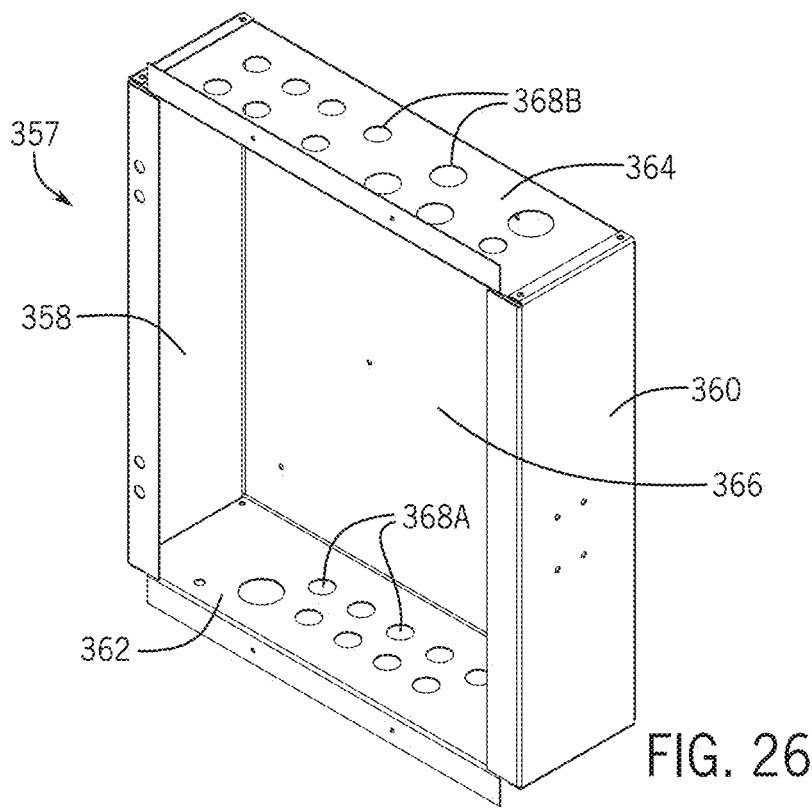
FIG. 26 is an overhead perspective view of a control box implemented on the scrubber unit of FIG. 20, in accordance with an aspect of the present disclosure.

An example of a frame 357, which may be implemented to mount a control panel 122 on a scrubber unit 70A, is shown in FIG. 26. In the depicted example, the frame 357 includes a first side wall 358, a second side wall 360, a bottom wall 362, a top wall 364, and a back wall 366. In some embodiments, the frame 357 may be implemented by wrapping a single sheet of material (e.g., metal), which may facilitate reducing implementation associated cost, such as manufacturing steps used to form the frame 357. In any case, the bottom wall 362 includes lower wire feed holes 368A and the top wall 364 includes upper wire feed holes 368B. The lower wire feed holes 368A and upper wire feed holes 368B may be punched through the corresponding bottom wall 362 and top wall 364. In other words, the bottom wall 362 and the top wall 364 may be implemented to enable passage of wires 141 through the feed holes 368 punched therethrough, for example, without using separate wire feed plates, which at least in some instances may facilitate reducing implementation associated cost of a scrubber unit 70A.

Figure 27:
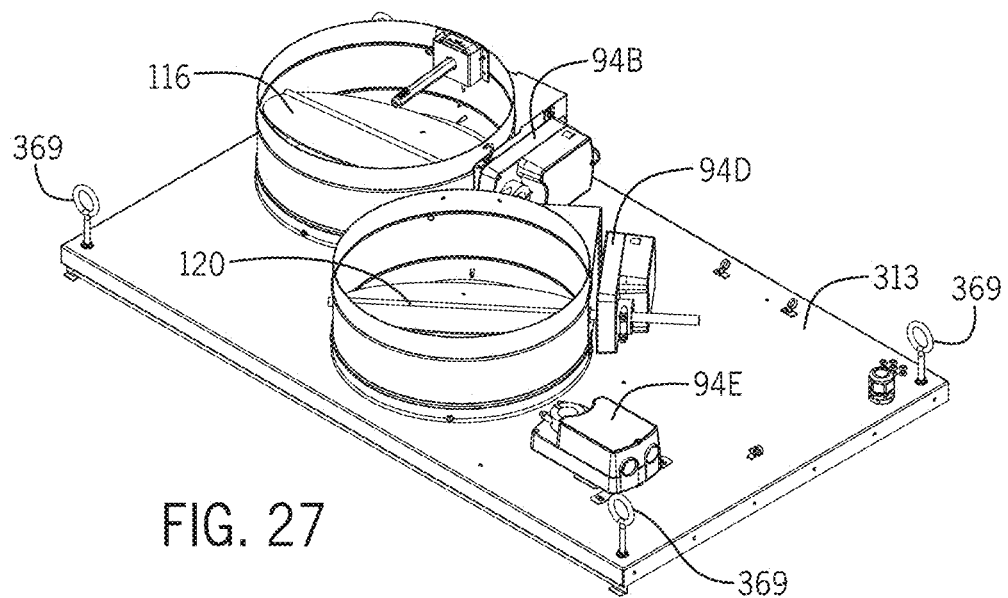
FIG. 27 is an overhead perspective view of a top panel implemented on the scrubber unit of FIG. 20, in accordance with an aspect of the present disclosure.

A more detailed view of the top panel 313 of the scrubber unit 70A is shown in FIG. 27. As depicted, the top panel 313 includes the return outlet damper 116 and the outside outlet damper 120 mounted thereon. Additionally, the top panel 313 includes eyelet assemblies 369, one adjacent each corner of the top panel 313. In some embodiments, the eyelet assemblies 369 may be gripped in order to lift the scrubber unit 70A upwardly and/or the top panel 313 upwardly away from the scrubber unit 70A, for example, when the top panel 313 is not engaged with other panels or structures of the scrubber unit 70A.

Figure 28:
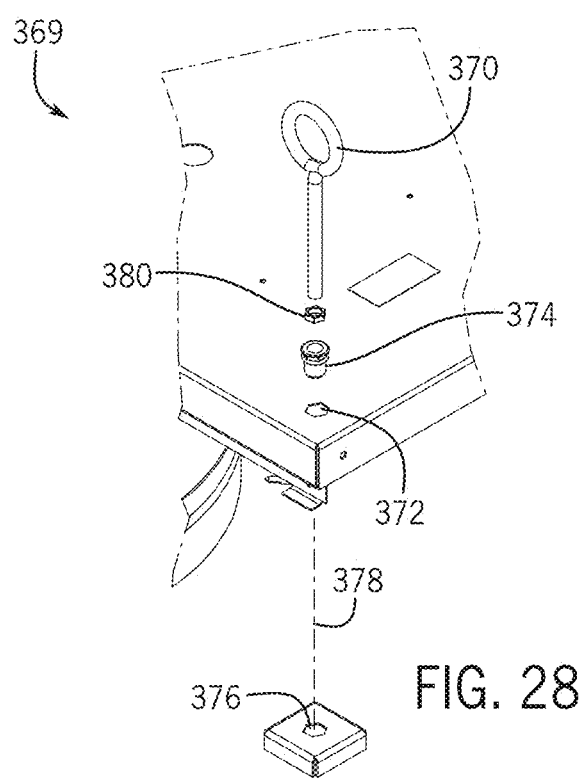
FIG. 28 is a close-up, exploded, perspective view of an eyelet lifter implemented on the top panel of FIG. 27, taken along line 13-13 in FIG. 12, in accordance with an aspect of the present disclosure.

A more detailed view of a portion of the top panel 313 including an eyelet assembly 369 is shown in FIG. 28. As depicted, the eyelet assembly 369 includes a lifting eyelet 370, a nut insert 374, a backing plate 376, and a locking nut 380. In some embodiments, the nut insert 374 may extend from a top surface of the top panel 313 through an opening 372 to engage the backing plate 376 on a bottom surface of the top panel 313 (e.g., as indicated by dashed line 378). Additionally, the nut insert 374 may receive the locking nut 380 and the lifting eyelet 370. In some embodiments, height of the lifting eyelet 370 relative to the top panel 313 may be adjustable, for example, by turning the lifting eyelet 370 to adjust position of its shaft within the nut insert 374. In some embodiments, adjustable height of lifting eyelets 370 may facilitate accounting for height differences across the top panel 313, which at least in some instances may facilitate improving serviceability of the scrubber unit 70A.

To reduce likelihood of subsequent movement relative to the top panel 313, the locking nut 380 may secure the lifting eyelet 370 within the nut insert 374. For example, once positioned at a target height, the lifting eyelet 370 may be secured in place by tightening the locking nut 380. In some embodiments, the lifting eyelet 370 may be welded to improve a coupling between the lifting eyelet 370 and the top panel 313. Additionally or alternatively, the locking nut 380 may be welded in the nut insert 374.

Figure 29:
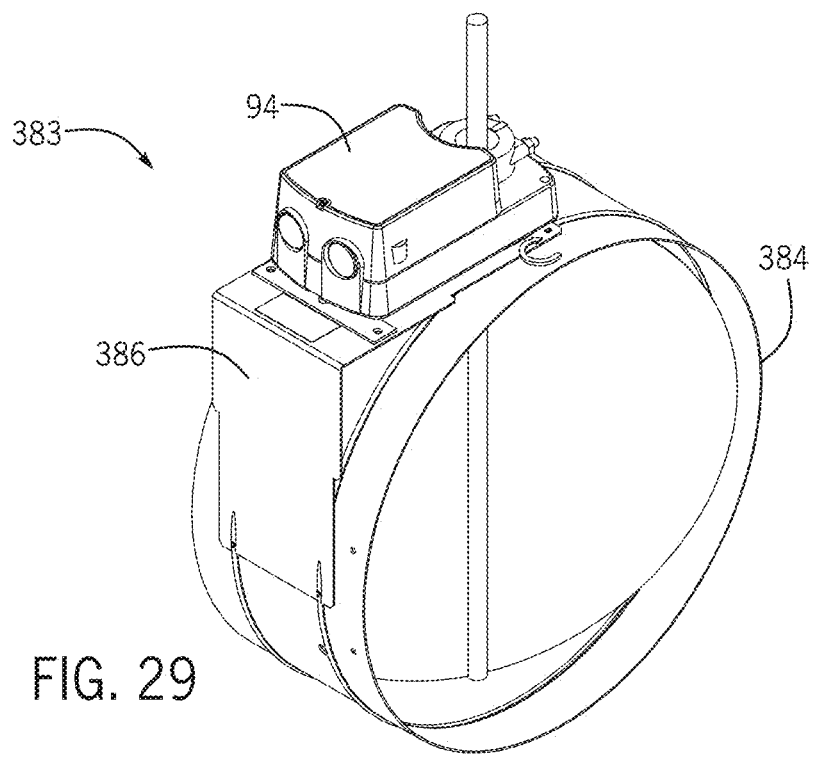
FIG. 29 is an overhead perspective view of an air damper implemented on the scrubber unit of FIG. 20, in accordance with an aspect of the present disclosure.

A more detailed view of a damper assembly 383 is shown in FIG. 29. In the depicted example, the damper assembly 383 includes an actuator 94 coupled via a mounting assembly 386 to an air damper 384. The air damper 384 may be implemented as any of a return inlet damper 114, a return outlet damper 116, an outside inlet damper 118, or an outside outlet damper 120 on the scrubber unit 70A.

Figure 30:
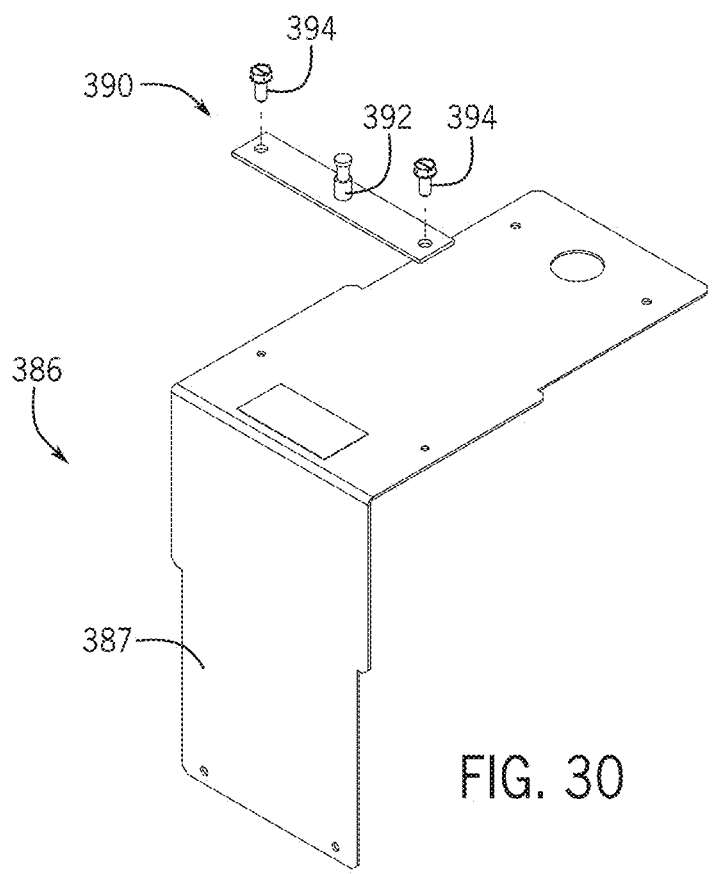
FIG. 30 is a close-up, exploded, perspective view of a mounting bracket implemented to secure an actuator to the air damper of FIG. 29, in accordance with an aspect of the present disclosure.

A more detailed view of the mounting assembly 386 is shown in FIG. 30. As depicted, the mounting assembly 386 includes a mounting bracket 387 and an actuator lock strap 390 with an upwardly extending engagement feature 392. In some embodiments, the engagement feature 392 may directly engage an actuator 94, for example, at a corresponding opening. Additionally, the actuator lock strap 390 may be secured to the mounting bracket 387 via screws 394. By implementing in this manner, the air damper 384, the mounting bracket 386, and the actuator 94 may be assembled prior to installation on the scrubber unit 70A, which at least in some instances may facilitate improving implementation of the scrubber unit 70A.

Figure 31:
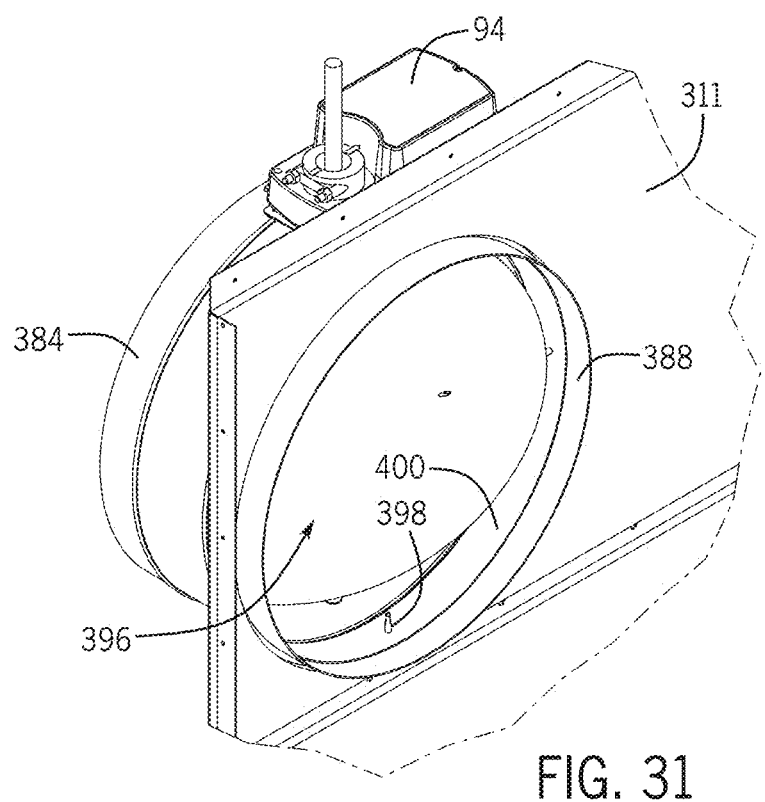
FIG. 31 is an overhead perspective view of the air damper of FIG. 29 installed in a panel of the scrubber unit of FIG. 20, in accordance with an aspect of the present disclosure.
Figure 32:
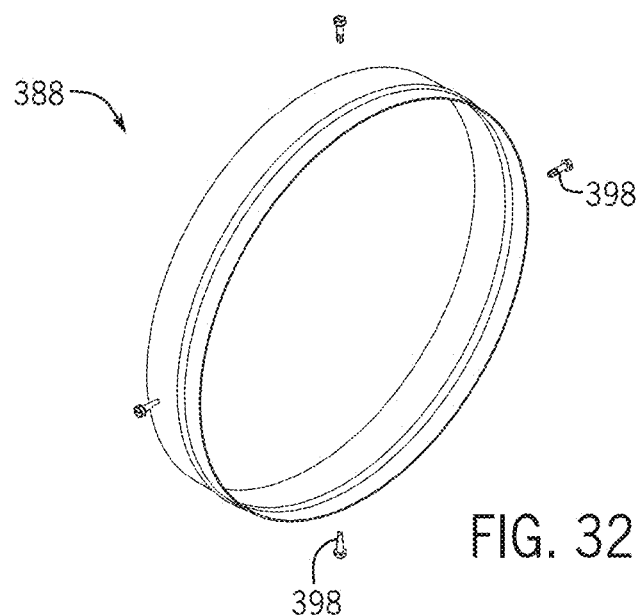
FIG. 32 is a close-up, exploded, perspective view of a spin ring implemented in the panel of FIG. 31, in accordance with an aspect of the present disclosure.
Figure 33:
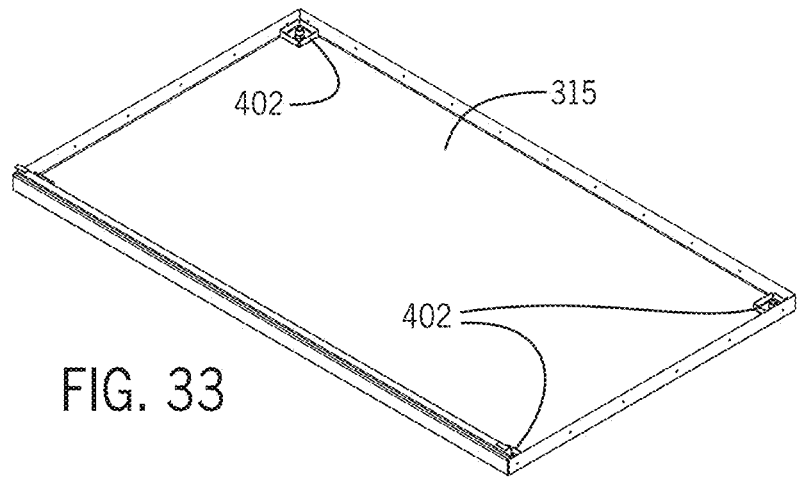
FIG. 33 is an overhead perspective view of a bottom panel implemented on the scrubber unit of FIG. 20, in accordance with an aspect of the present disclosure.

To help illustrate, an example of the air damper 384 installed in the side panel 311 is shown in FIG. 31. As depicted, a spin ring 388 is installed within an opening 396 formed in the side panel 311. Additionally, the air damper 384 extends into and is secured within the spin ring 388 via self-tapping screws 398, which extend through the spin ring 388 to an inner surface 400 of the air damper 384. In other words, the air damper 384 may be fixedly coupled with the spin ring 388. A more detailed view of the spin ring 388 is shown in FIG. 32. In some embodiments, the spin ring 388 may be implemented to be capable of spinning within the opening 396 of the side panel 311.

Figure 34:
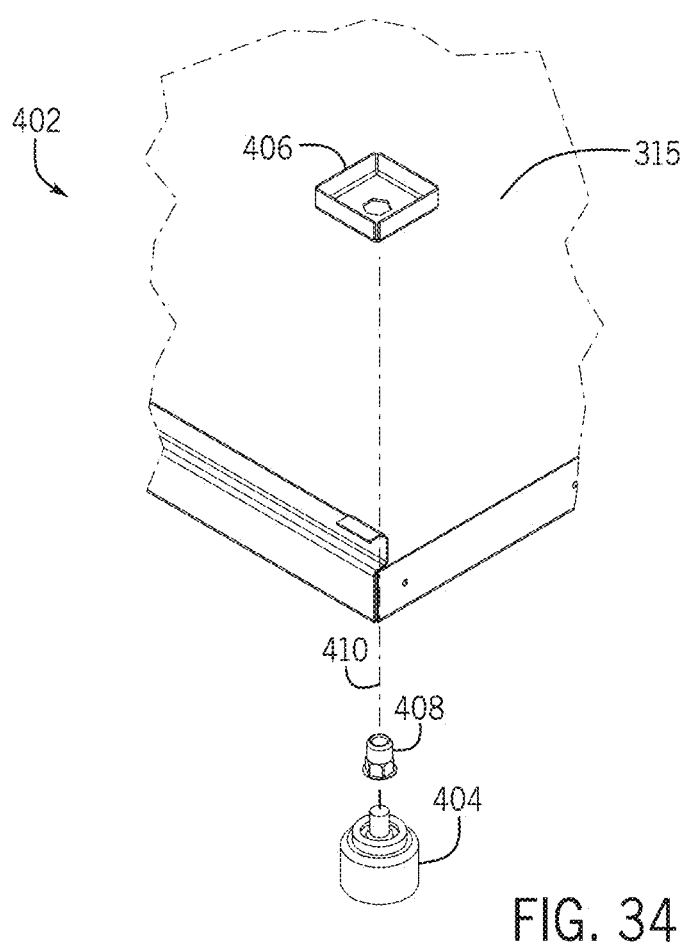
FIG. 34 is a close-up, exploded, perspective view of a foot mounting assembly implemented on the bottom panel of FIG. 33, in accordance with an aspect of the present disclosure.

A more detailed view of the bottom panel 315 of the scrubber unit 70A is shown in FIG. 32. As depicted, the bottom panel 315 includes foot assemblies 402, one adjacent each corner of the bottom panel 315. To help illustrate, a more detailed view of a foot assembly 402 is shown in FIG. 34. As depicted, the foot assembly 403 includes a self-leveling foot 404, a backing plate 406, and a nut insert 408. In some embodiments, the nut insert 408 may extend from a bottom surface of the bottom panel 315 through an opening (hidden from view) to engage the backing plate 406 on a top surface of the bottom panel 315 (e.g., as indicated by dashed line 410).

Additionally, the nut insert 408 may receive a shaft of the self-leveling foot 404 to secure the self-leveling foot 404 to the bottom panel 315. In some embodiments, the self-leveling foot 404 may be spring-loaded or otherwise self-leveling to facilitate leveling the scrubber unit 70A. At least in some instances, implementing foot assemblies 402 in this manner may facilitate improving deployment of the scrubber unit 70A, for example, when deployed on an uneven surface and/or weight of the scrubber unit 70A is unevenly distributed across the bottom panel 315.

One or more of the disclosed embodiments, alone or in combination, may provide one or more technical effects useful in enhancing efficiency of a heat exchanger of an HVAC system. The above-described contaminant scrubber features facilitate improved assembly manufacturing, ease of access for maintenance purposes, and/or enhanced performance. For example, the top panel/wall having eyelet lifters, the bottom panel/wall having self-leveling feet, and the blind nut inserts/screws of the fan assembly facilitates improved assembly and manufacturing of the contaminant scrubber. Further, the compartmentalizing of the contaminant scrubber, and removable nature of the cartridge set, facilitates ease of access for maintaining the contaminant scrubber. Further still, the cartridge set structure enables an increased number of cartridges, which enhances contaminant removal.

While only certain features and embodiments of the present disclosure have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out an embodiment, or those unrelated to enabling the claimed embodiments). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilation, and/or air conditioning (HVAC) system, comprising:
an HVAC subsystem including a scrubber unit configured to receive a return air, wherein the scrubber unit includes a contaminant filter configured to sorb contaminants present in the return air; and
control circuitry configured to:
receive a first input indicative of an outside air temperature of outside air, a second input indicative of an outside air contaminant level of the outside air, and a third input indicative of a return air contaminant level of the return air; and
control, based on the first input, the second input, and the third input, the HVAC subsystem between:
a first operating mode in which the return air is exhausted to an environment and a first supply air comprising the outside air is directed toward a conditioned space; and
a second operating mode in which a second supply air comprising the return air is directed toward the conditioned space.

2. The HVAC system of claim 1, wherein the control circuitry is configured to:
disconnect a power supply to the scrubber unit in the first operating mode of the HVAC subsystems;

disconnect the power supply to the scrubber unit in the second operating mode when the return air contaminant level of the return air is below a threshold contaminant level; and connect the power supply to the scrubber unit in the second operating mode when the return air contaminant level of the return air is above the threshold contaminant level.

3. The HVAC system of claim 1, wherein the HVAC subsystem comprises a first damper configured to be controlled by the control circuitry to a first open position to exhaust the return air to the environment in the first operating mode of the HVAC subsystem.

4. The HVAC system of claim 3, wherein the HVAC subsystem comprises a second damper configured to be controlled by the control circuitry to a second open position to direct the return air toward the conditioned space in the second operating mode of the HVAC subsystem.

5. The HVAC system of claim 1, wherein the HVAC subsystem comprises a first damper configured to be controlled by the control circuitry to an open position to direct the outside air toward the conditioned space in the first operating mode of the HVAC subsystem.

6. The HVAC system of claim 5, wherein the HVAC subsystem comprises a second damper configured to be controlled by the control circuitry to a closed position to block the return air from being directed toward the conditioned space in the first operating mode of the HVAC subsystem.

7. The HVAC system of claim 1, wherein the control circuitry is configured to control, based on the first input, the second input, and the third input, the HVAC subsystem between:

the first operating mode;

the second operating mode; and a third operating mode in which a third supply air comprising the return air and the outside air is directed toward the conditioned space.

8. The HVAC system of claim 1, wherein the control circuitry is configured to control the HVAC subsystem between:

a scrubber standby mode in response at least in part to the return air contaminant level of the return air being less than a lower contaminant threshold, wherein the standby mode includes the scrubber unit being deactivated;

the first operating mode in response at least in part to the outside air temperature of the outside air being less than a threshold temperature; and the second operating mode in response at least in part to the return air contaminant level being greater than an upper contaminant threshold, wherein the upper contaminant threshold is higher than the lower contaminant threshold.

9. The HVAC system of claim 1, wherein the control circuitry is configured to control the HVAC subsystem between:

the first operating mode in which the return air is exhausted to the environment and the first supply air consisting essentially of the outside air is directed toward the conditioned space; and the second operating mode in which the second supply air consisting essentially of the return air is directed toward the conditioned space.

10. The HVAC system of claim 1, wherein the HVAC subsystem comprises:

a first sensor configured to detect the outside air temperature of the outside air and to provide the first input to the control circuitry;

a second sensor configured to detect the outside air contaminant level of the outside air and to provide the second input to the control circuitry; or a third sensor configured to detect the return air contaminant level of the return air and to provide the third input to the control circuitry.

11. The HVAC system of claim 10, comprising the second sensor, wherein the second sensor is configured to detect a carbon dioxide level in the outside air, and the carbon dioxide level in the outside air corresponds to the outside air contaminant level of the outside air.

12. A non-transitory, computer readable media, storing instructions thereon that, when executed by processing circuitry, are configured to cause the processing circuitry to:

receive a first input indicative of an outside air temperature of outside air;

receive a second input indicative of an outside air contaminant level of the outside air;

receive a third input indicative of a return air contaminant level of a return air routed from a conditioned space toward an HVAC subsystem controlled by the processing circuitry; and control, based on the first input, the second input, and the third input, the HVAC subsystem between:

a first operating mode in which the return air is exhausted to an environment and a first supply air comprising the outside air is directed toward a space conditioned by the HVAC subsystem; and a second operating mode in which a second supply air comprising the return air is directed through a scrubber unit having a contaminant filter configured to sorb contaminants present in the return air and toward the space conditioned by the HVAC subsystem.

13. The non-transitory, computer readable media of claim 12, wherein the instructions, when executed by the processing circuitry, are configured to cause the processing circuitry to control one or more dampers to block the return air from being directed toward the space in the first operating mode of the HVAC subsystem, direct the outside air toward the space in the first operating mode of the HVAC subsystem, and direct the return air toward the space in the second operating mode of the HVAC subsystem.

14. A heating, ventilation, and/or air conditioning (HVAC) system, comprising:

an HVAC subsystem including a scrubber unit having a contaminant filter configured to sorb contaminants present in a return air; and control circuitry configured to:

receive an input indicative of an outside air contaminant level of the outside air;

control, based on the input and in response to the outside air contaminant level of the outside air exceeding a threshold contaminant level, the HVAC subsystem to a first operating mode in which the scrubber unit sorbs the contaminants present in the return air; and control, based on the input and in response to the outside air contaminant level of the outside air not exceeding the threshold contaminant level, the HVAC subsystem to a second operating mode in which the scrubber unit does not sorb the contaminants present in the return air.

15. The HVAC system of claim 14, comprising a sensor communicatively coupled with the control circuitry, wherein the control circuitry is configured to receive the input from the sensor.

16. The HVAC system of claim 14, wherein the control circuitry is configured to disconnect a power supply to the scrubber unit in the second operating mode of the HVAC subsystem.

17. The HVAC system of claim 14, wherein the HVAC subsystem comprises:
  a damper, wherein the control circuitry is configured to:
    actuate the damper to a first position in the first operating mode such that the return air is directed toward a conditioned space; and
    actuate the damper to a second position in the second operating mode such that the return air is exhausted to an environment.

18. The HVAC system of claim 17, wherein the HVAC subsystem comprises:
  an additional damper, wherein the control circuitry is configured to:
    actuate the additional damper to a third position in the first operating mode such that outside air is directed toward the conditioned space; and
    actuate the additional damper to a fourth position in the second operating mode such that the outside air is blocked from the conditioned space.

19. The HVAC system of claim 14, wherein the control circuitry is configured to:
  receive a first additional input indicative of an outside air temperature of the outside air;
  receive a second additional input indicative of a return air contaminant level of the return air; and
  control the HVAC subsystem in the first operating mode, the second operating mode, or a third operating mode based at least in part on the first additional input, the second additional input, or both.

20. The HVAC system of claim 14, wherein the control circuitry is configured to:
  receive an additional input indicative of a return air contaminant level of the return air; and
  control the scrubber unit to a standby mode in response at least in part to the return air contaminant level of the return air being less than a return air contaminant threshold.

* * * * *